United States Patent
Van Der Meulen et al.

(10) Patent No.: US 12,216,321 B2
(45) Date of Patent: *Feb. 4, 2025

(54) FIBER OPTIC FURCATION ASSEMBLIES, METHODS, AND SYSTEMS

(71) Applicant: CommScope Technologies LLC, Hickory, NC (US)

(72) Inventors: Theo Van Der Meulen, Boxtel (NL); Geert Antoon Parton, Lubbeek (BE); Dirk Alexander De Gast, Geldermalsen (NL); Heidi Bleus, Genk (BE); Robert Lantinga, Eindhoven (NL)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,598

(22) Filed: Feb. 23, 2024

(65) Prior Publication Data

US 2024/0272396 A1    Aug. 15, 2024

Related U.S. Application Data

(63) Continuation of application No. 18/067,219, filed on Dec. 16, 2022, now Pat. No. 11,914,210, which is a
(Continued)

(51) Int. Cl.
*G02B 6/44* (2006.01)
*G02B 6/38* (2006.01)

(52) U.S. Cl.
CPC .............. *G02B 6/4472* (2013.01); *G02B 6/38* (2013.01); *G02B 6/3839* (2013.01); *G02B 6/4471* (2013.01); *G02B 6/4479* (2013.01)

(58) Field of Classification Search
CPC ...... G02B 6/4472; G02B 6/38; G02B 6/3839; G02B 6/4471; G02B 6/4479
(Continued)

(56) References Cited

U.S. PATENT DOCUMENTS 5,440,666 A     8/1995   Burek et al.
6,648,520 B2   11/2003   McDonald et al.
(Continued)

FOREIGN PATENT DOCUMENTS

GB        2438654 A      12/2007

OTHER PUBLICATIONS

International Search Report and Written Opinion of the International Searching Authority for International Patent Application No. PCT/US2017/063073 mailed Feb. 28, 2018, 10 pages.
(Continued)

*Primary Examiner* — Jerry M Blevins
(74) *Attorney, Agent, or Firm* — Merchant & Gould P.C.

(57)    ABSTRACT

A fiber optic furcation assembly includes a main fiber optic cable structure, a plurality of furcation tubes, and a housing with a cavity including a transition portion. A plurality of optical fibers each continuously and uninterruptedly extends through an end portion of a jacket of the main fiber optic cable structure, the transition portion of the cavity of the housing, and a respective one of the plurality of furcation tubes. In one embodiment, the cavity includes a securing portion including a plurality of protrusions. The plurality of protrusions defines a plurality of locating channels and at least one securing channel that intersects the locating channels. Bonding material is positioned within the securing channel and bonds the plurality of furcation tubes to the plurality of protrusions. In another embodiment, a cable mount includes a housing attachment, a cable jacket attachment, and a passage. The housing attachment is mounted
(Continued)

within a port of the housing. Each optical fiber also extends through the passage of the cable mount, respectively.

10 Claims, 60 Drawing Sheets

Related U.S. Application Data continuation of application No. 17/201,580, filed on Mar. 15, 2021, now Pat. No. 11,531,177, which is a continuation of application No. 16/463,308, filed as application No. PCT/US2017/063073 on Nov. 22, 2017, now Pat. No. 10,948,677.

(60) Provisional application No. 62/425,925, filed on Nov. 23, 2016.

(58) Field of Classification Search
USPC .......................................................... 385/100
See application file for complete search history.

(56) References Cited

U.S. PATENT DOCUMENTS

| | | |
|---|---|---|
| 7,703,990 B1 | 4/2010 | De Jong et al. |
| 8,571,367 B2 | 10/2013 | Van Der Meulen et al. |
| 8,620,129 B2 | 12/2013 | Rudenick et al. |
| 8,646,989 B2 | 2/2014 | Zimmel et al. |
| 9,395,509 B2 | 7/2016 | Petersen et al. |
| 10,948,677 B2 | 3/2021 | Van Der Meulen |
| 11,914,210 B2 * | 2/2024 | Van Der Meulen ........................ G02B 6/4471 |
| 2003/0210875 A1 | 11/2003 | Wagner et al. |
| 2010/0215331 A1 | 8/2010 | Gonzalez et al. |
| 2013/0188916 A1 | 7/2013 | Bradley et al. |
| 2014/0193130 A1 | 7/2014 | Mullaney et al. |
| 2015/0093084 A1 | 4/2015 | Cooke et al. |
| 2015/0370029 A1 | 12/2015 | Petersen et al. |
| 2016/0004016 A1 | 1/2016 | Zimmel et al. |
| 2016/0124174 A1 | 5/2016 | Courchaine et al. |

OTHER PUBLICATIONS

Extended European Search Report for corresponding European Patent Application No. 17873423.2 mailed May 28, 2020, 11 pages.
USCONEC Drawing C13527 Spring Push, Round, MTP®, HFC, 3.0 mm Cable, dated Jan. 31, 2014, 1 page.
USCONEC Drawing C13245 Spring Push, Round, MTP®, HFC, 3.6 mm Cable, dated Mar. 5, 2012, 1 page.

* cited by examiner

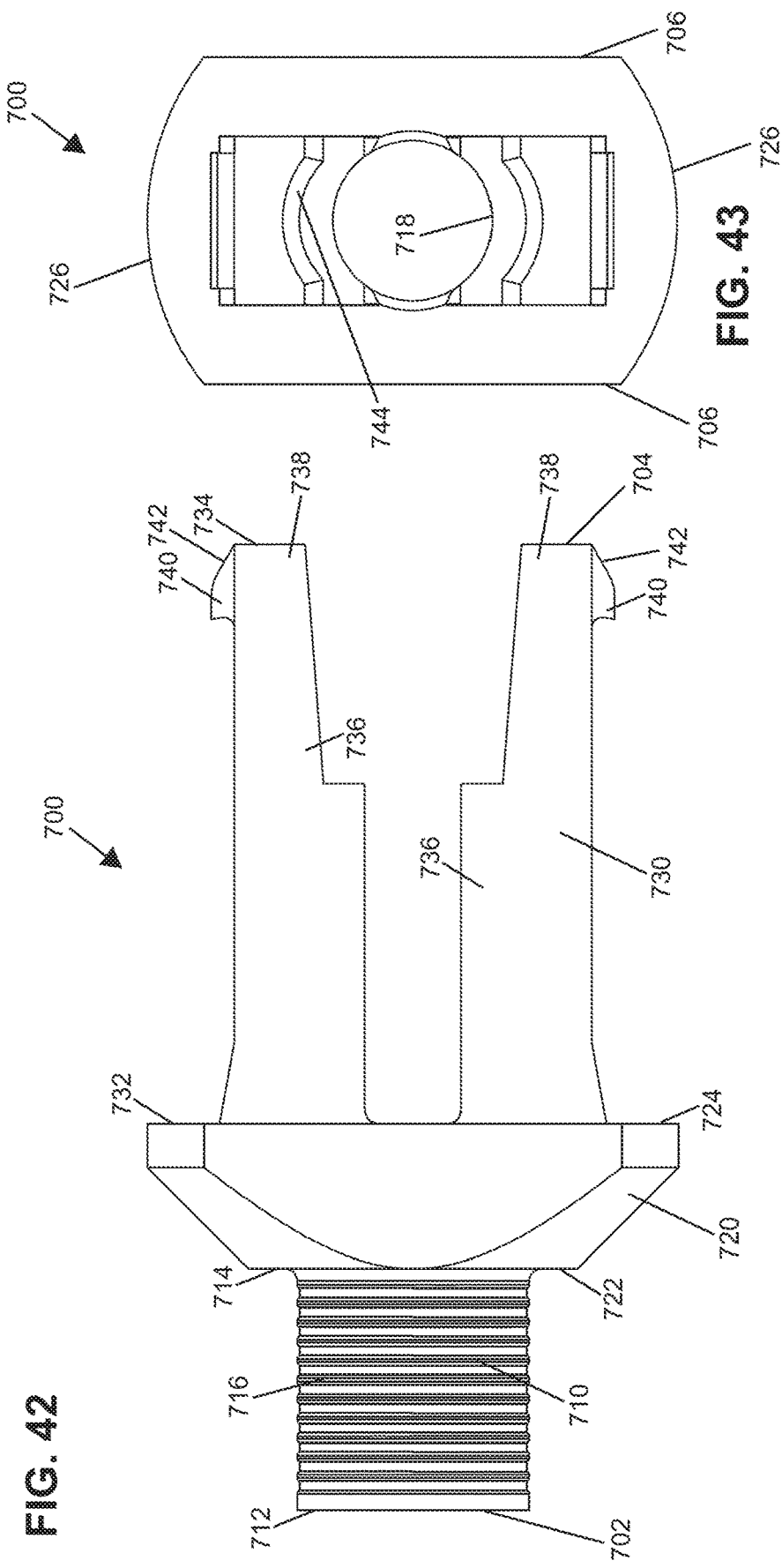

FIG. 44
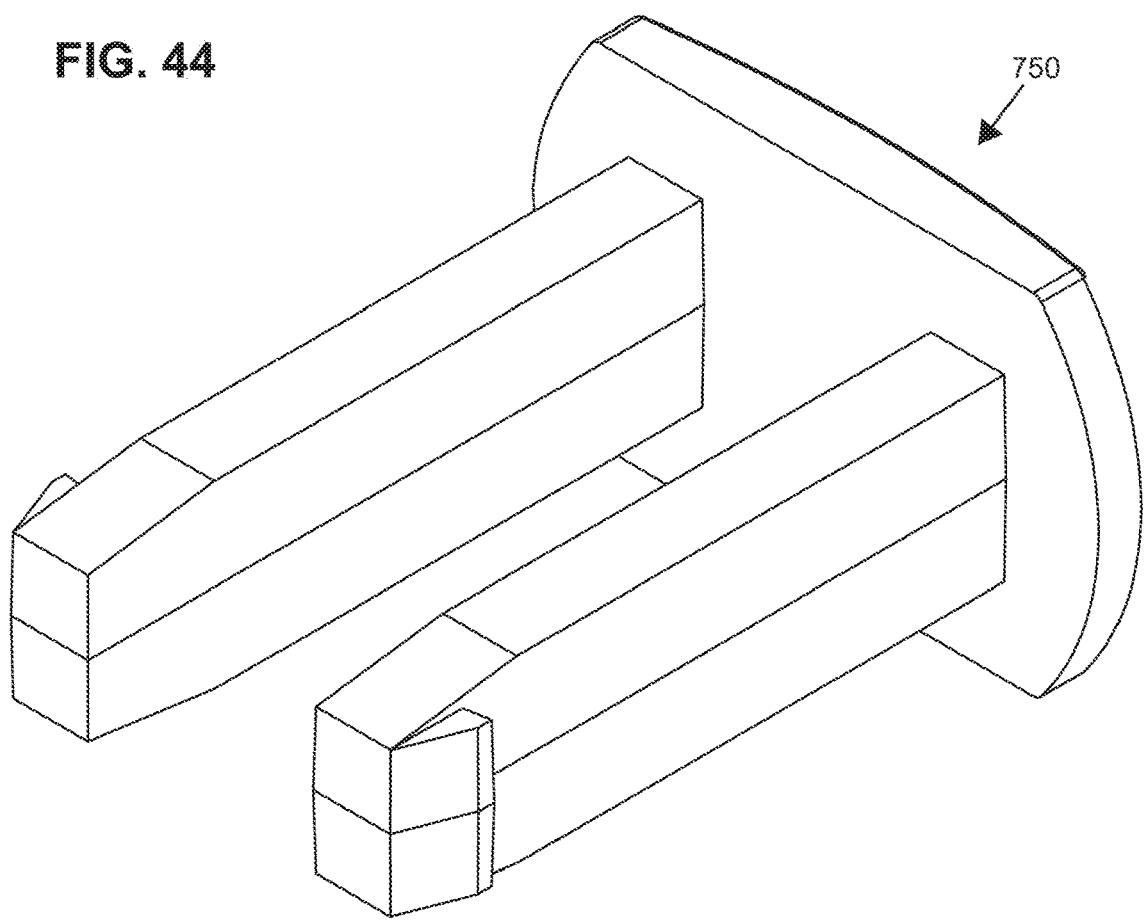
FIG. 45
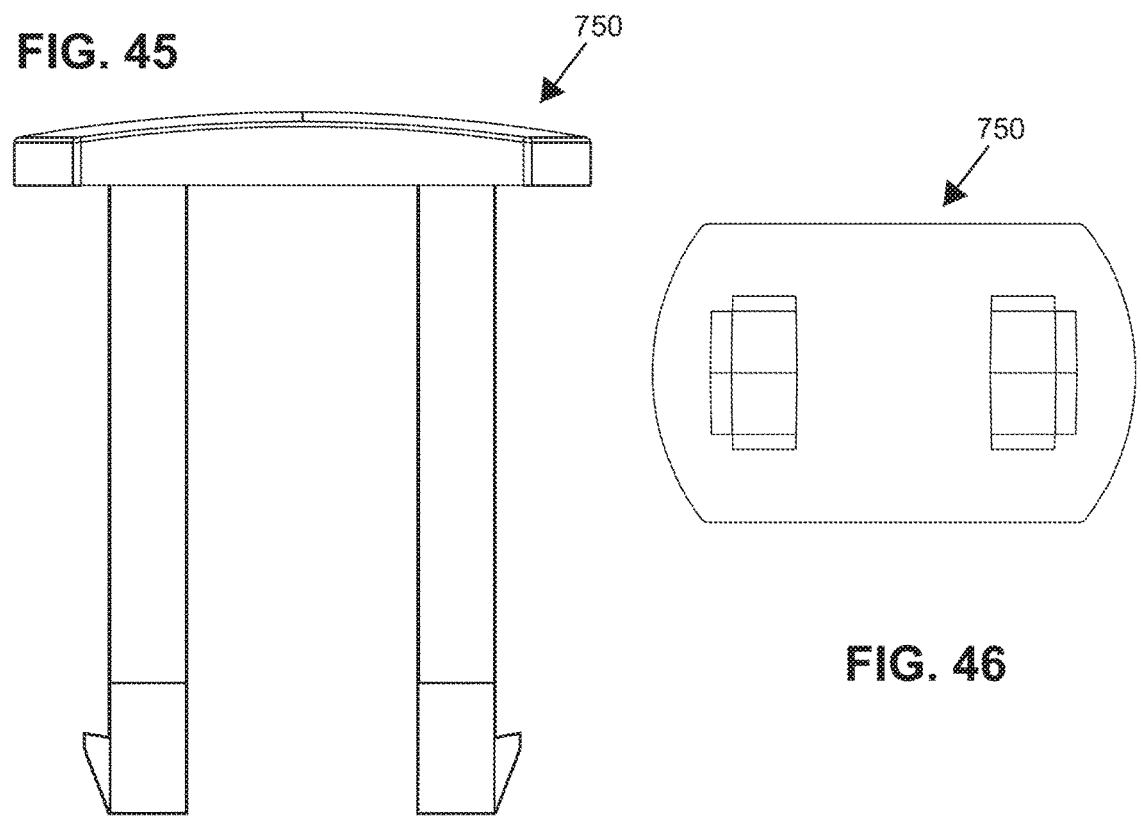
FIG. 46

FIBER OPTIC FURCATION ASSEMBLIES, METHODS, AND SYSTEMS

CROSS-REFERENCE TO RELATED APPLICATION

This application is a Continuation of U.S. patent application Ser. No. 18/067,219, filed Dec. 16, 2022, now U.S. Pat. No. 11,914,210; which is a Continuation of U.S. patent application Ser. No. 17/201,580, filed Mar. 15, 2021, now U.S. Pat. No. 11,531,177; which is a Continuation of U.S. patent application Ser. No. 16/463,308, filed on May 22, 2019, now U.S. Pat. No. 10,948,677; which is a National Stage Patent Application of PCT/US2017/063073, filed on Nov. 22, 2017; which claims the benefit of U.S. Patent Application Ser. No. 62/425,925, filed on Nov. 23, 2016; the disclosures of which are incorporated herein by reference in their entireties. To the extent appropriate, a claim of priority is made to each of the above disclosed applications.

FIELD OF DISCLOSURE

The present disclosure relates to cable fan-out assemblies, cable break-out assemblies, cable furcation assemblies, etc.

BACKGROUND

Fiber optic cable is available for use in many physical environments and in many physical variations. For example, when routing a fiber optic cable between data centers, it may be desirable to include many optical fibers within the same fiber optic cable. Certain fiber optic cables may include 288 individual optical fibers. Other fiber optic cables may include 192 or 144 optical fibers within the fiber optic cable. By including a large number of optical fibers within the fiber optic cable, many channels of fiber optic communication may be economically transmitted by the same fiber optic cable.

Upon the fiber optic cable reaching a data center, it may be desirable to distribute the optical fibers within the fiber optic cable to various points within the data center. For example, it may be desirable to distribute the 288 optical fibers in groups of 24 optical fibers. The fiber optic cable with 288 optical fibers may therefore be split up into 12 groups of 24 optical fibers each. To accommodate distributing the optical fibers, the fiber optic cable may include 12 tubes that each carry 24 optical fibers.

As fiber optic cables may carry tensile loads and/or encounter environmental hazards, an outer jacket is typically extruded over the optical fibers within the fiber optic cable to protect the optical fibers from such conditions. The fiber optic cable may also include strength members to carry tensile loads along the fiber optic cable and thereby shield the optical fibers from tensile loads. The strength members may be positioned within the outer jacket of the fiber optic cable. When breaking out or fanning out groups of optical fibers from a fiber optic cable, the cable jacket and/or the strength members may be secured to a break out housing assembly or a furcation housing assembly. The optical fibers may exit the jacket of the fiber optic cable and enter the break out housing assembly or the furcation housing assembly for distribution in a plurality of smaller fiber optic cables. The smaller fiber optic cables may also include jackets and/or strength members secured to the break out housing assembly or furcation housing assembly and thereby form a continuous protective enclosure for the optical fibers to be routed through as they transition from a single large fiber optic cable to a plurality of smaller fiber optic cables. The break out housing assembly or the furcation housing assembly may further transmit tensile loads between the single large fiber optic cable and the plurality of small fiber optic cables.

It may be desired to route the optical fibers from the single large cable to the plurality of small cables without splicing or other interruptions or connections along the optical fibers. The present disclosure addresses obstacles faced when distributing optical fibers from a single larger fiber optic cable to a plurality of smaller fiber optic cables and/or a plurality of individually buffered optical fibers, especially when the optical fibers are continuous and uninterrupted from the single larger fiber optic cable to the plurality of smaller fiber optic cables or the plurality of individually buffered optical fibers.

SUMMARY

According to the principles of the present disclosure, a family of modular fan-out building blocks may be assembled to provide a fan-out from a single large fiber optic cable to a plurality of smaller fiber optic cables or individually buffered optical fibers. Support is provided for a wide variety of connector types to terminate the fiber optic cables. A wide variety of panels may be serviced by the fiber optic cables. The furcation assembly does not require over-molding and does not require the use of epoxy.

The modular design allows for connection between the large fiber optic cable and the plurality of smaller fiber optic cables via a furcation housing that is compact, easy to assemble, and useable with a wide variety of panels. The modular design thereby provides a cost savings in producing such fan-out products.

According to the principles of the present disclosure, cables including micro-tubes and/or micro-tube cable structures are compatible with the modular design of the fan-out building blocks. Micro-tube cables and/or micro-tube cable structures may be smaller in size (e.g., outside diameter) than other cables and/or cable structures.

These and other features and advantages will be apparent from a reading of the following detailed description and a review of the associated drawings. It is to be understood that both the forgoing general description and the following detailed description are explanatory only and are not restrictive of the broad aspects of the disclosure.

BRIEF DESCRIPTION OF THE DRAWINGS

FIG. 42 is a plan view of the cable anchor of FIG. 23.

FIG. 43 is an end view of the cable anchor of FIG. 23.

FIG. 44 is a perspective view of a plug suitable for use in ports of various furcation assemblies, according to the principles of the present disclosure, in lieu of the cable anchor of FIG. 23.

FIG. 45 is a plan view of the plug of FIG. 44.

FIG. 46 is an end view of the plug of FIG. 44.

DETAILED DESCRIPTION

Figure 1:
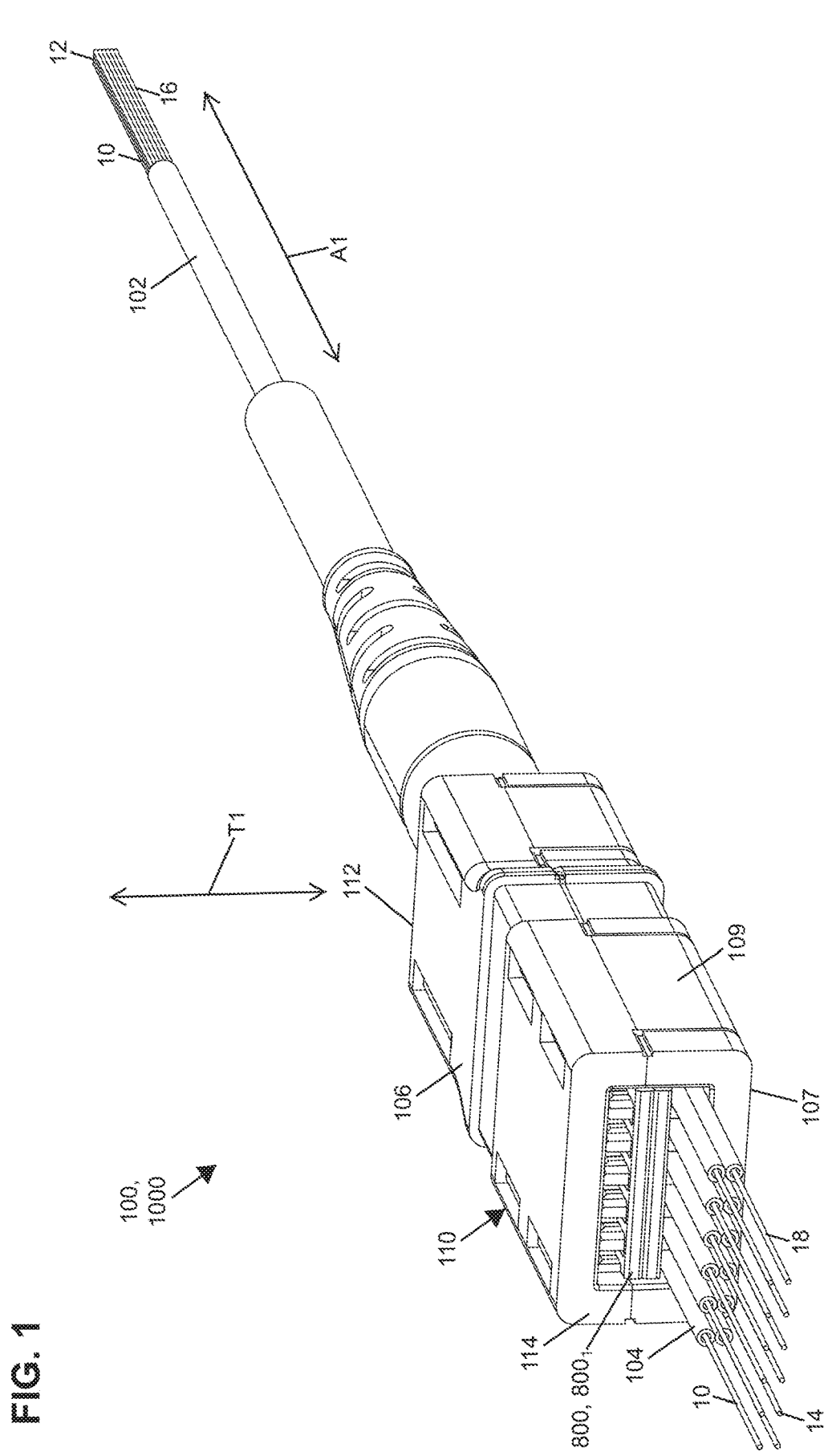
FIG. 1 is a perspective view of a furcation assembly according to the principles of the present disclosure.

The present disclosure relates to a family of furcation assemblies for use in distributing optical fibers from a trunk cable to a plurality of furcation cables. Six example embodiments are described and illustrated herein. It is understood that various features and combinations of features may be arranged to derive additional furcation assemblies. In particular, a furcation assembly 100 is illustrated at FIGS. 1-15, a furcation assembly 200 is illustrated at FIGS. 16-25, a furcation assembly 300 is illustrated at FIGS. 26-32, a furcation assembly 400 is illustrated at FIGS. 33-39 and 47, a furcation assembly 500 is illustrated at FIGS. 48-55, and a furcation assembly 600 is illustrated at FIGS. 56-64.

The furcation assemblies 100, 200, 300, 400, 500, 600 feature modular construction that facilitates constructing 8-fold to 288-fold cable assemblies. The furcation assemblies support virtually all connector types and all panels. The furcation assemblies 100, 200, 300, 400, 500, 600 are compact and smaller than equivalent prior art furcation assemblies. In addition, over-molding is not required in assembling the furcation assemblies. No epoxy is needed in assembling the furcation assemblies. Micro-tube cables and/or micro-tube cable structures, with smaller cable and/or cable structure dimensions, may be used with the furcation assemblies 100, 200, 300, 400, 500, 600. As will be described in detail hereinafter, the furcation assemblies 100, 200, 300, 400, 500, 600 are easy to assemble, include a modular design, and provide simple installation. Significant cost savings are expected in the use of the furcation assemblies 100, 200, 300, 400, 500, 600 compared to various prior art furcation assemblies that are similar in capacity and function.

Figure 13:
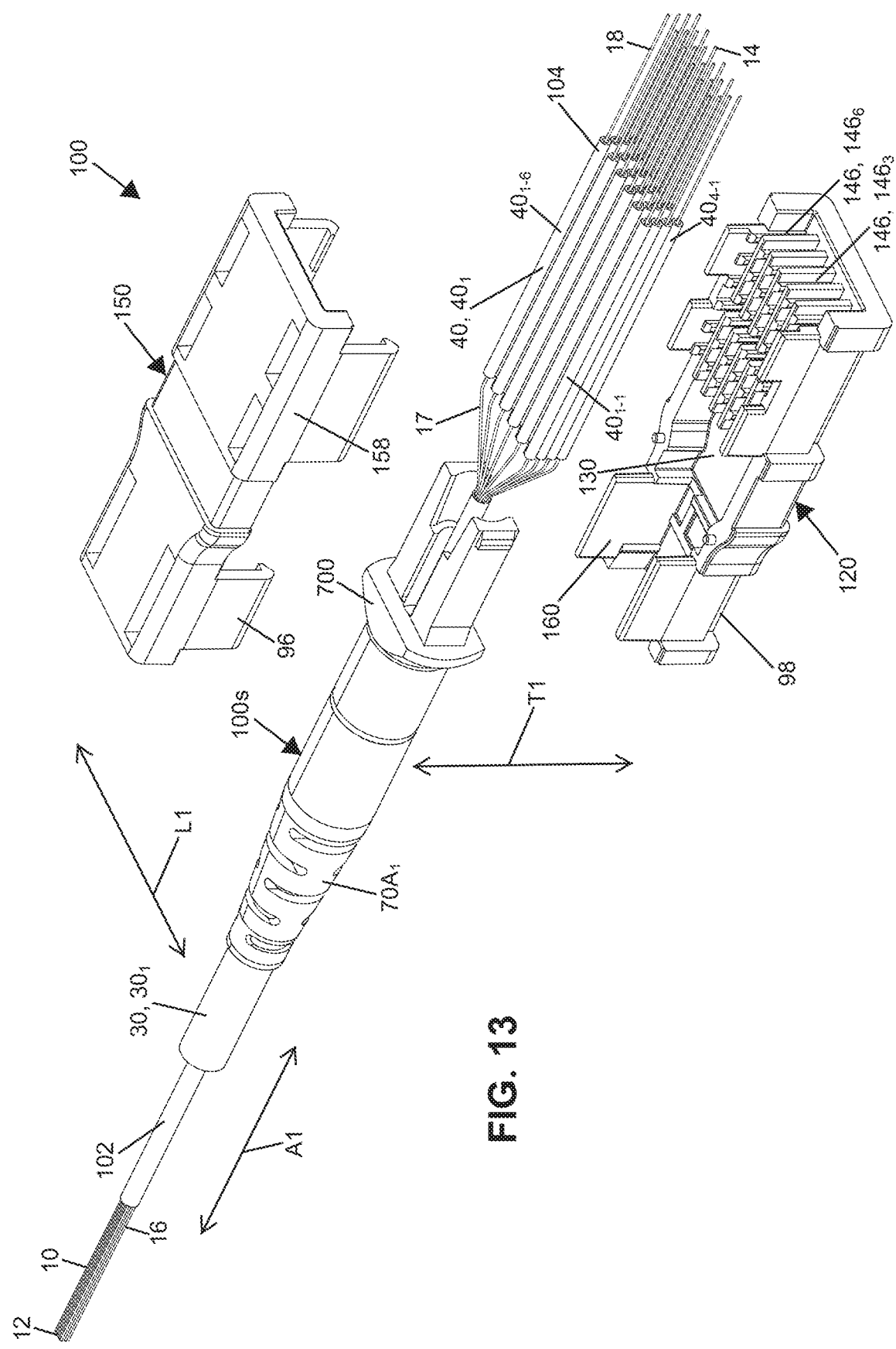
FIG. 13 is an exploded perspective view of the furcation assembly of FIG. 1.
Figure 14:
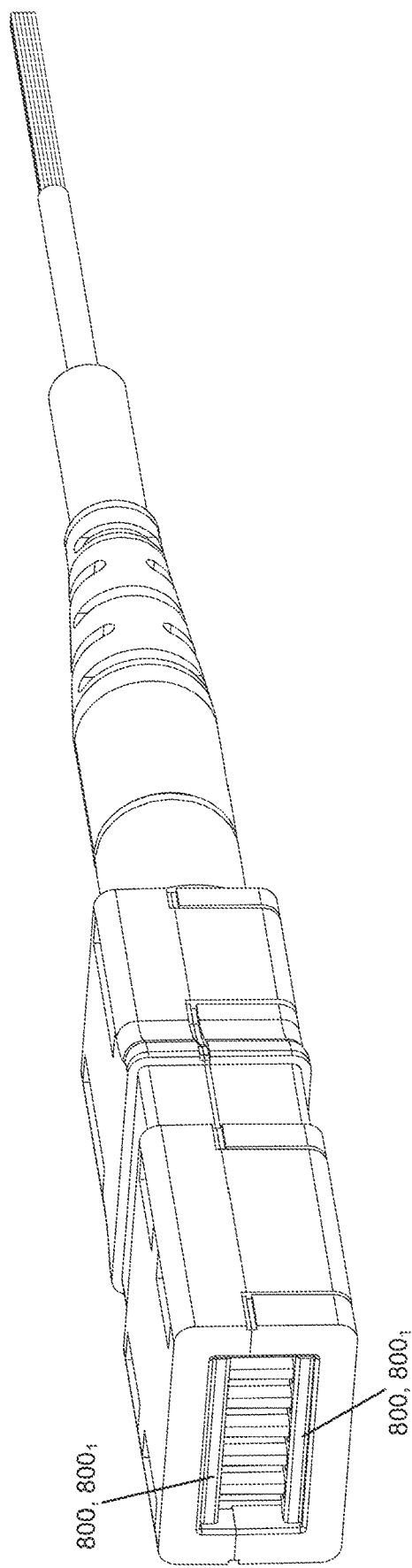
FIG. 14 is a perspective view of the furcation assembly of FIG. 1, but without the plurality of optical fibers or related cable components exiting the housing of FIG. 6.
Figure 15:
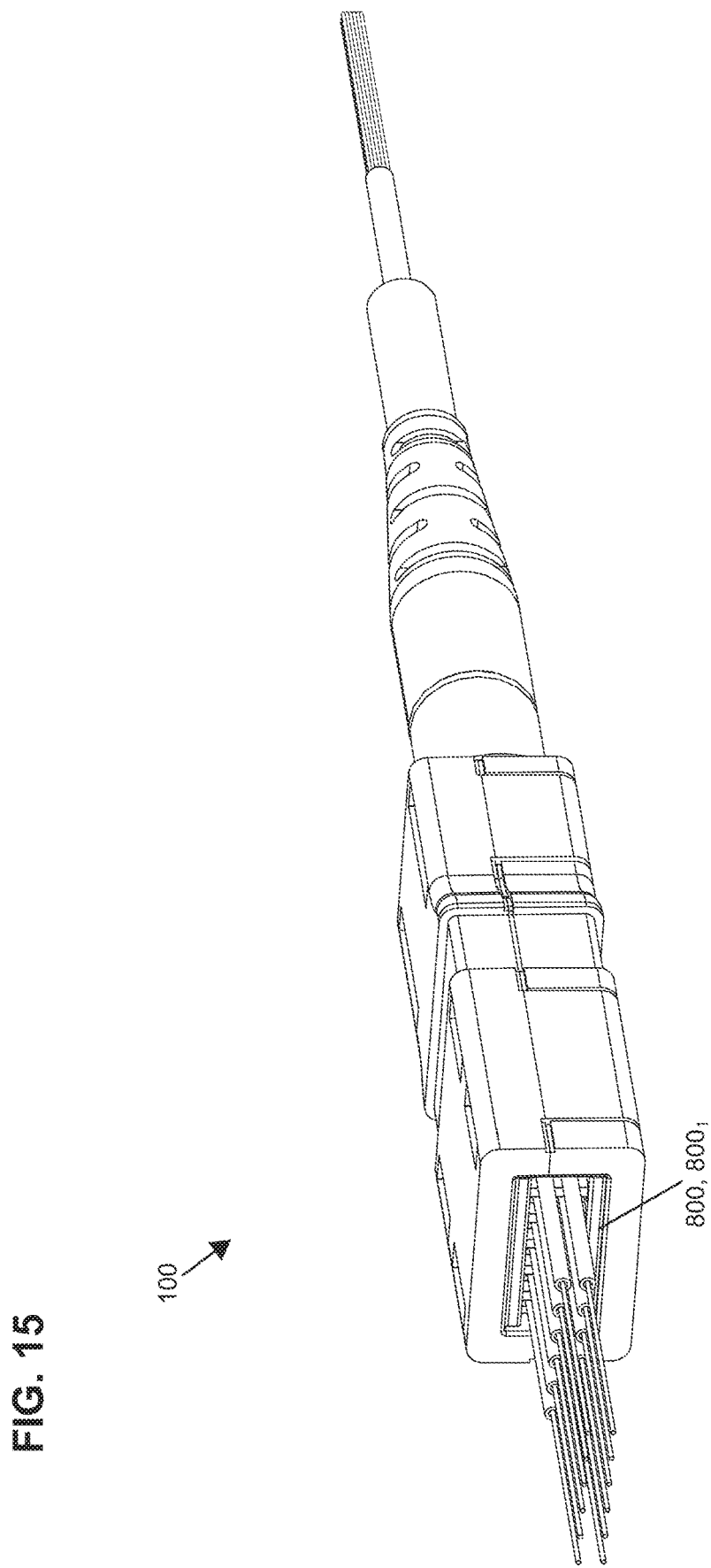
FIG. 15 is a perspective view of the furcation assembly of FIG. 1.
Figure 16:
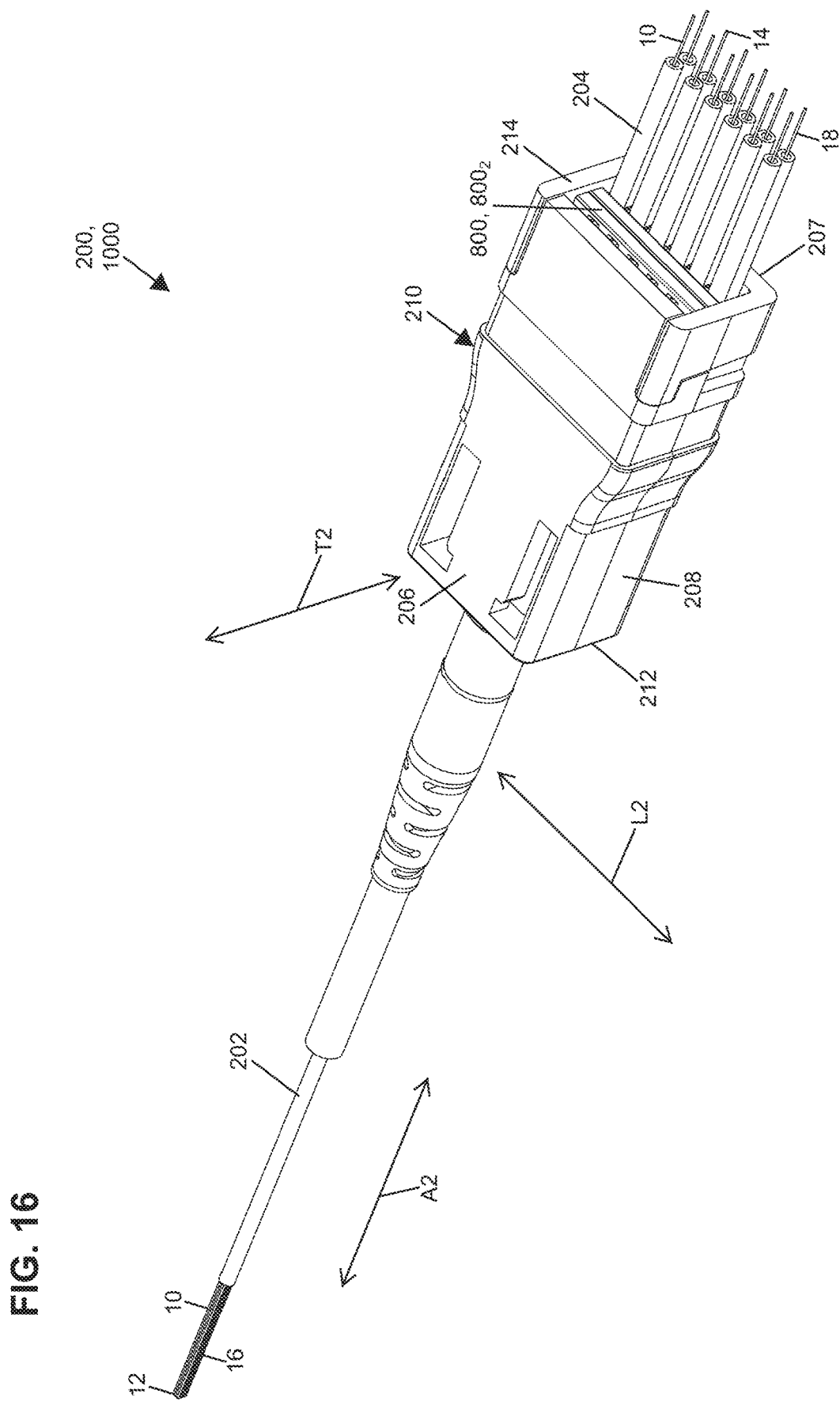
FIG. 16 is a perspective view of another furcation assembly according to the principles of the present disclosure.
Figure 17:
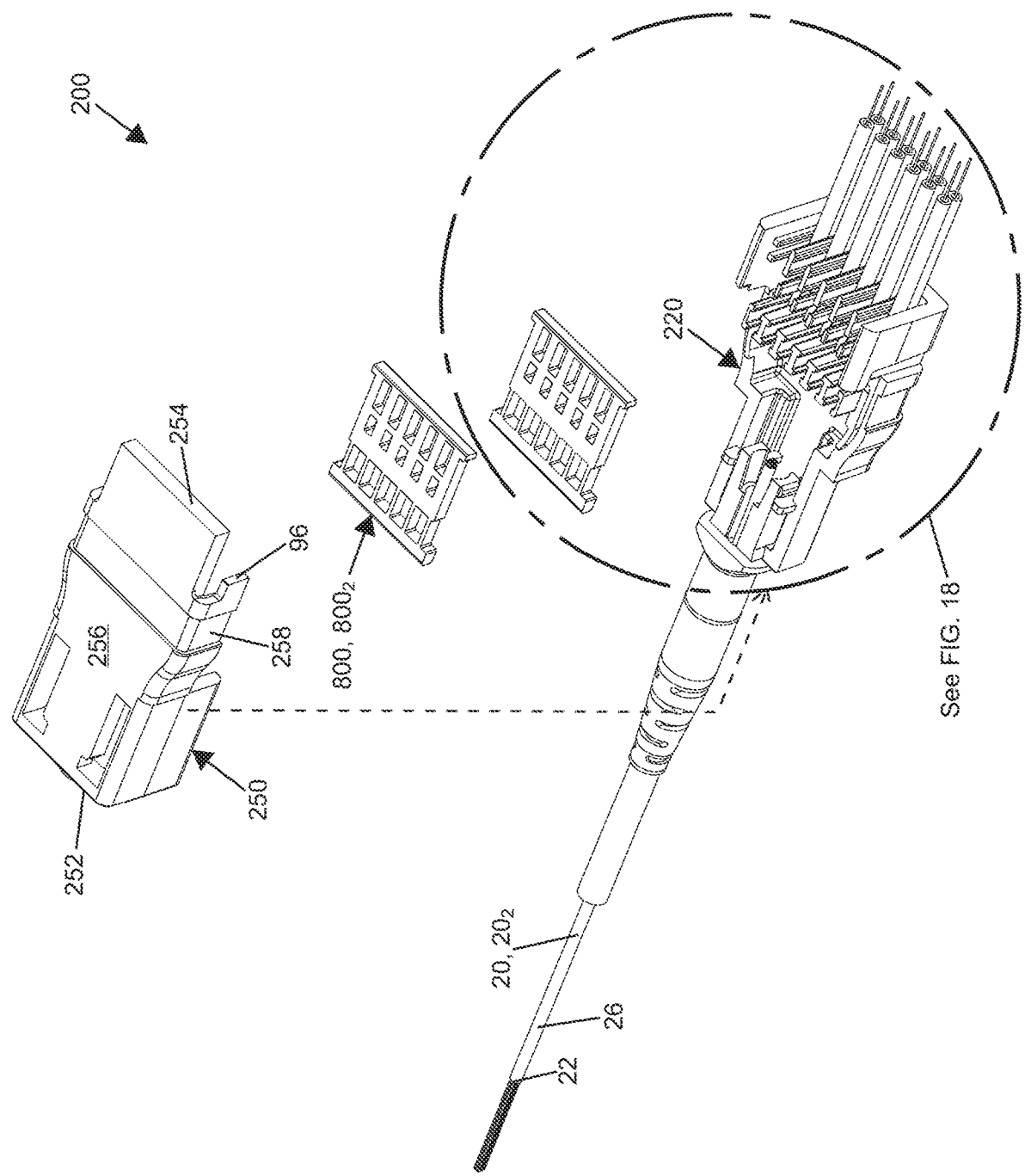
FIG. 17 is an exploded perspective view of the furcation assembly of FIG. 16.
Figure 26:
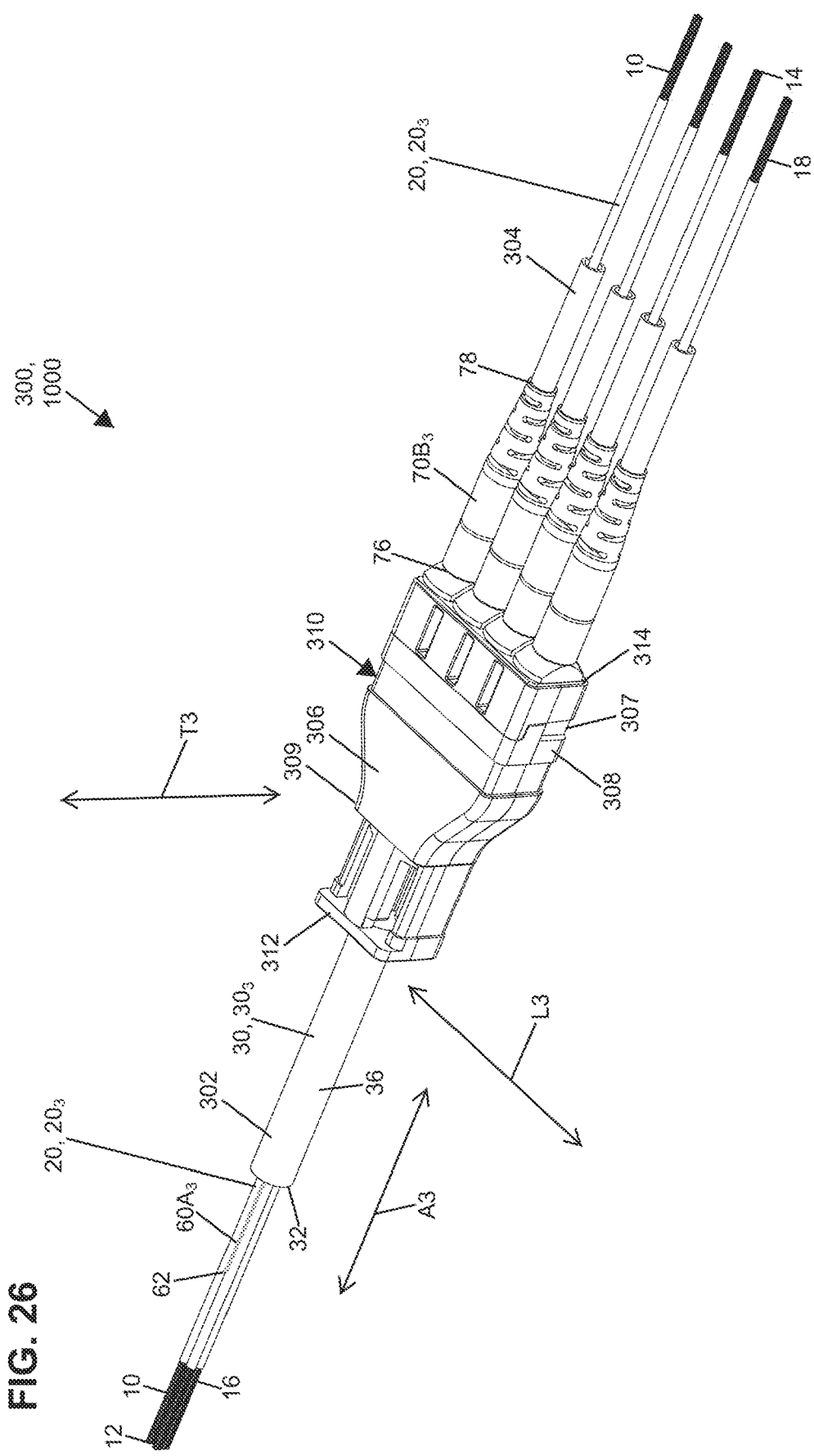
FIG. 26 is a perspective view of still another furcation assembly according to the principles of the present disclosure.
Figure 33:
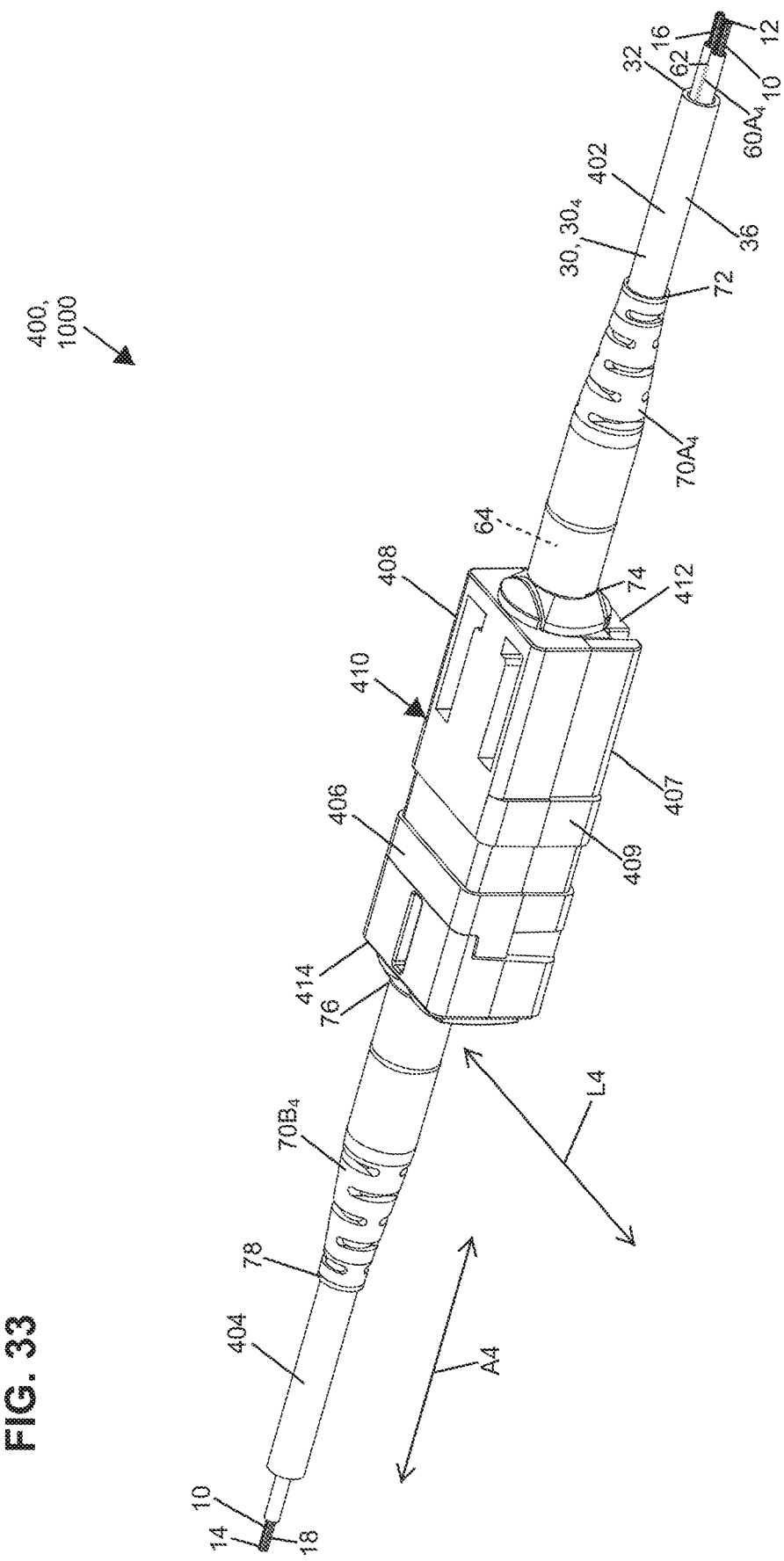
FIG. 33 is a perspective view of yet another furcation assembly according to the principles of the present disclosure.
Figure 35:
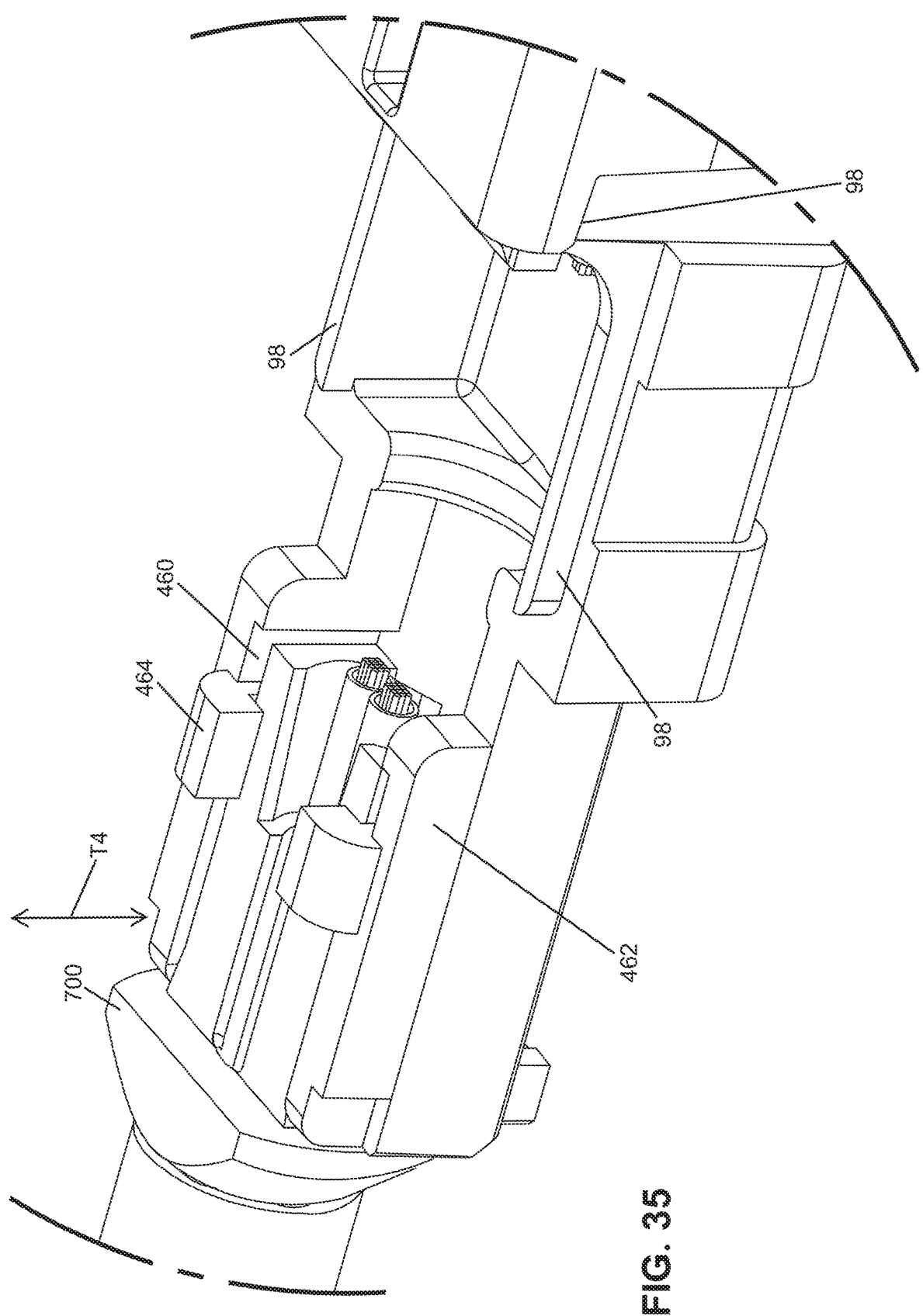
FIG. 35 is an enlarged portion of FIG. 34.
Figure 48:
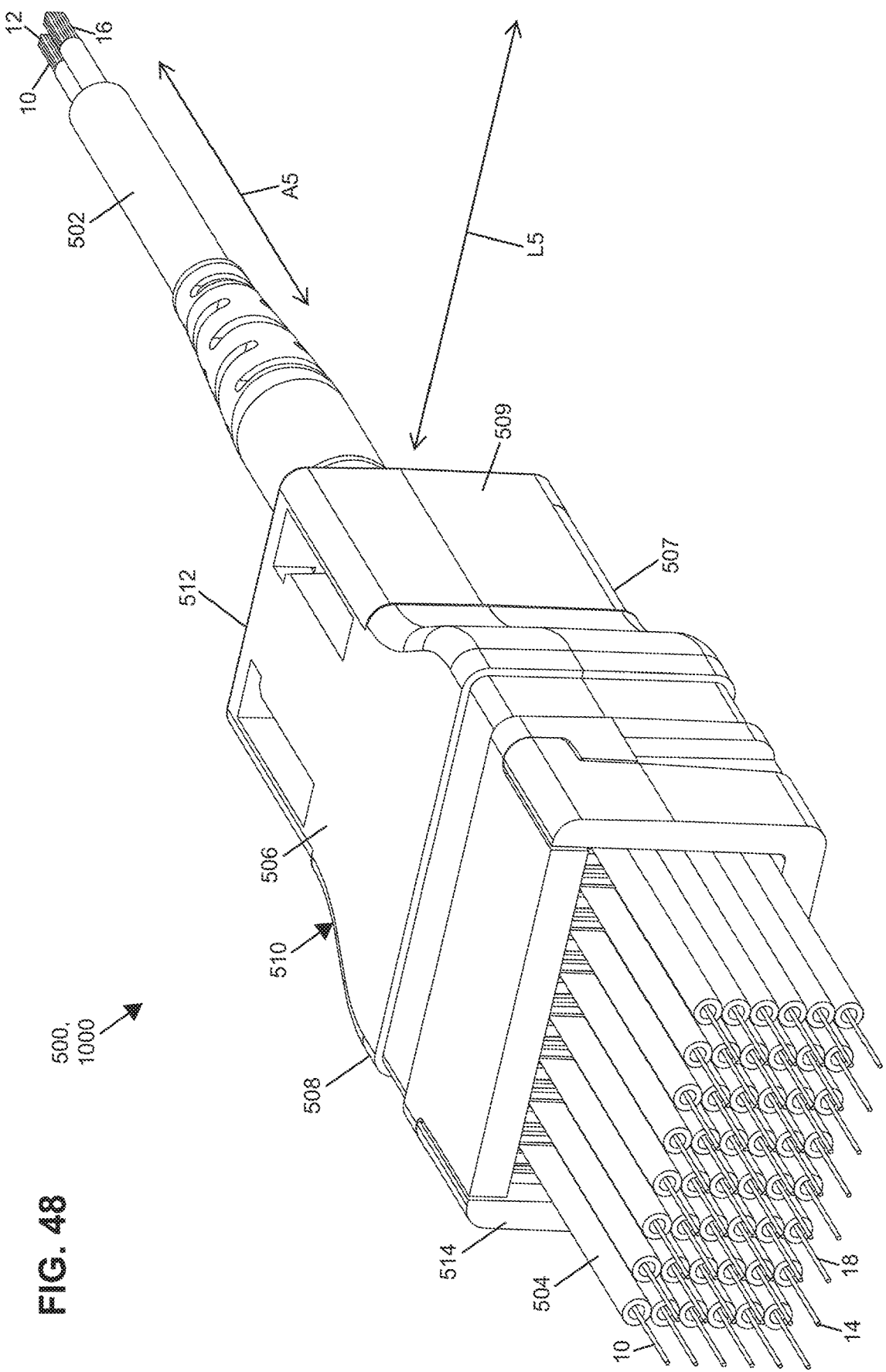
FIG. 48 is a perspective view of still another furcation assembly according to the principles of the present disclosure.
Figure 49:
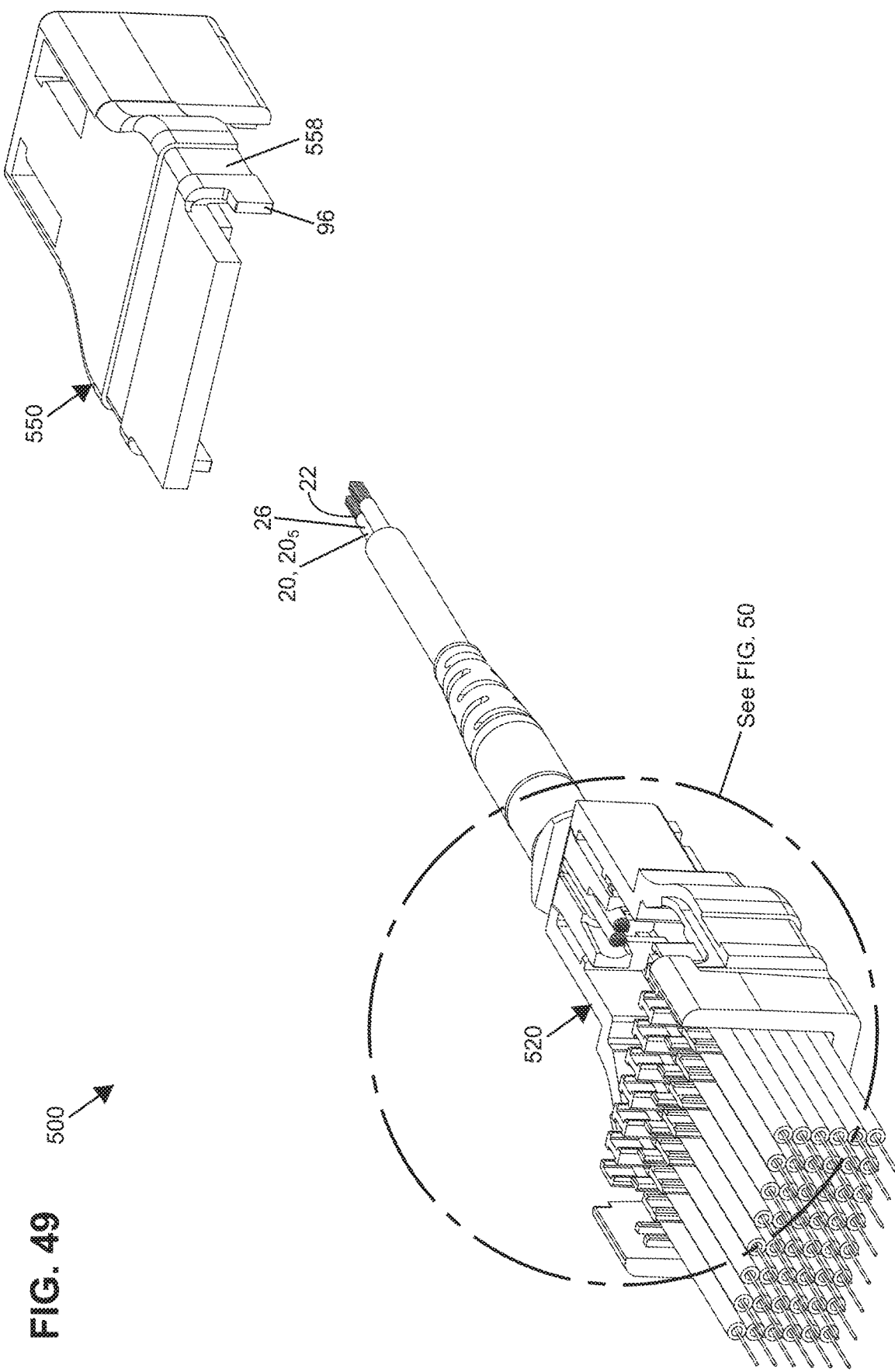
FIG. 49 is an exploded perspective view of the furcation assembly of FIG. 48.
Figure 50:
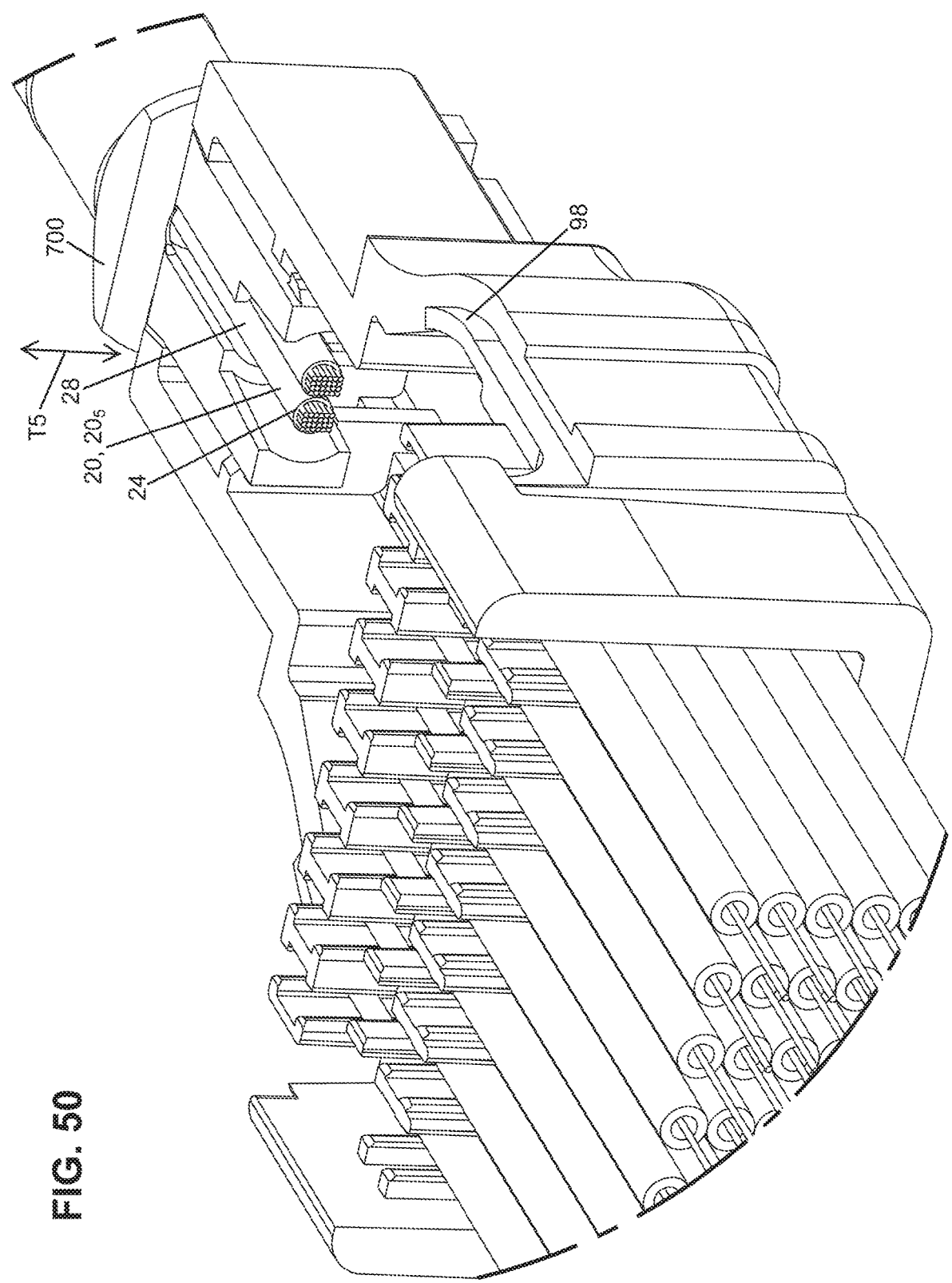
FIG. 50 is an enlarged portion of FIG. 49.
Figure 56:
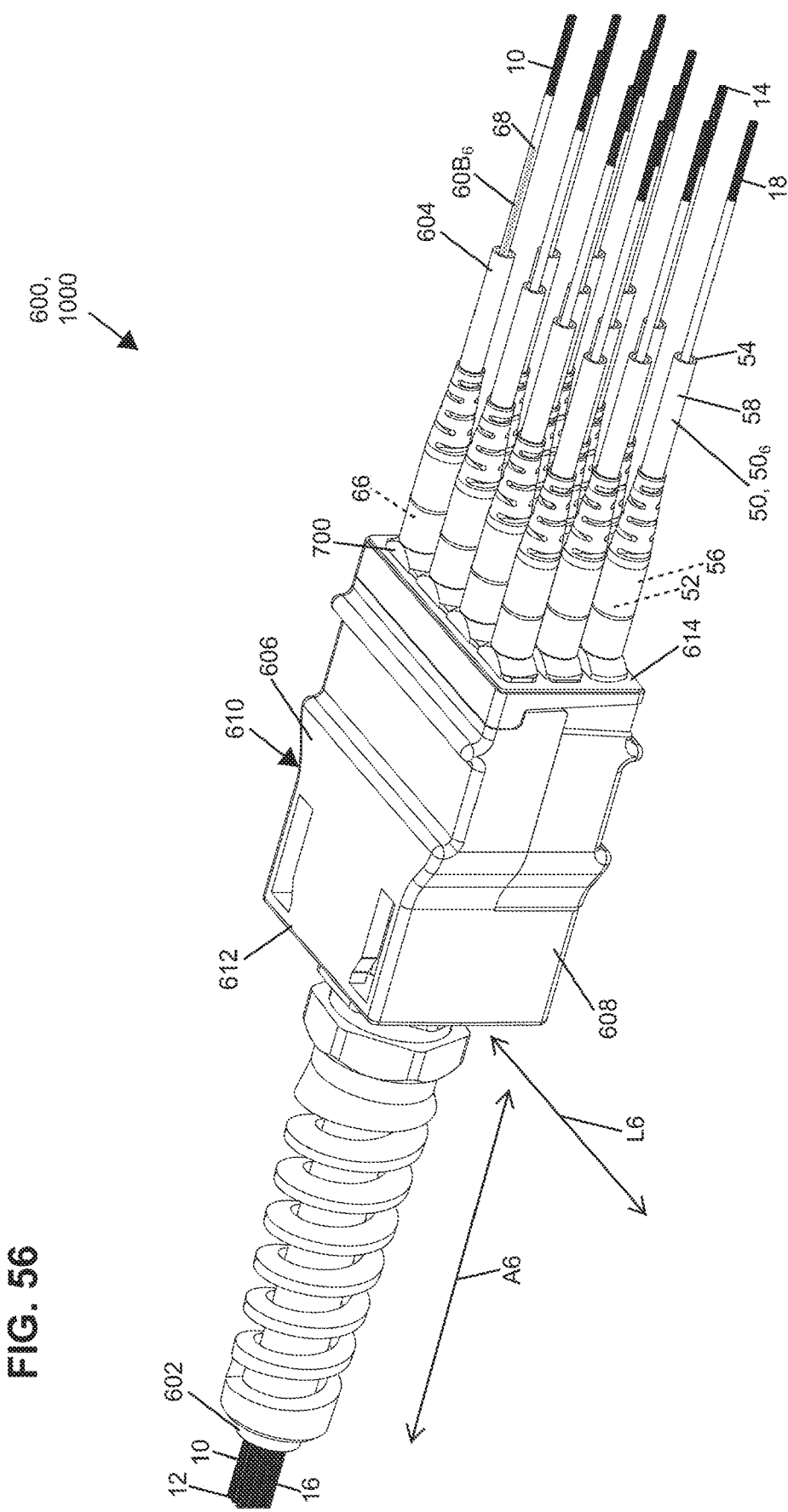
FIG. 56 is a perspective view of yet another furcation assembly according to the principles of the present disclosure.
Figure 58:
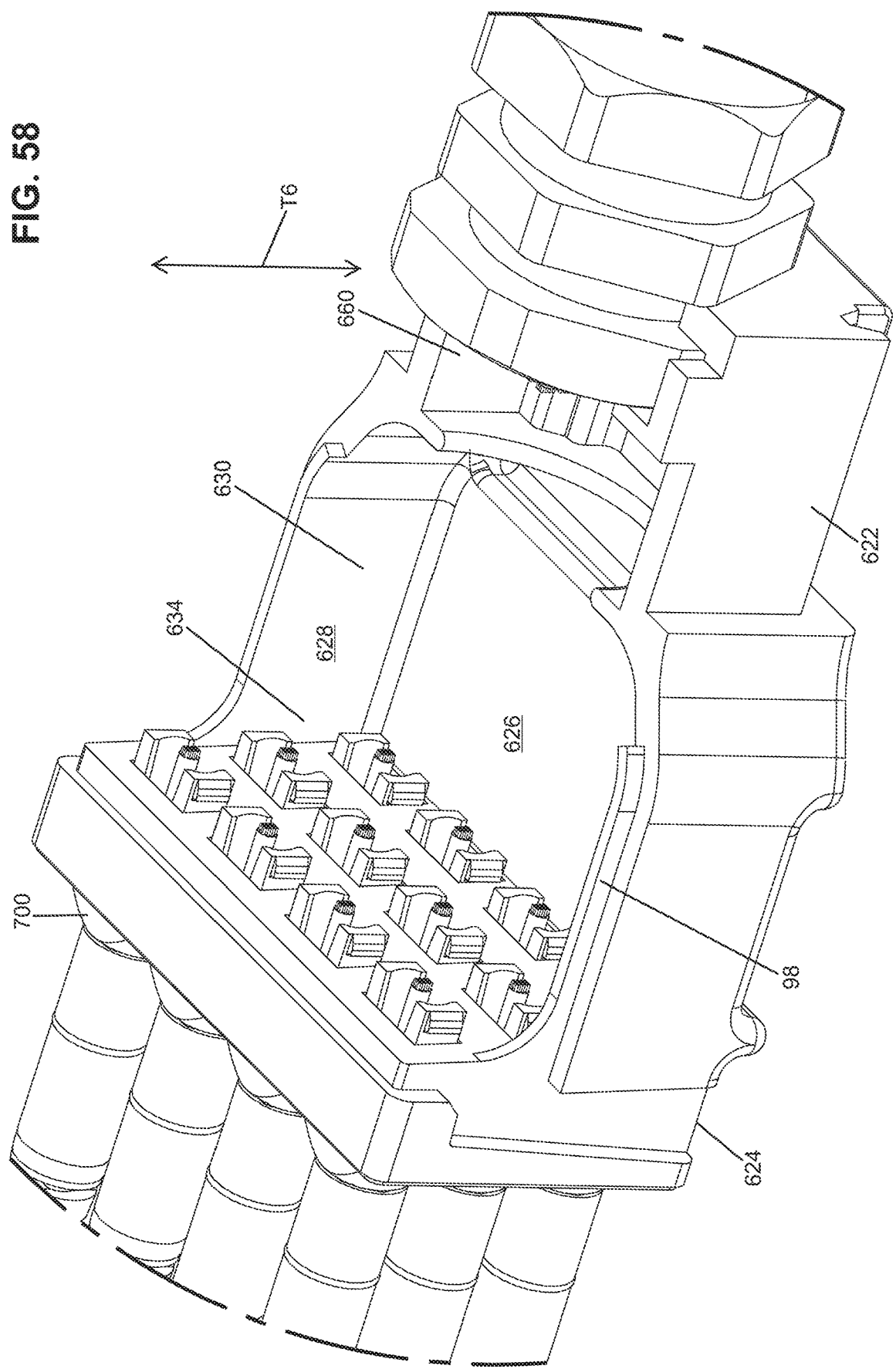
FIG. 58 is an enlarged portion of FIG. 57.
Figure 59:
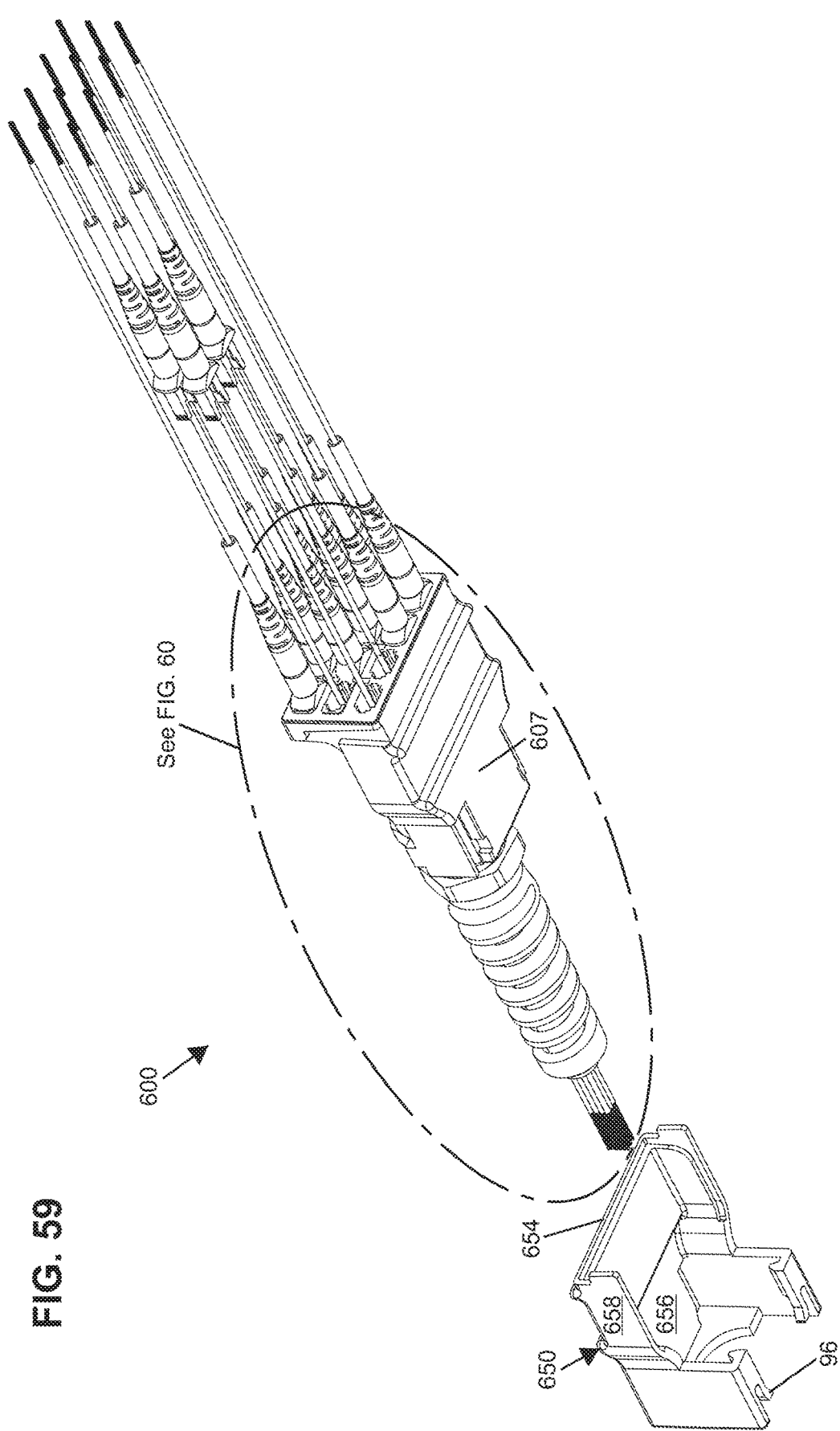
FIG. 59 is an exploded perspective view of the furcation assembly of FIG. 56.
Figure 60:
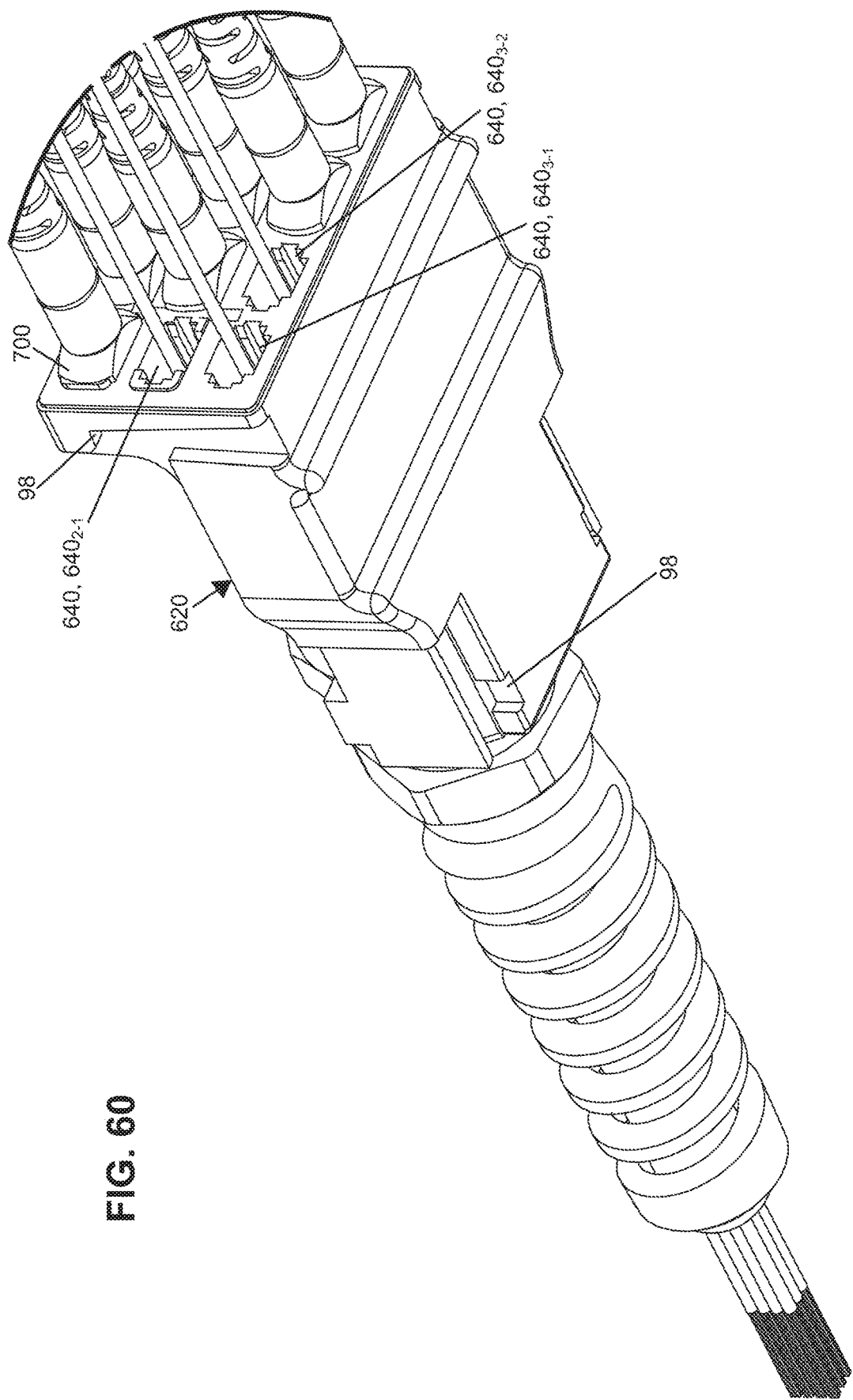
FIG. 60 is an enlarged portion of FIG. 59.
Figure 61:
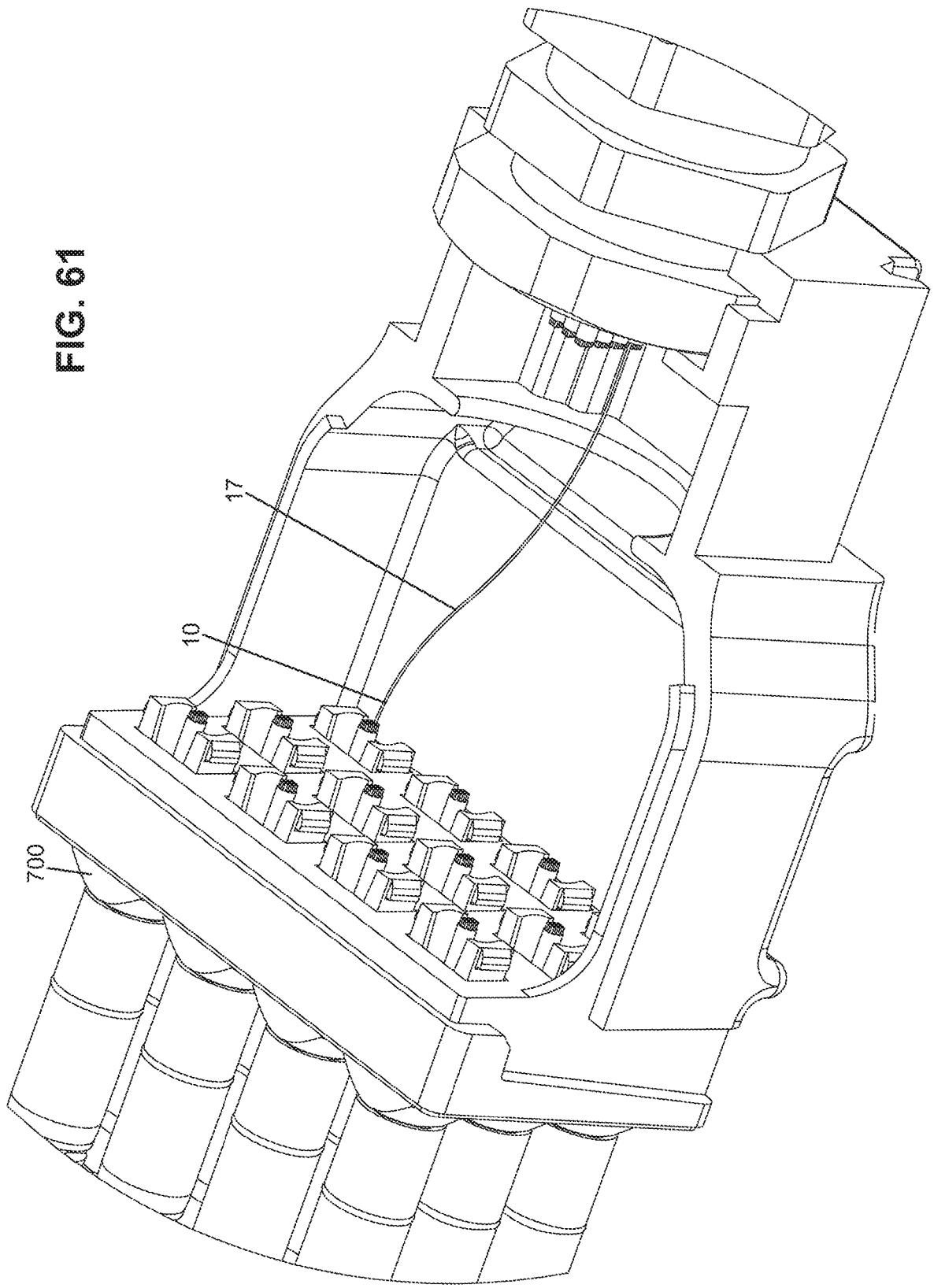
FIG. 61 is a partial perspective view of the furcation assembly of FIG. 56, but with a cover of a housing of the furcation assembly removed.
Figure 62:
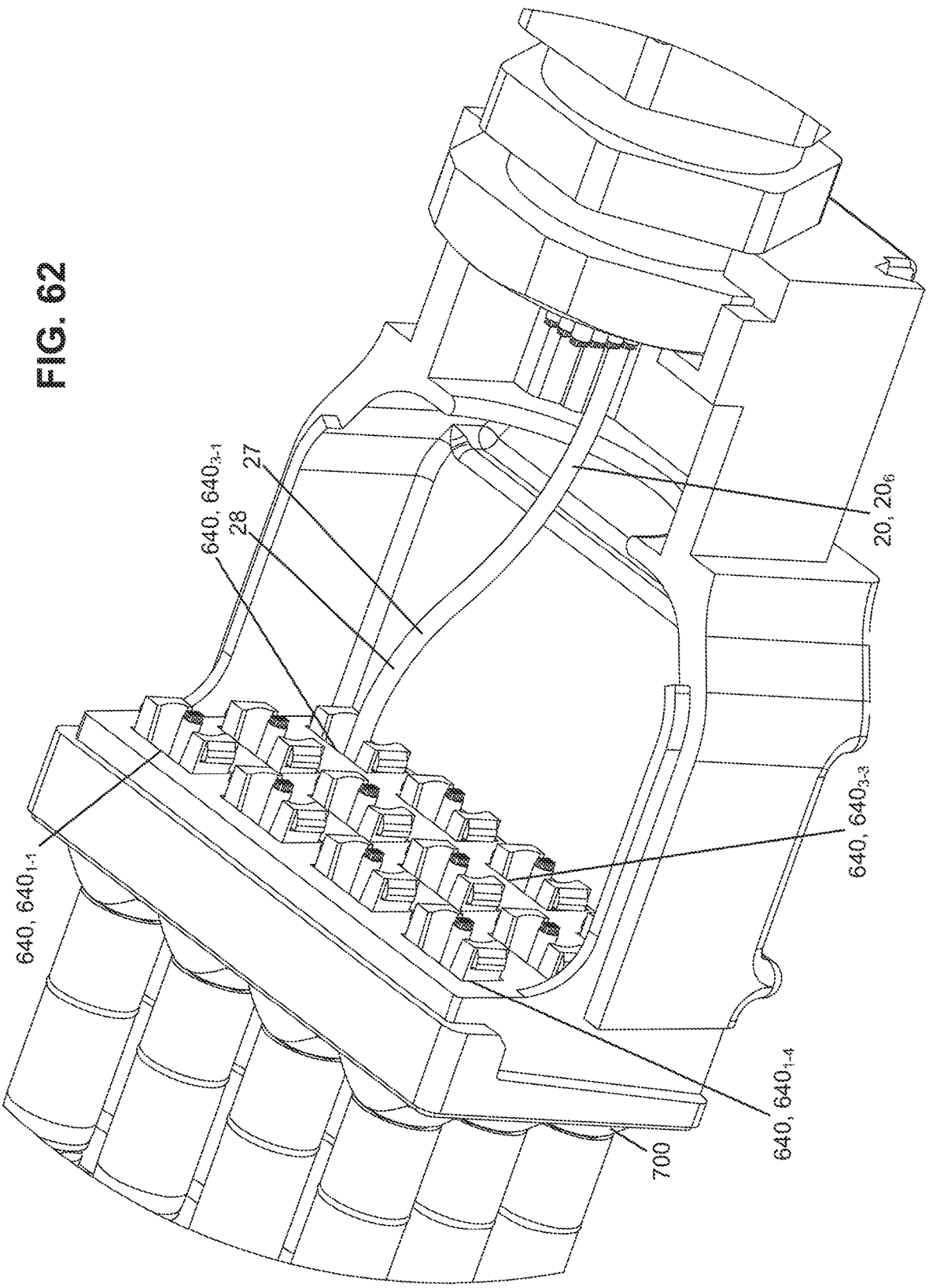
FIG. 62 is another partial perspective view of the furcation assembly of FIG. 56, but with the cover of the housing removed.

As will be further described hereinafter, the furcation assemblies 100, 200, 300, 400, 500, 600 provide for drop-in assembly techniques when building up the furcation assembly. In particular, as illustrated at FIGS. 1 and 13, the furcation assembly 100 includes a housing 110 that defines an axial direction A1, a transverse direction T1, and a lateral direction L1. Likewise, the furcation assembly 200 includes a housing 210 that defines an axial direction A2, a transverse direction T2, and a lateral direction L2, as illustrated at FIG. 16. Similarly, the furcation assembly 300 includes a housing 310 that defines an axial direction A3, a transverse direction T3, and a lateral direction L3, as illustrated at FIG. 26. Likewise, the furcation assembly 400 includes a housing 410 that defines an axial direction A4 and a lateral direction L4, as illustrated at FIG. 33, and further defines a transverse direction T4, as illustrated at FIG. 35. Likewise, the furcation assembly 500 includes a housing 510 that defines an axial direction A5 and a lateral direction L5, as illustrated at FIG. 48, and further defines a transverse direction T5, as illustrated at FIG. 50. Similarly, the furcation assembly 600 includes a housing assembly 610 that defines an axial direction A6 and a lateral direction L6, as illustrated at FIG. 56, and further defines a transverse direction T6, as illustrated at FIG. 58. The axial directions A1, A2, A3, A4, A5, A6 are parallel to or substantially parallel to or generally parallel to a plurality of optical fibers 10 that are carried by the respective furcation assemblies 100, 200, 300, 400, 500, 600, when laid straight without substantial bending of the optical fibers 10. It is appreciated that local curvature and bending of the optical fibers 10 occurs along a transition portion 17 within the housings 110, 210, 310, 410, 510, 610 as the optical fibers 10 are distributed. Nonetheless, portions of the optical fibers 10, when laid straight outside of the housings 110, 210, 310, 410, 510, 610, define an axial direction that is parallel or substantially parallel to the axial directions A1, A2, A3, A4, A5, A6, defined by the housings 110, 210, 310, 410, 510, 610, respectively. The transverse directions T1, T2, T3, T4, T5, T6 are perpendicular or substantially perpendicular to the respective axial directions A1, A2, A3, A4, A5, A6. The lateral directions L1, L2, L3, L4, L5, L6 are perpendicular or substantially perpendicular to both the respective axial directions A1, A2, A3, A4, A5, A6 and the respective transverse directions T1, T2, T3, T4, T5, T6.

As illustrated at FIG. 1, the furcation assembly 100 includes a plurality of optical fibers 10 that extends between a first end 102 and a second end 104 of the furcation assembly 100. Each of the optical fibers 10 extends between a first end 12 and a second end 14. As illustrated at FIG. 13, at the first end 102, the optical fibers 10 are enclosed within a single jacket 30. In particular, the optical fibers 10 at the first end 102 are enclosed within a single jacket $30_1$. The jacket 30, $30_1$ may be referred to as a main jacket and/or a cable portion of the furcation assembly 100 covered by the jacket 30, $30_1$ may be identified as a main cable portion. As also illustrated at FIG. 13, the optical fibers 10 of the furcation assembly 100 are each individually enclosed within a plurality of tubes 40 at the second end 104 of the furcation assembly 100. In particular, the furcation tube 40 of the furcation assembly 100 is illustrated as a furcation tube $40_1$. As further illustrated at FIG. 13, the plurality of furcation tubes 40 may be identified by row and column positions with subscripts. In particular, the subscripts N and M may be used. As illustrated at FIG. 13, the furcation tube $40_{1\text{-}6}$ refers to the furcation tube 40 at a first row and a sixth column. In general, furcation tubes $40_{N\text{-}M}$ refers to the furcation tube 40 at the Nth row and the Mth column.

To assemble the furcation assembly 100, jacket $30_1$ and the plurality of furcation tubes $40_{1\text{-}1}$ to $40_{N\text{-}M}$ may be previously assembled and/or preassembled over the plurality of optical fibres 10 in a sub-assembly 100s (see FIG. 13). The plurality of optical fibers 10 extend continuously through the furcation assembly 100 and sub-assembly 100s.

As illustrated at FIGS. 1, 4, 5, and 13, the jacket $30_1$ and the plurality of furcation tubes $40_{1\text{-}1}$ to $40_{N\text{-}M}$ are shown with lengths that are within the same order of magnitude of a length of the housing 110. However, in many installations, the jacket $30_1$ and/or the furcation tubes $40_{1\text{-}1}$ to $40_{N\text{-}M}$ may be several orders of magnitude longer than the length of the housing 110.

Figure 3:
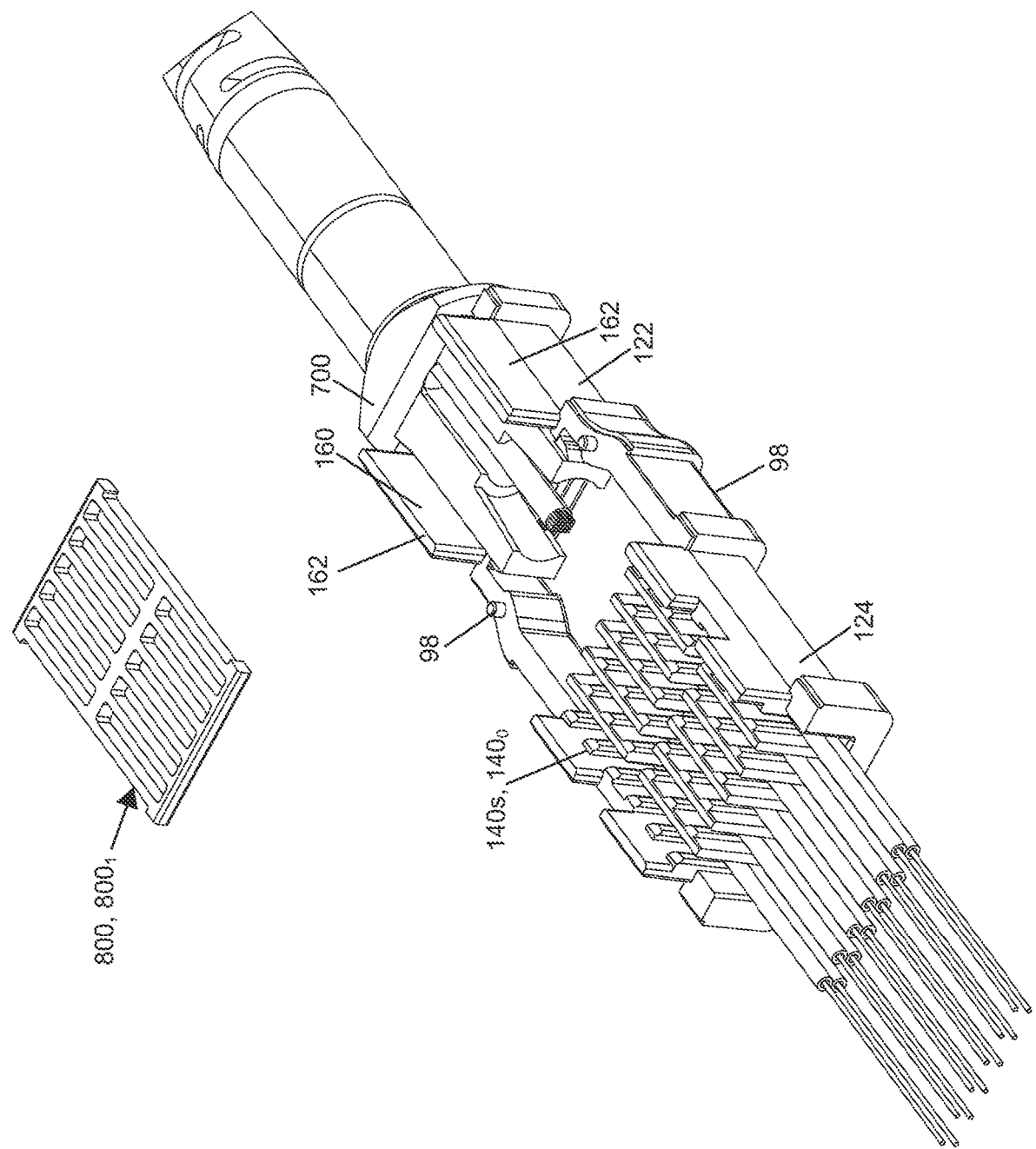
FIG. 3 is an enlarged portion of FIG. 2.
Figure 6:
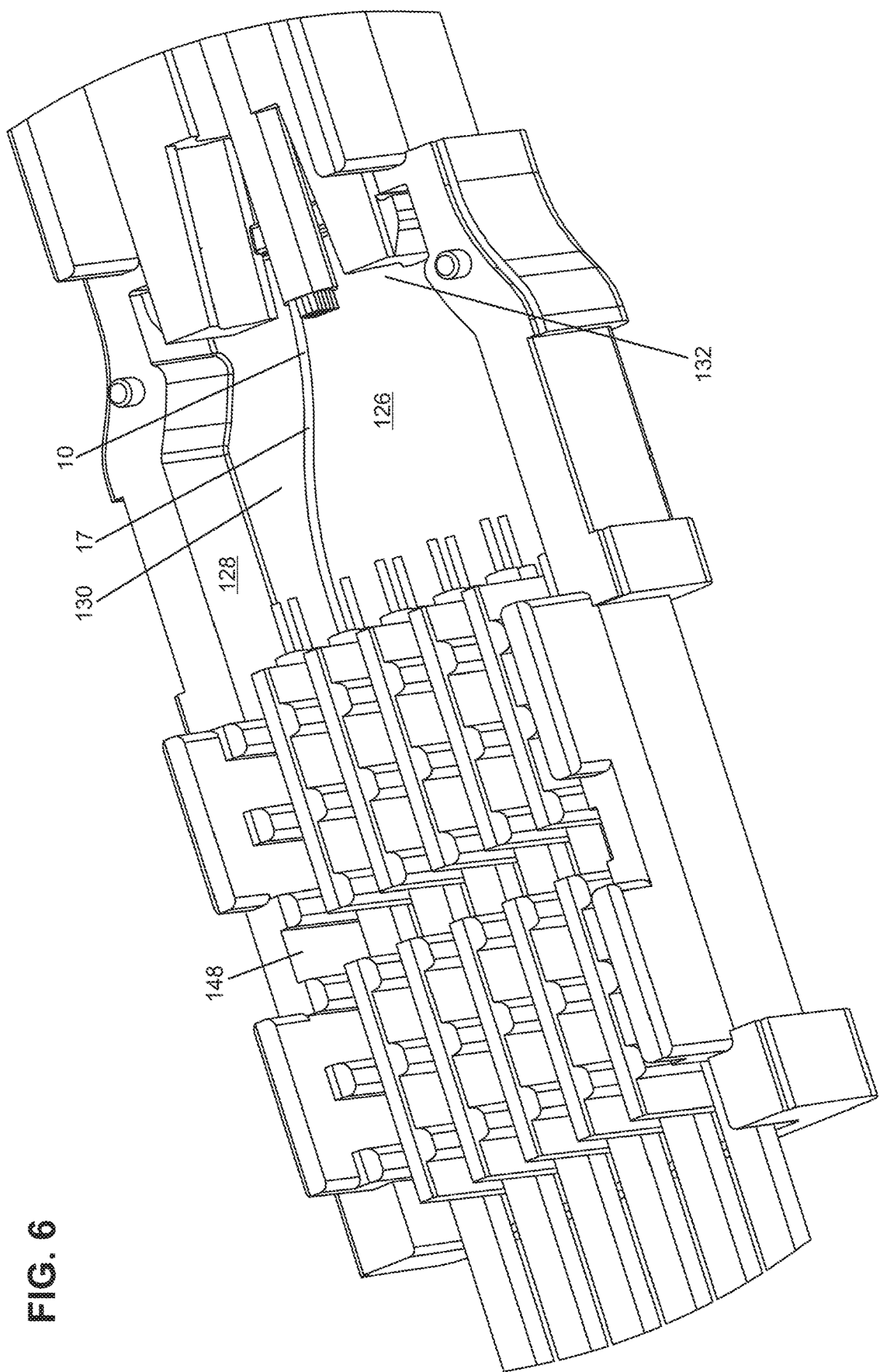
FIG. 6 is a partial perspective view of the furcation assembly of FIG. 1 with a cover of a housing of the furcation assembly removed.
Figure 7:
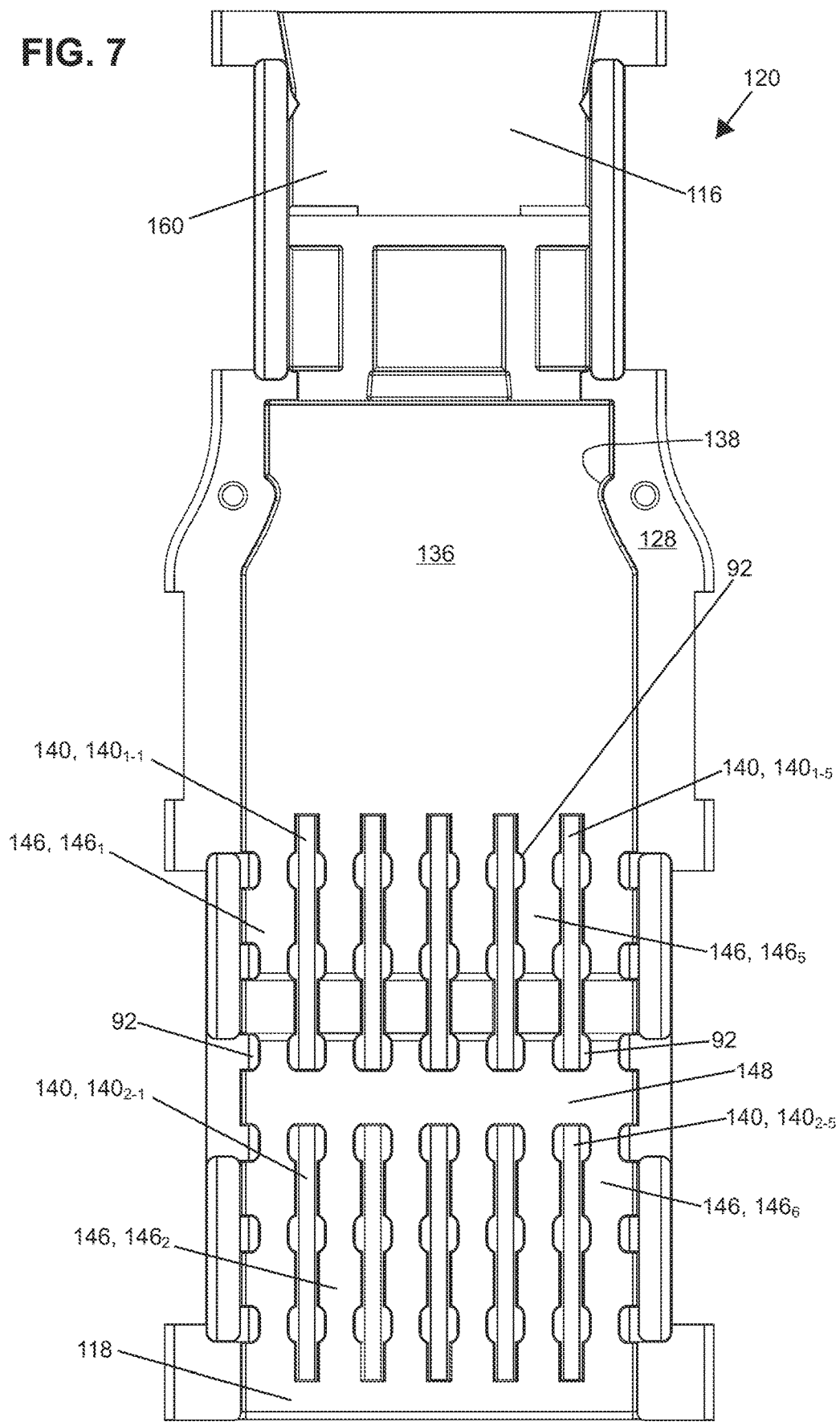
FIG. 7 is a plan view of a base of the housing of the furcation assembly of FIG. 1.

To accommodate assembly of the plurality of optical fibers 10, the plurality of furcation tubes $40_{1\text{-}1}$ to $40_{N\text{-}M}$, and the jacket $30_1$ (i.e., the sub-assembly 100s) into the housing 110, the housing 110 may include a main body 120 with a removable cover 150. As illustrated at FIGS. 6 and 13, the main body 120 includes a transition cavity 130 that opens in the transverse direction T1. In addition, the main body 120 defines a drop-in channel 160, as illustrated at FIGS. 3 and 13, and a plurality of longitudinal channels 146, as illustrated at FIGS. 7 and 13. The longitudinal channels 146 and the drop-in channel 160 also open in the transverse direction T1.

As illustrated at FIG. 1, the housing 110 extends between a first end 112 and a second end 114. As illustrated, the main body 120 of the housing 110 also extends between the first end 112 and the second end 114. As illustrated at FIG. 3, the main body 120 includes a first end portion 122 adjacent the first end 112 and further includes a second end portion 124 adjacent the second end 114. The transition cavity 130 of the main body 120 is positioned between the first end portion 122 and the second end portion 124. The axial direction A1 extends through the first end portion 122, the transition cavity 130, and the second end portion 124 of the main body 120. The main body 120 of the housing 110 opens in the transverse direction T1 along its length from the first end 112 to the second end 114.

Figure 2:
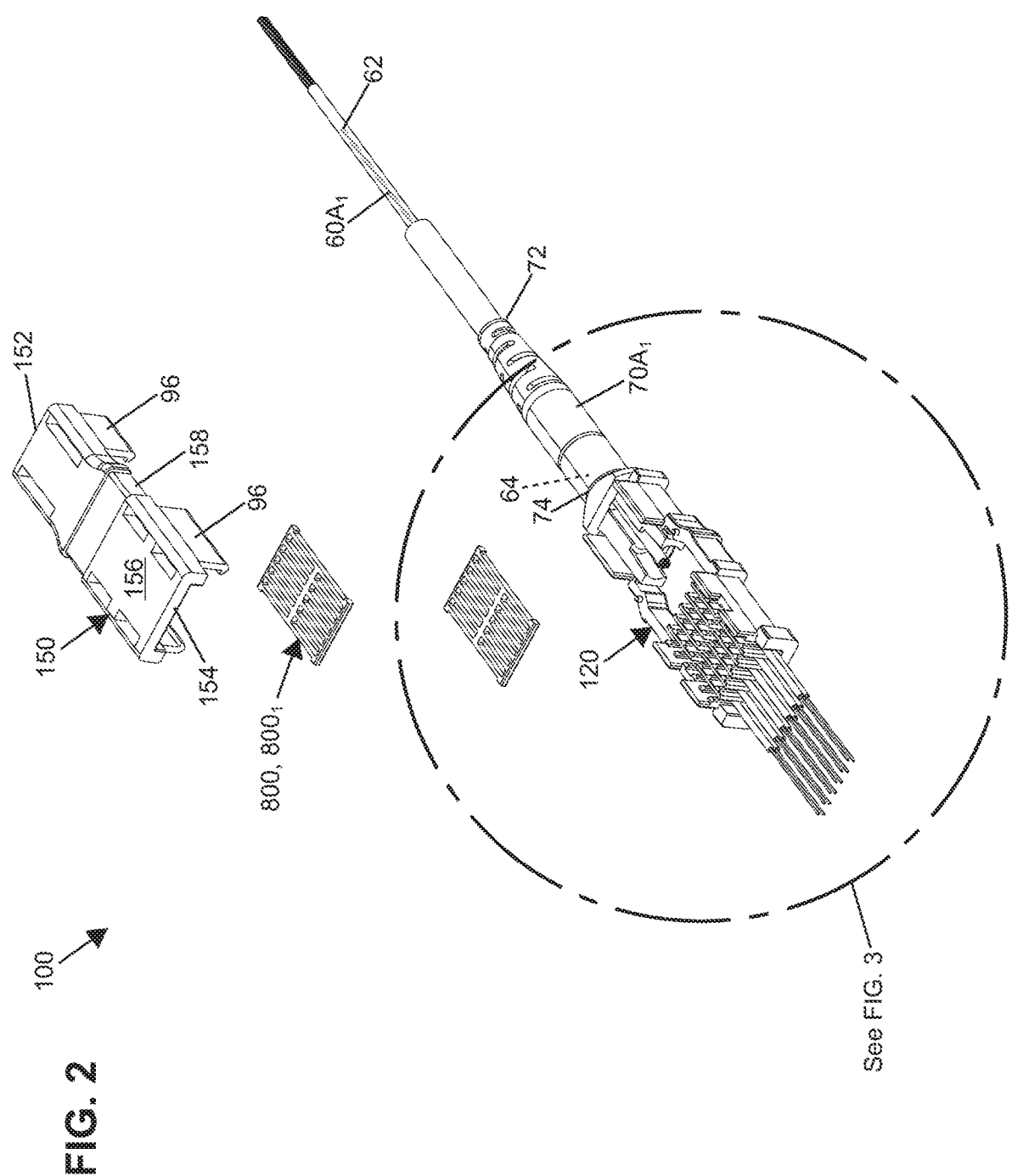
FIG. 2 is an exploded perspective view of the furcation assembly of FIG. 1.
Figure 5:
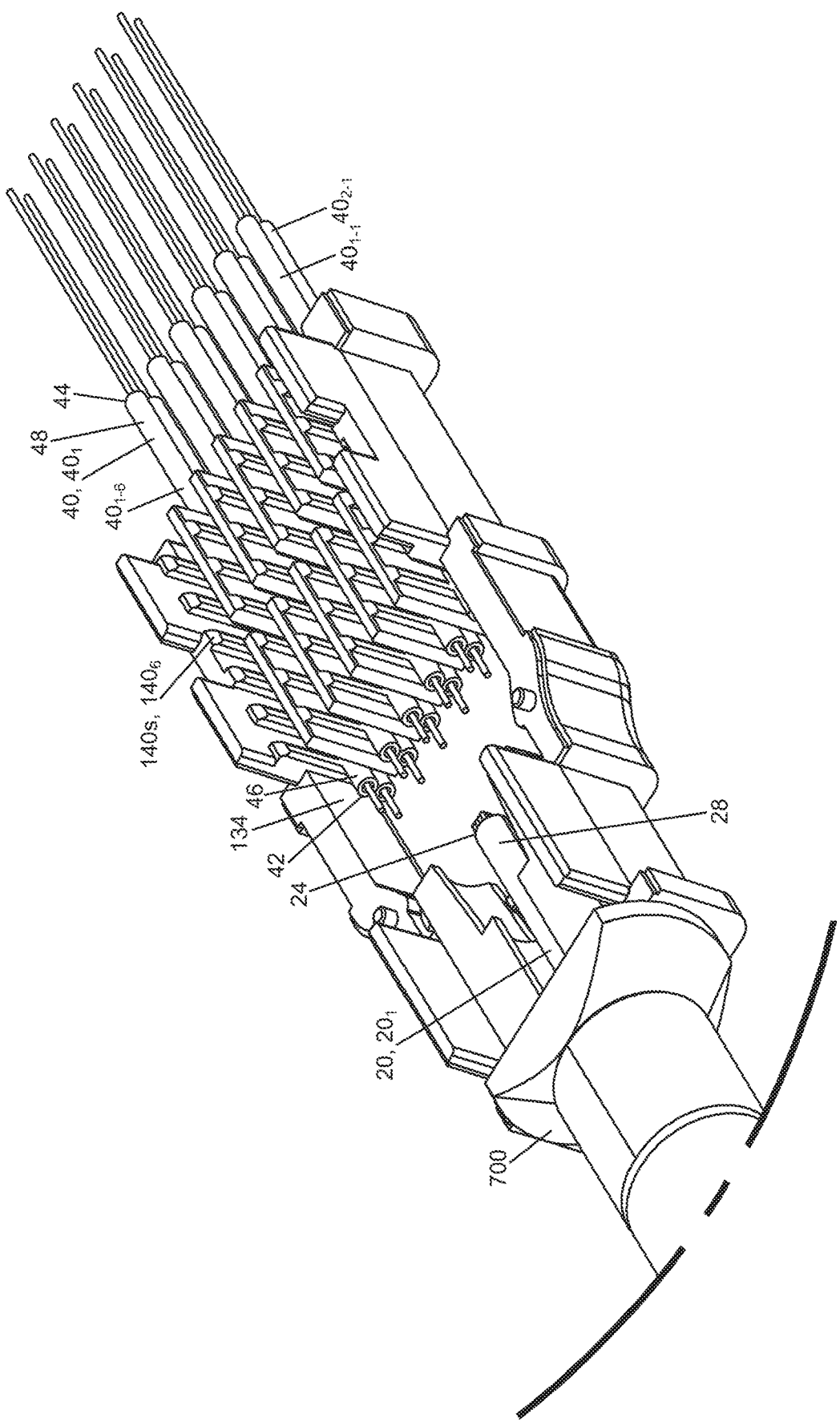
FIG. 5 is an enlarged portion of FIG. 4.
Figure 23:
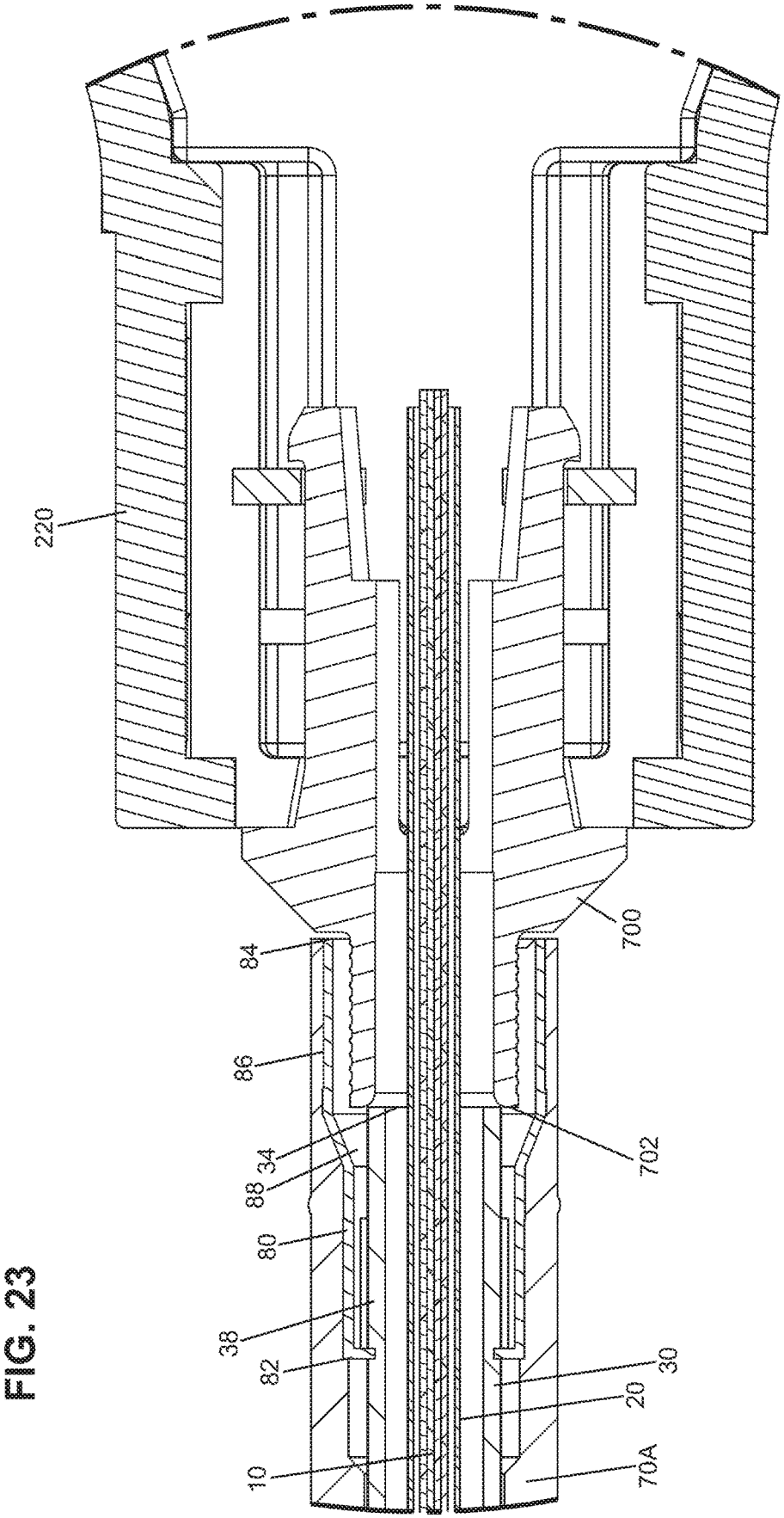
FIG. 23 is a cross-sectional plan view of a cable anchor for use with various furcation assemblies, according to the principles of the present disclosure, shown with a portion of the base of FIG. 22, a plurality of optical fibers, a tube around the optical fibers, a jacket around the tube, a crimp sleeve, and a strain-relief sleeve.
Figure 24:
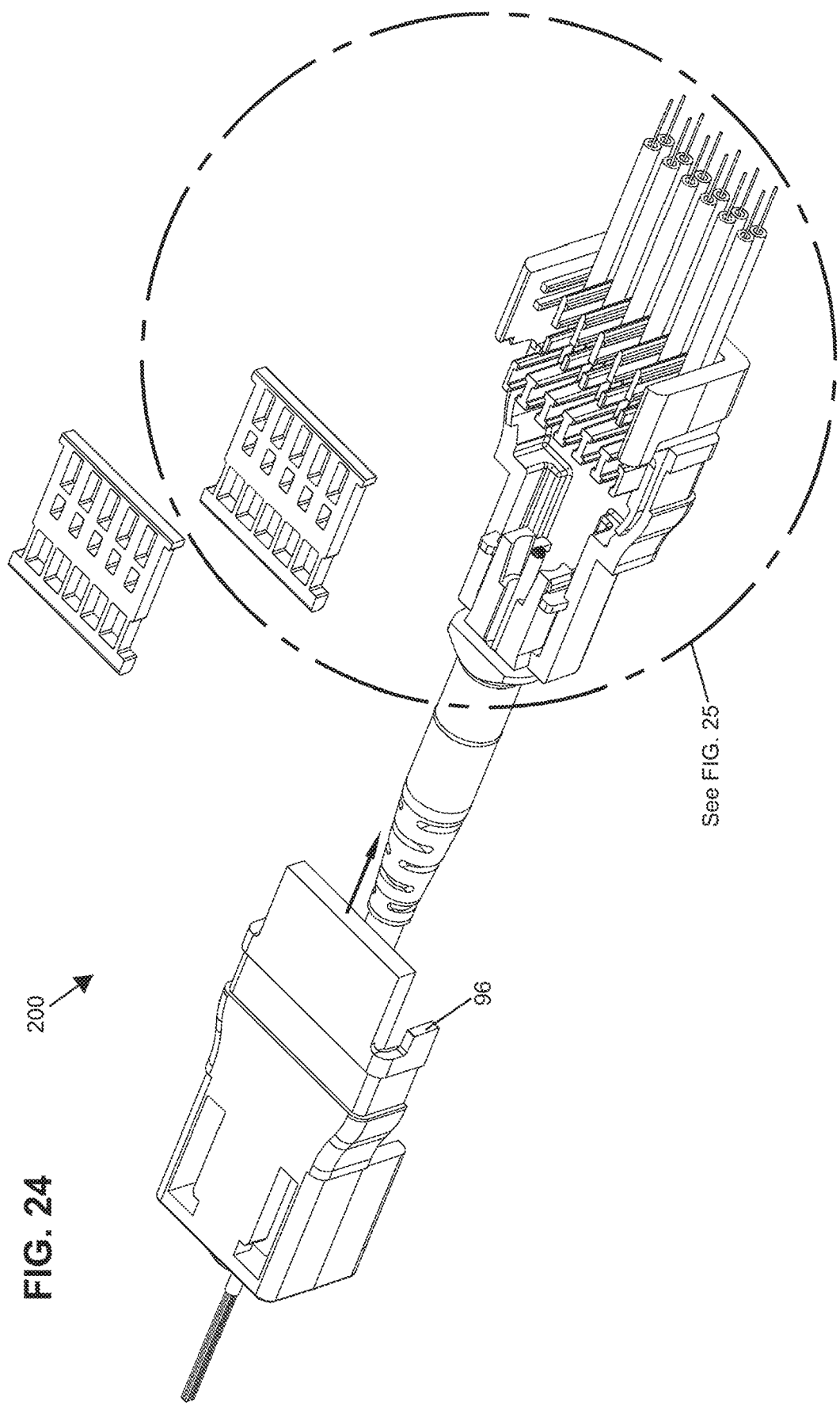
FIG. 24 is an exploded perspective view of the furcation assembly of FIG. 16.
Figure 25:
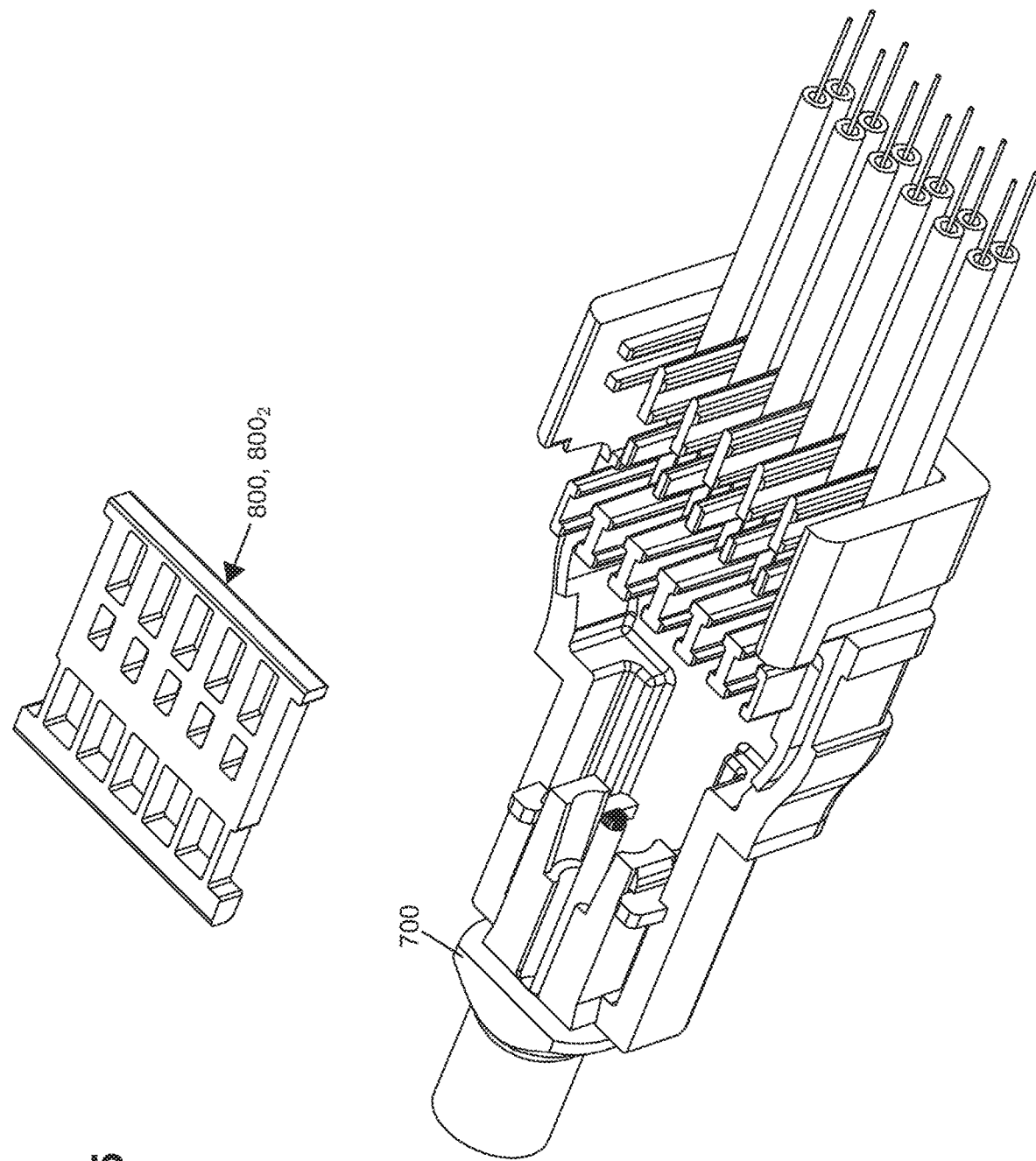
FIG. 25 is an enlarged portion of FIG. 24.

As illustrated at FIGS. 5, 6, and 13, the optical fibers 10 with the jacket $30_1$ and the plurality of furcation tubes $40_{1\text{-}1}$ to $40_{N\text{-}M}$ preinstalled (i.e., the sub-assembly 100s) may be dropped into the main body 120 of the housing 110 along the transverse direction T1. As illustrated at FIGS. 5 and 13, additional components may be installed with the plurality of optical fibers 10, the plurality of furcation tubes $40_1$, and the jacket $30_1$ (i.e., the sub-assembly 100s may include additional components). In particular, a tube 20 may be installed around the plurality of optical fibers 10 and within the jacket $30_1$. As depicted, the tube 20 is further identified as the tube $20_1$. An anchor 700 may be installed over the tube $20_1$ and may attach to the drop-in channel 160 of the main body 120 of the housing 110. The anchor 700 may be secured to the jacket $30_1$ by a crimp sleeve 80, as illustrated at FIG. 23. As illustrated at FIG. 2, one or more strength members $60A_1$ may be included within the jacket $30_1$ and may be crimped to the anchor 700 by the crimp sleeve 80. The anchor 700 may be secured to the strength members $60A_1$ and/or the jacket $30_1$ prior to assembly to the main body 120 (i.e., in the sub-assembly 100s). As illustrated at FIG. 6, a lateral channel 148 is defined in the main body 120 of the housing 110. Upon positioning of the plurality of furcation tubes $40_{1-1}$ to $40_{N-M}$, glue 90 may be applied to the lateral channel 148 and thereby bond the plurality of furcation tubes $40_{1-1}$ to $40_{N-M}$ to the main body 120 of the housing 110. The glue 90 can be of a variety of different bonding materials or adhesives such as epoxies or the like. Upon installation of the plurality of optical fibers 10, the anchor 700, and the plurality of furcation tubes $40_{1-1}$ to $40_{N-M}$ (i.e., the sub-assembly 100s), the cover 150 may be installed to the main body 120 and thereby complete assembly of the housing 110. As depicted, the cover 150 may be installed to the main body 120 along the transverse direction T1.

As described above with respect to the furcation assembly 100, the furcation assembly 200 and the furcation assembly 500 may be similarly assembled with drop-in assembly methods that move a plurality of optical fibers 10 along the transverse directions T2 and T5, respectively, into a main body 220 of the housing 210 and a main body 520 of the housing 510, respectively.

Figure 30:
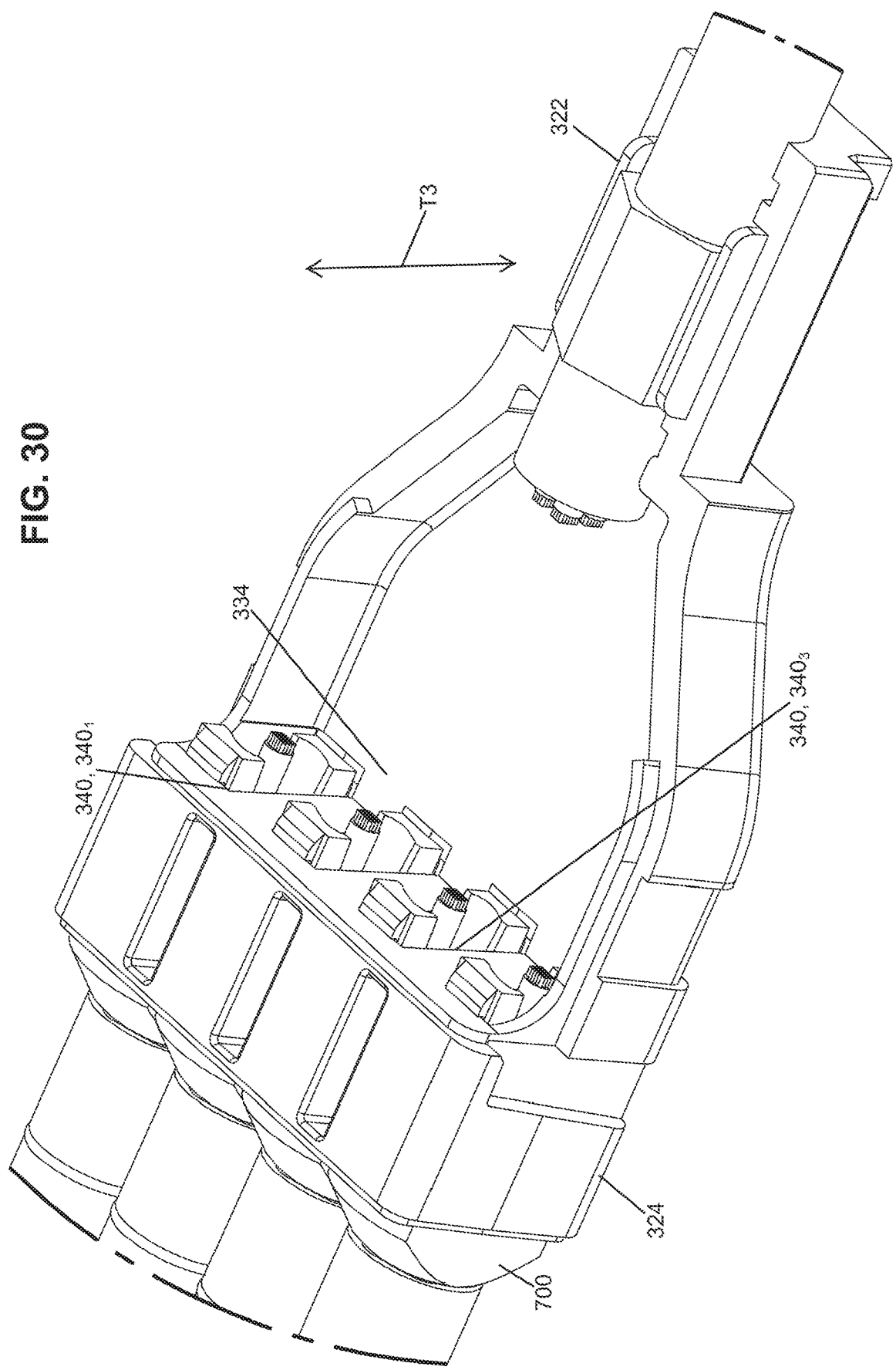
FIG. 30 is an enlarged portion of FIG. 29.
Figure 31:
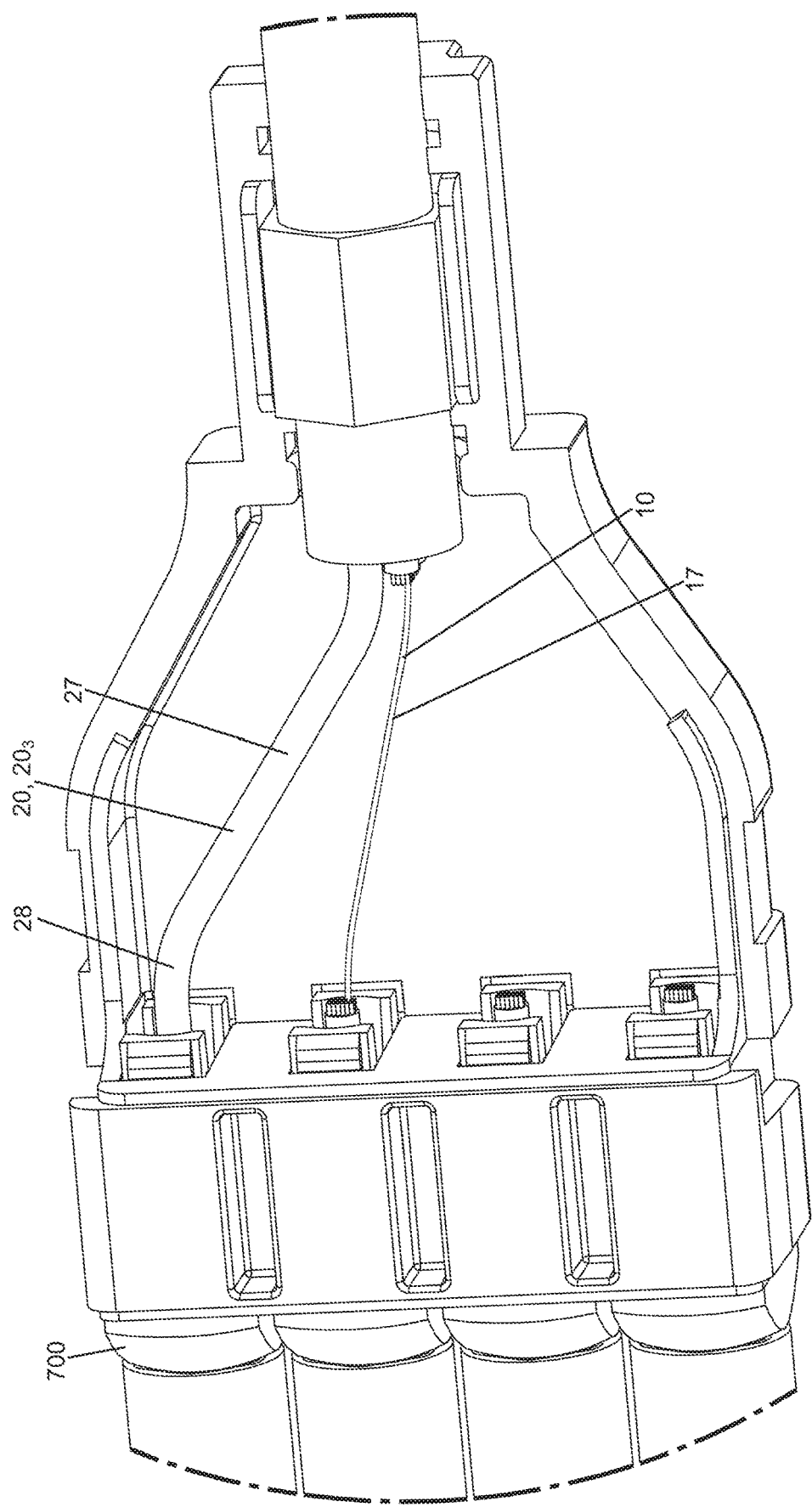
FIG. 31 is a partial perspective view of the furcation assembly of FIG. 26, but with a cover of a housing of the furcation assembly removed.
Figure 36:
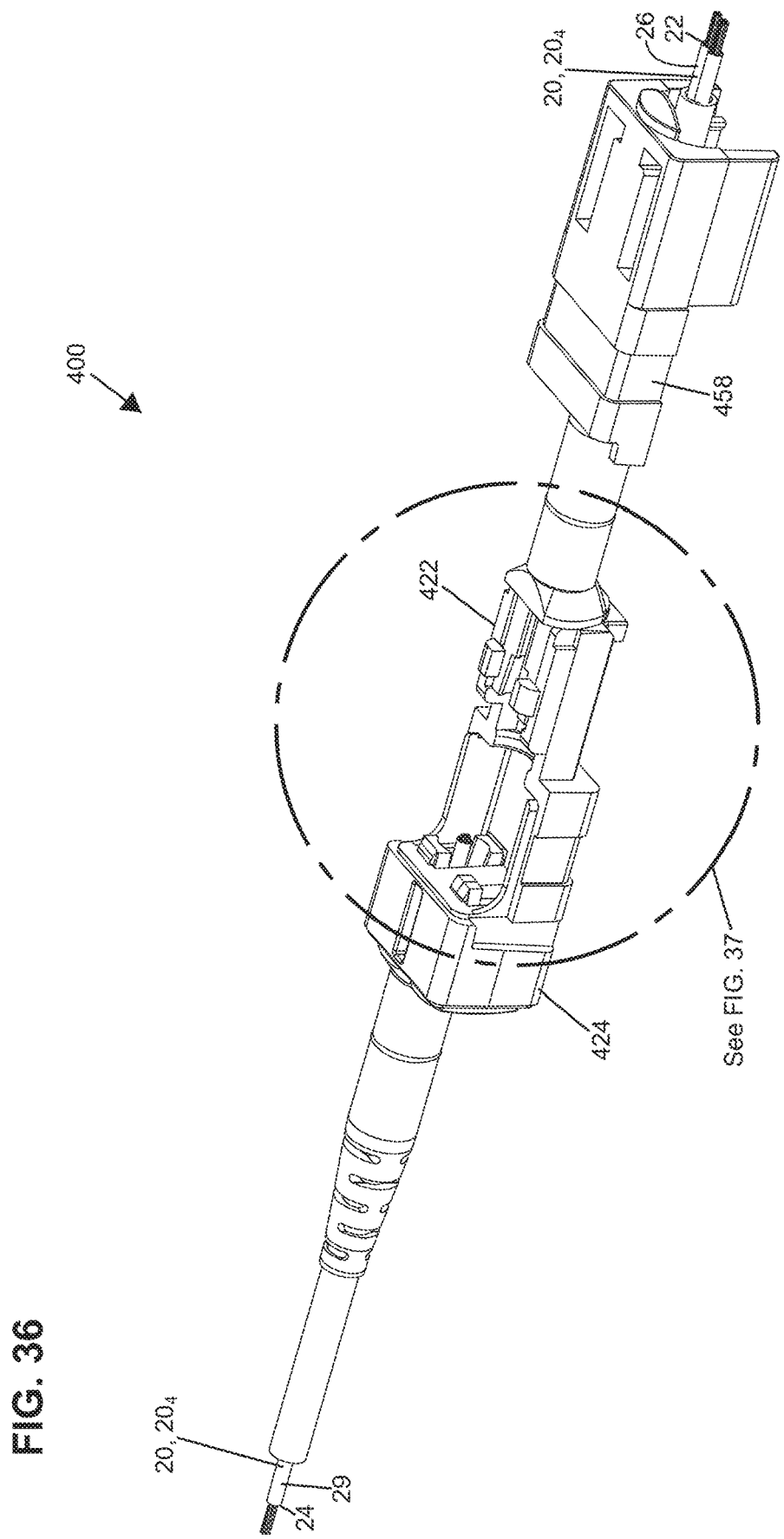
FIG. 36 is an exploded perspective view of the furcation assembly of FIG. 33.
Figure 37:
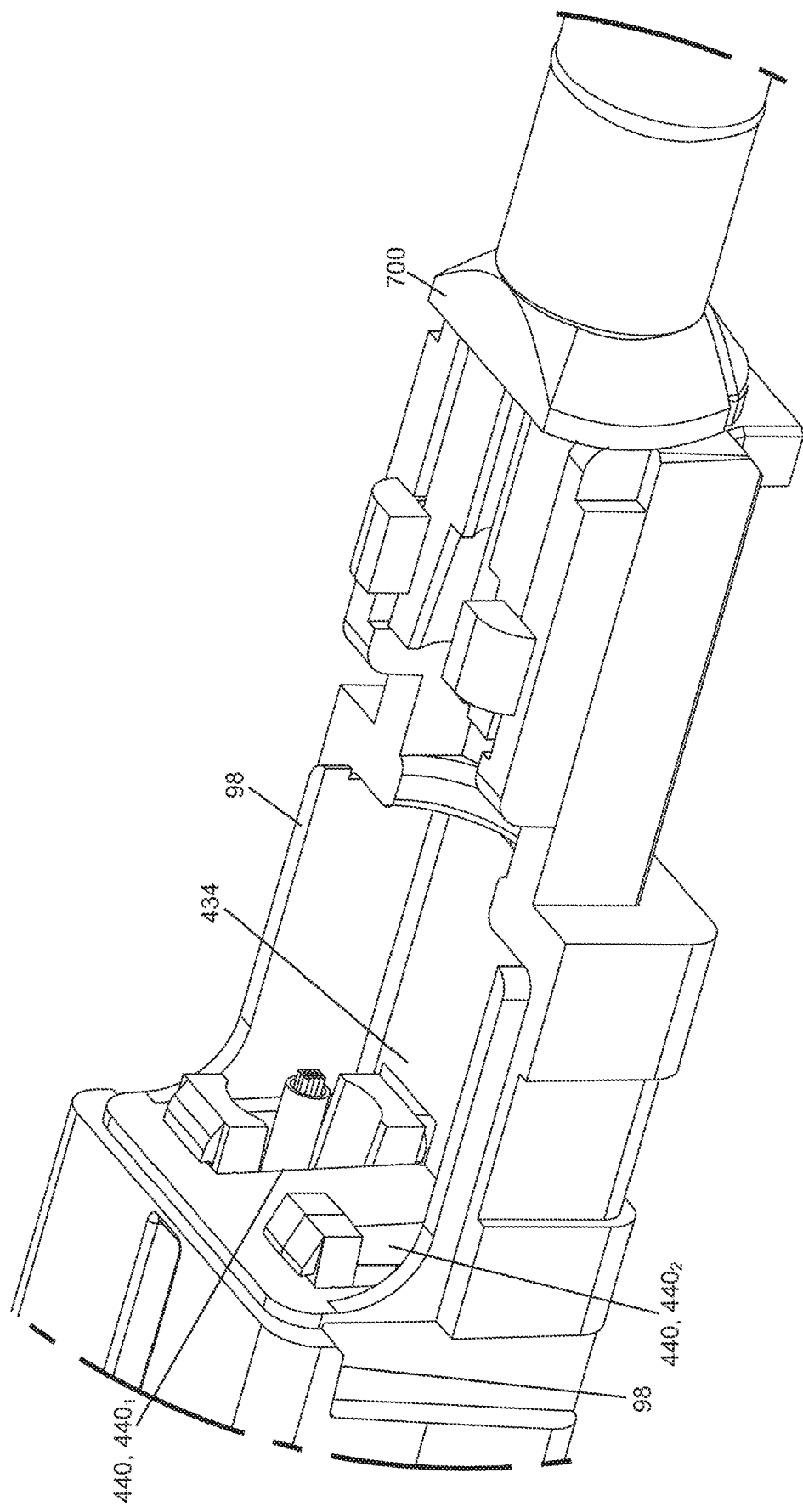
FIG. 37 is an enlarged portion of FIG. 36.
Figure 38:
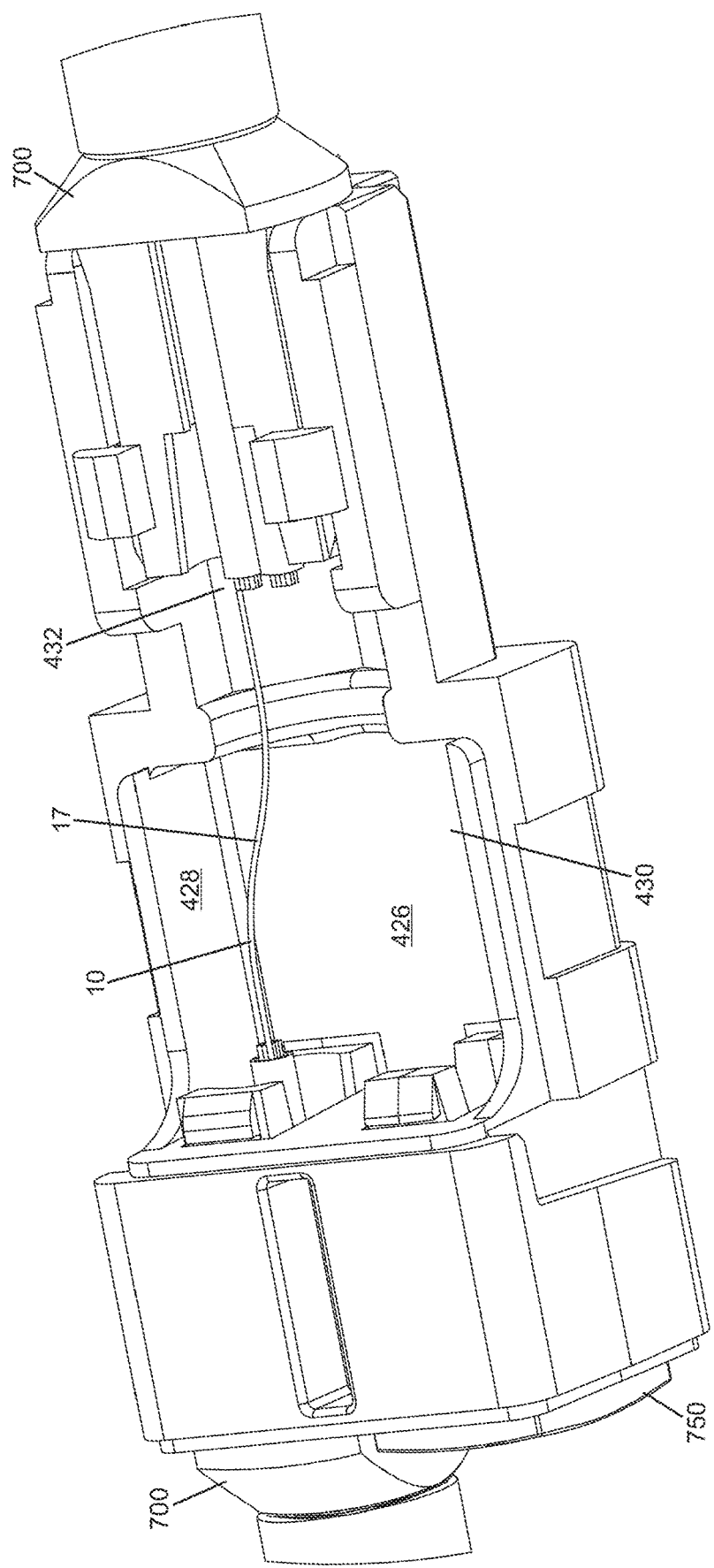
FIG. 38 is a partial perspective view of the furcation assembly of FIG. 33, but with a cover of a housing of the furcation assembly removed.
Figure 39:
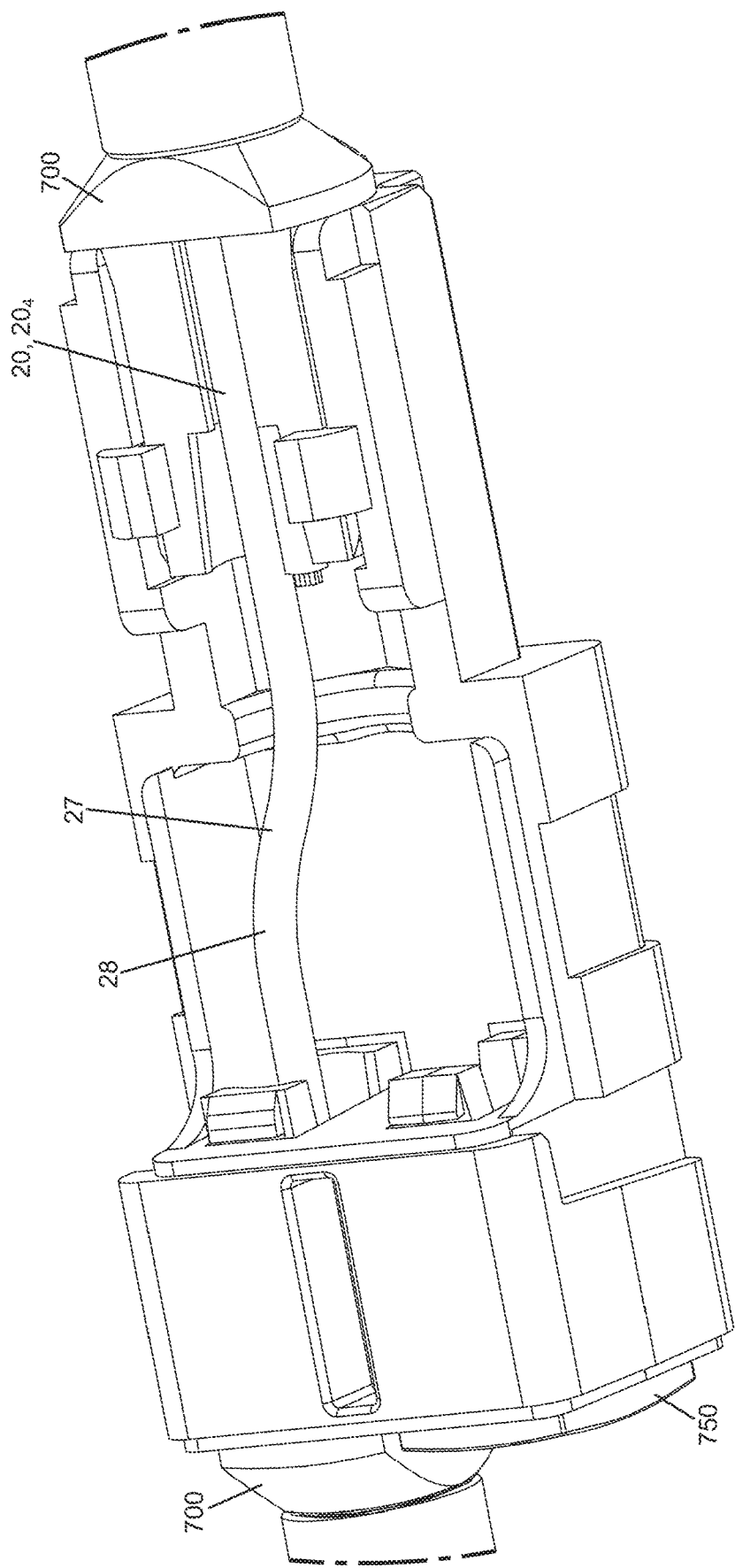
FIG. 39 is another partial perspective view of the furcation assembly of FIG. 33, but with the cover of the housing removed.
Figure 40:
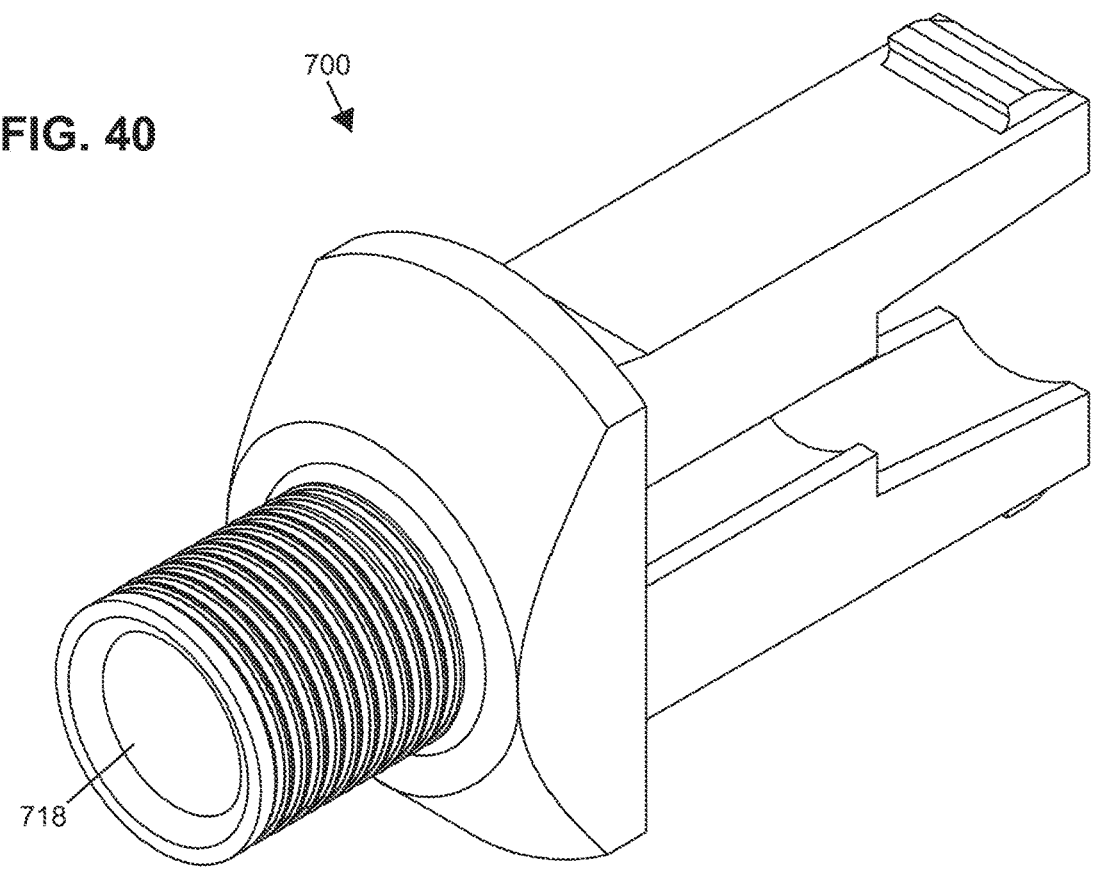
FIG. 40 is a perspective view of the cable anchor of FIG. 23.
Figure 41:
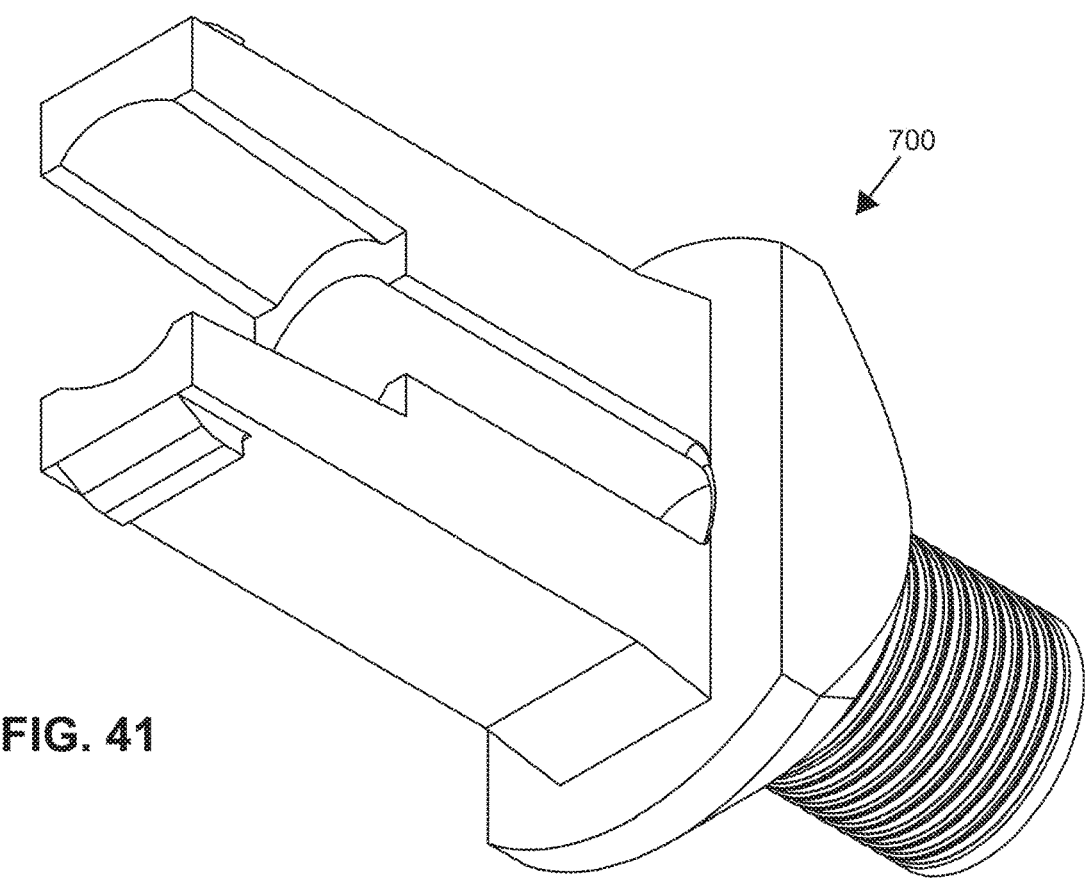
FIG. 41 is another perspective view of the cable anchor of FIG. 23.
Figure 47:
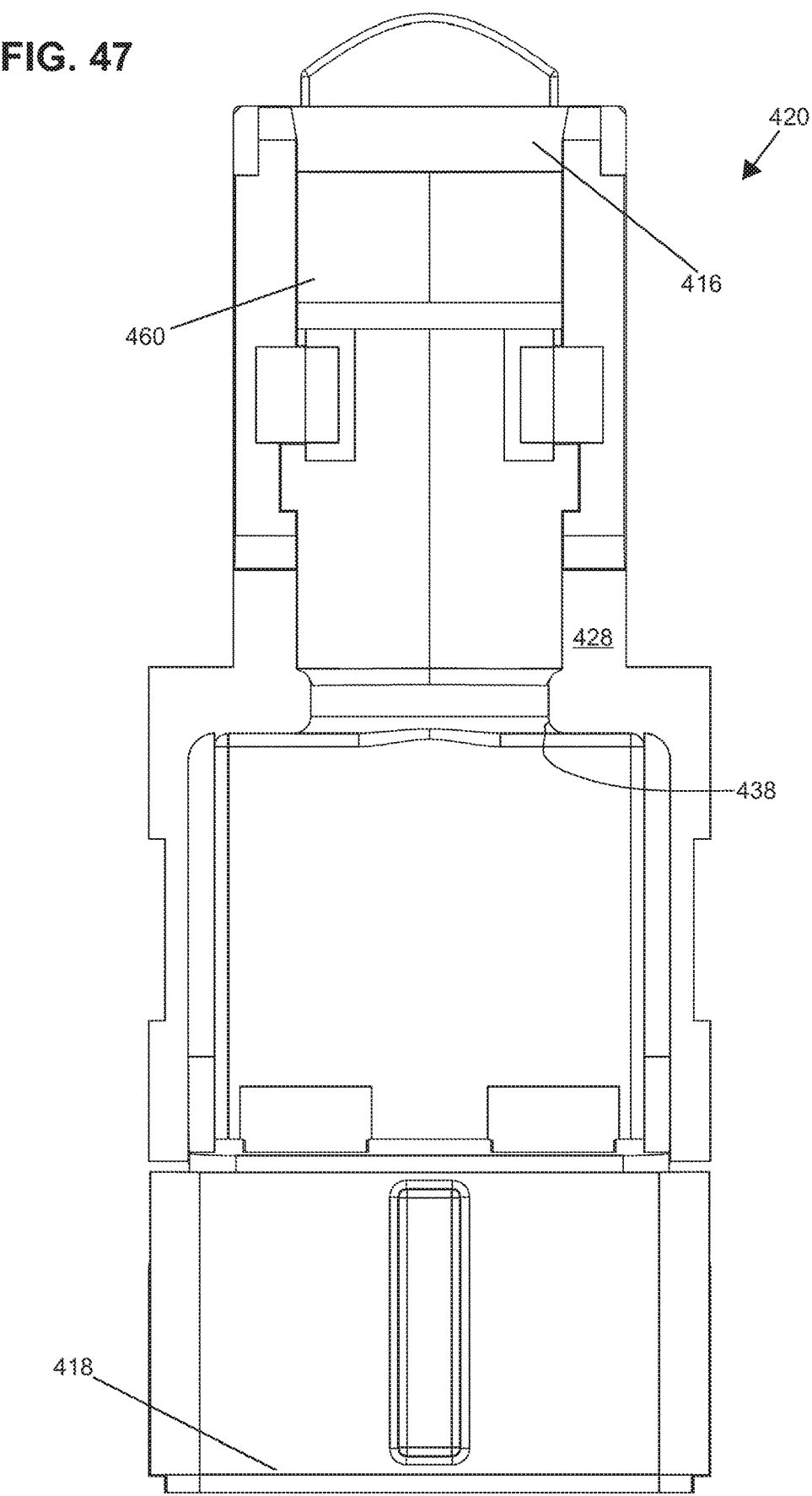
FIG. 47 is a plan view of a base of the housing of the furcation assembly of FIG. 33.

A main body 320 of the housing 310 of the furcation assembly 300 is not entirely open in the transverse direction T3. Likewise, a main body 420 of the housing 410 of the furcation assembly 400 is not entirely open along the transverse direction T4. Likewise, a main body 620 of the housing 610 of the furcation assembly 600 is not entirely open in the transverse direction T6. However, as illustrated at FIG. 30, a first end portion of 322 of the main body 320 is open along the transverse direction T3. Likewise, a transition cavity 330 of the main body 320 is also open in the transverse direction T3. As illustrated at FIGS. 35, 36, and 38, a first end portion 422 and a transition cavity 430 of the main body 420 of the housing 410 of the furcation assembly 400 are open along the transverse direction T4. Likewise, as illustrated at FIG. 58, a transition cavity 630 and a first end portion 622 of the main body 620 of the housing 610 of the furcation assembly 600 are open along the transverse direction T6.

As the first end portions 322, 422, 622 and the transition cavities 330, 430, 630 of the main bodies 320, 420, 620 are open along the transverse directions T3, T4, T6, a trunk portion 16 and the transition portion 17 of the plurality of optical fibers 10 may be dropped into the main bodies 320, 420, 620 of the housings 310, 410, 610, respectively, along the transverse directions T3, T4, T6. A furcated portion 18 of the plurality of optical fibers 10 may be fed through ports 340, 440, 640 of the main bodies 320, 420, 620 of the housings 310, 410, 610, respectively, along the axial directions A3, A4, A6 (see FIGS. 56, 59, and 60). The feeding of the furcated portions 18 through the ports 340, 440, 640 may be started before the dropping of the trunk portion 16 and the transition portion 17 of the plurality of optical fibers 10 into the first end portions 322, 422, 622 and the transition cavities 330, 430, 630 of the main bodies 320, 420, 620.

Additional details of the furcation assemblies 100, 200, 300, 400, 500, 600 and additional components adapted for use therein will now be described according to the principles of the present disclosure. For convenience, the furcation assemblies 100, 200, 300, 400, 500, 600 may be collectively referred to herein as furcation assemblies 1000.

As mentioned above, a plurality of optical fibers 10 extend through the furcation assemblies 1000 and may be continuous without interruption from the first end 12 to the second end 14 of each of the optical fibers 10. As illustrated at FIGS. 1, 13, 16, 26, 33, 48, and 56, the optical fibers 10 include a trunk portion 16 at first ends 102, 202, 302, 402, 502, 602 of the furcation assemblies 1000. The trunk portion 16 extends to and partially within the housings 110, 210, 310, 410, 510, 610 of the furcation assemblies 1000. The trunk portions 16 may extend to other furcation housings rather than being terminated along the trunk portion 16, as is illustrated at the figures. Thus, the trunk portion 16 may be furcated on each end with furcation housings opposite each other along the trunk portion 16. The furcation housings may be the same or similar or may be different at opposite ends of the trunk portion 16. The furcation housings may include the housings 110, 210, 310, 410, 510, 610. The trunk portion 16 may enter the housings 110, 210, 310, 410, 510, 610 through a first opening 116, 216, 316, 416, 516, 616 at first ends 112, 212, 312, 412, 512, 612, respectively.

The trunk portion 16 of each of the plurality of optical fibers 10 may continuously continue to the transition portion 17 of each respective optical fiber 10. At FIGS. 6, 21, 31, 38, 53, and 61, only a single one of the optical fibers 10 is illustrated as including the transition portion 17. In practice, all of the optical fibers 10 may include a transition portion 17, and single optical fibers 10 or no optical fibers 10 shown in the transition portions 17 reduce drawing clutter for purposes of illustration. FIG. 13 illustrates a plurality, but not all, of the optical fibers 10 including a transition portion 17. Again, the transition portions 17 were not shown to reduce drawing clutter.

The optical fibers 10 may be bend insensitive optical fibers to permit relatively small radii along the transition portions 17 of the optical fiber 10. However, the furcation assemblies 1000 are adapted to route the optical fibers 10 without exceeding minimum bend radius limitations. The transition portions 17 of the optical fibers 10 allow a courser pitch between the optical fibers 10 at the second end 104, 204, 304, 404, 504, 604 of the furcation assemblies 1000 than a pitch between the optical fibers 10 at the first end 102, 202, 302, 402, 502, 602 of the furcation assemblies 1000.

The transition portion 17 continues continuously and uninterrupted from the transition portion 17 to the furcated portion 18 of the optical fiber 10. As illustrated, the furcated portion 18 terminates at the second end 14 of the optical fiber 10. The terminated second end 14 may be connectorized, spliced, or otherwise joined to an optical component. In certain embodiments, the furcated portion 18 continues as a trunk portion and may further continue to another furcation housing. Thus, the furcated portions 18 of the optical fibers 10 may include furcation housings at each end of the furcated portion 18. The furcated portion 18 may be further furcated thereby becoming the trunk portion as the furcation assembly continues to branch and sub-branch.

The plurality of optical fibers 10 may be enclosed within a tube 20. As illustrated, furcation assemblies 100, 200, 500 include the tube 20 surrounding the trunk portion 16 of the optical fibers 10. Furcation assemblies 300, 400, and 600 include the tube $20_3$, $20_4$, and $20_6$ extending continuously through the furcation assemblies 300, 400, 600, respectively. As illustrated, the furcation assemblies 300, 400, 600 may include a plurality of the tubes 20. Each of the tubes 20 may, in turn, include a plurality of optical fibers 10. The tubes 20 extend between a first end 22 and a second end 24. In the furcation assemblies 100, 200, 500, the tube 20 may terminate within the housing 110, 210, 510, respectively. In furcation assemblies 300, 400, 600, the second end 24 of the tube 20 is positioned at the second end of 304, 404, 604 of the furcation assemblies 300, 400, 600. In certain embodiments, the tubes 20 extend through multiple furcation housings, analogously to the optical fibers 10 extending through multiple furcation housings.

The tubes 20 include an exterior portion 26 that extends from the first end 22 to the furcation housings 310, 410, 610 and continues as a transition portion 27 of the tube 20 within the housing 310, 410, 610. In furcation assemblies 100, 200, 500, the tube 20 may continue from the first end 22 to the second 24, with the second end 24 terminating before the housing 110, 210, 510 or with the second end 24 terminating within the housing 110, 210, 510. An interior portion 28 of the tube 20 may thereby be present within the furcation assemblies 1000. In furcation assemblies 300, 400, 600, the interior portion 28 of the tube 20 passes through the housing 310, 410, 610. In furcation assemblies 100, 200, 500, the interior portion 28 may be terminated at the second end 24. As the tube 20 passes through the housings 310, 410, 610, it continues continuously and uninterrupted to an exterior portion 29 at the second end 304, 404, 604 of the furcation assemblies 300, 400, 600.

The furcation assemblies 1000 may further include the jacket 30. The jacket 30 may extend between a first end 32 and a second end 34. The jacket 30 may include furcation housings at each end 32, 34 of the jacket 30. In the depicted embodiments, the jacket 30 terminates at the first end 32 without a furcation housing at the first end 32. In other embodiments, the first end 32 may terminate at another furcation housing. The second end 34 of the jacket 30 may terminate at either a trunk end or a furcated end of the additional furcation housing. In the depicted embodiments, an exterior portion 36 of the jacket 30 extends from the first end 32 to a connected portion 38 of the jacket 30. The connected portion 38 is mechanically connected to the furcation housings 110, 210, 310, 410, 510, 610. The mechanical connection may include a strain relief member 70A and/or the crimp sleeve 80. The jacket 30 may thereby be terminated at the second end 34 to the furcation housing 110, 210, 310, 410, 510, 610.

The furcation assemblies 100, 200, 500 may include a plurality of the furcation tubes 40. The furcation tubes 40 extend between a first end 42 and a second end 44. The furcation tubes 40 include a connected portion 46 and an exterior portion 48. The connected portion 46 is positioned within the furcation housings 110, 210, 510 and connected thereto. The exterior portion 48 extends beyond the housing 110, 210, 510 and to the second end 104, 204, 504 of the furcation assemblies 100, 200, 500.

The furcation assemblies 200, 300, 400, 500, 600 may include a jacket 50. The jacket 50 extends between a first end 52 and a second end 54. The jacket 50 may include a connected portion 56 and an exterior portion 58. In furcation assemblies 200 and 500, the connected portion 56 of the jacket 50 is glued to the housing 210, 510. In furcation assemblies 300, 400, 600, the connected portion 56 of the jacket 50 is crimped by the crimp sleeve 80 to the anchor 700 and is thereby connected to the furcation assembly 300, 400, 600.

Figure 19:
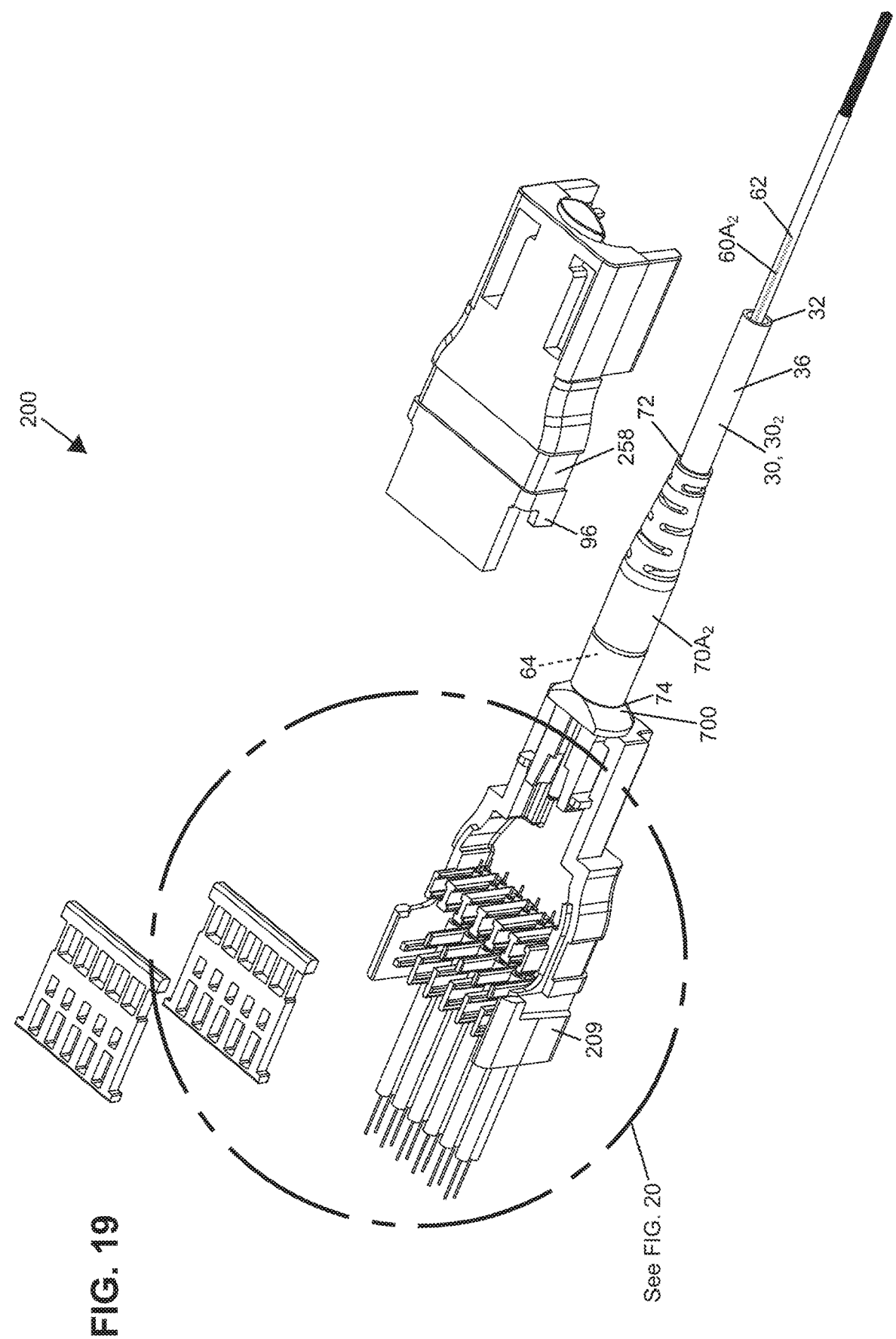
FIG. 19 is an exploded perspective view of the furcation assembly of FIG. 16.
Figure 20:
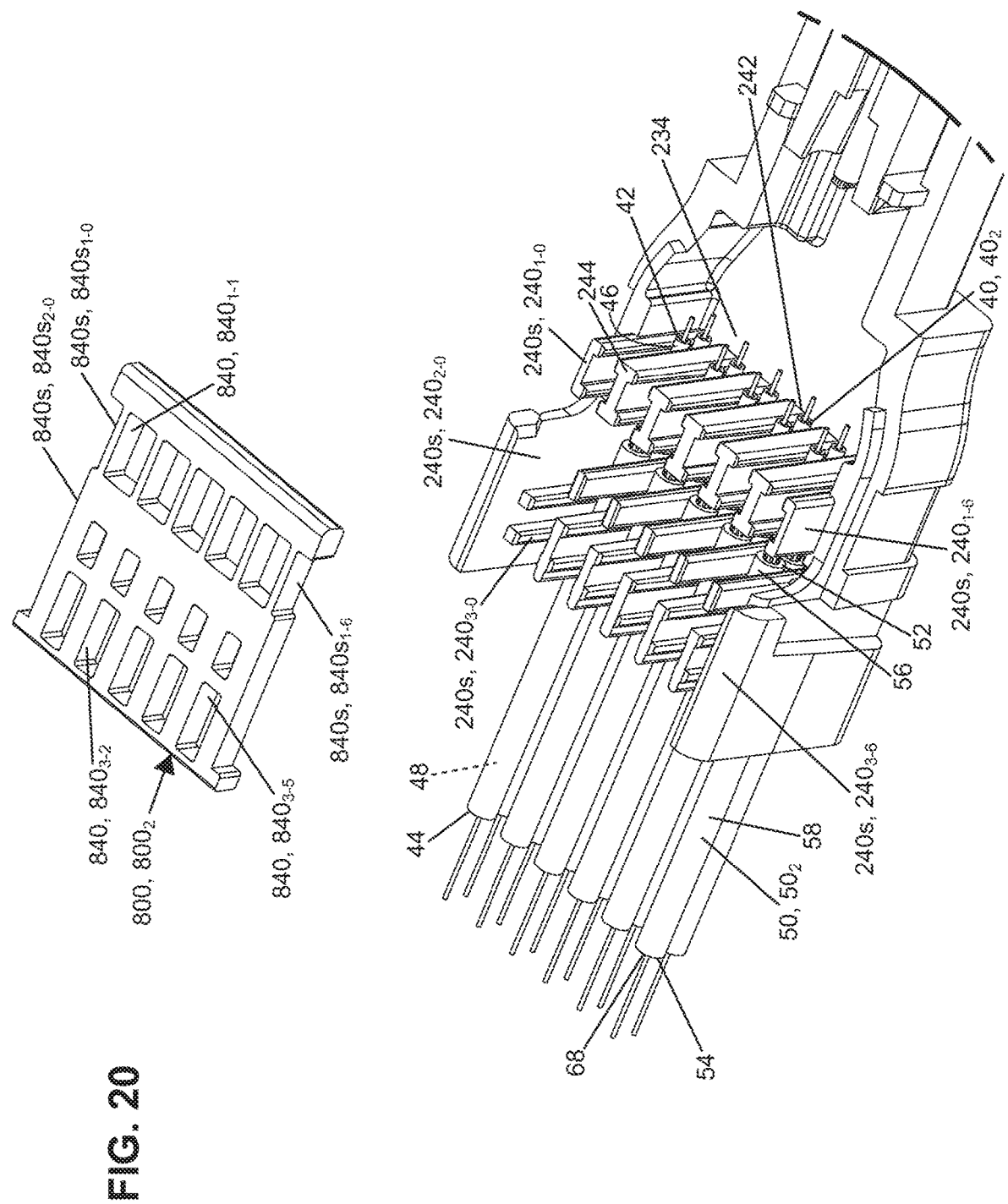
FIG. 20 is an enlarged portion of FIG. 19.
Figure 51:
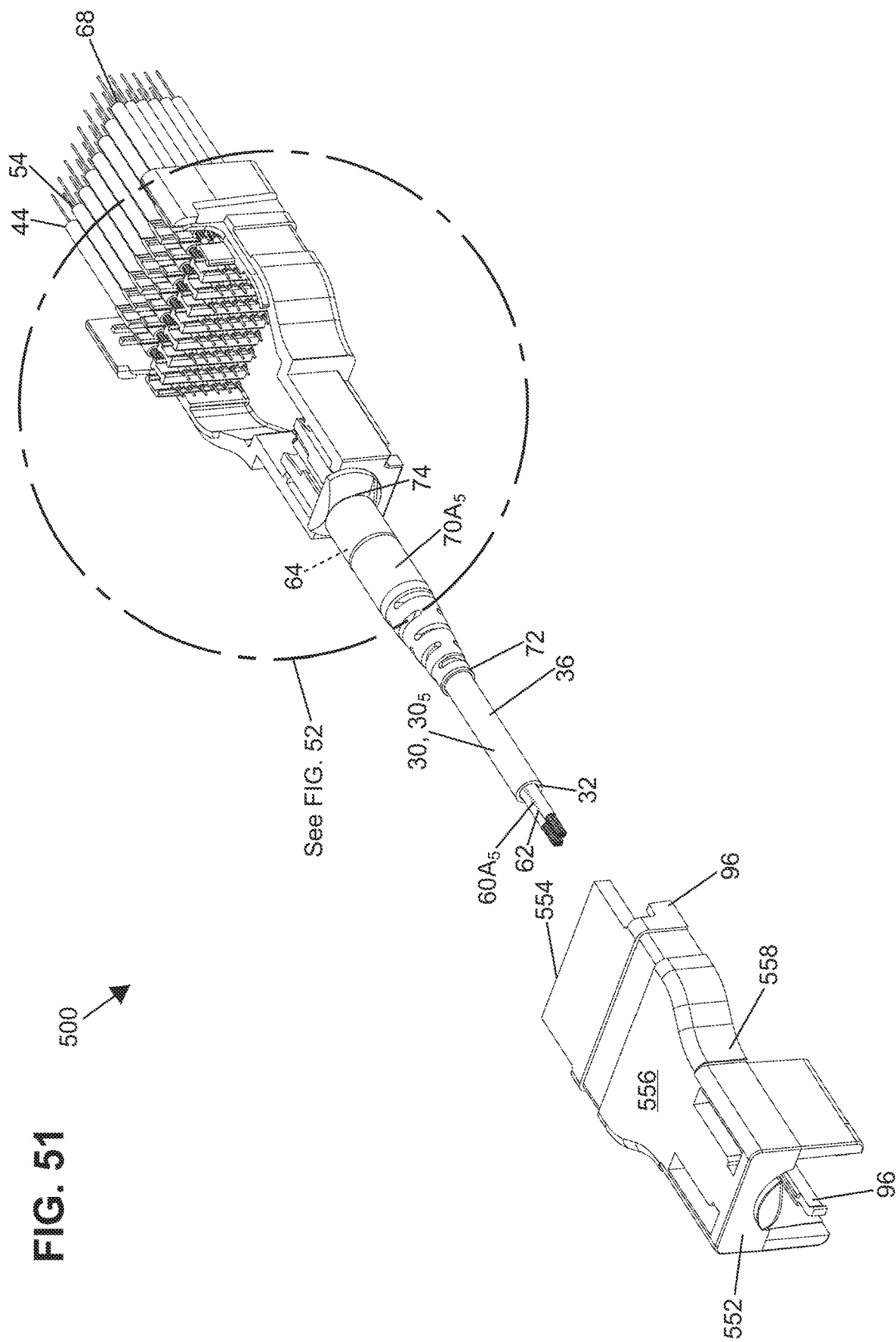
FIG. 51 is an exploded perspective view of the furcation assembly of FIG. 48.
Figure 52:
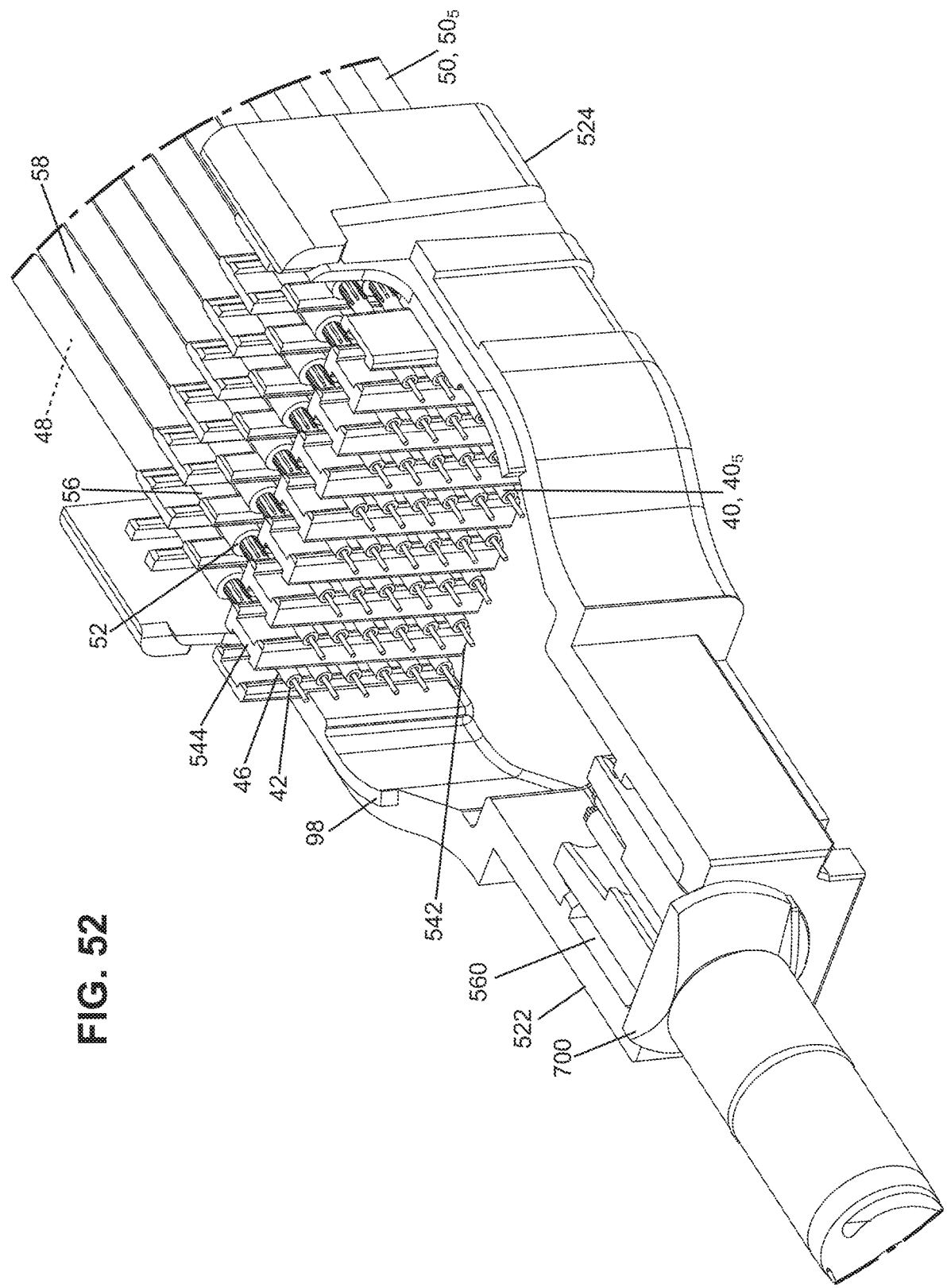
FIG. 52 is an enlarged portion of FIG. 51.
Figure 57:
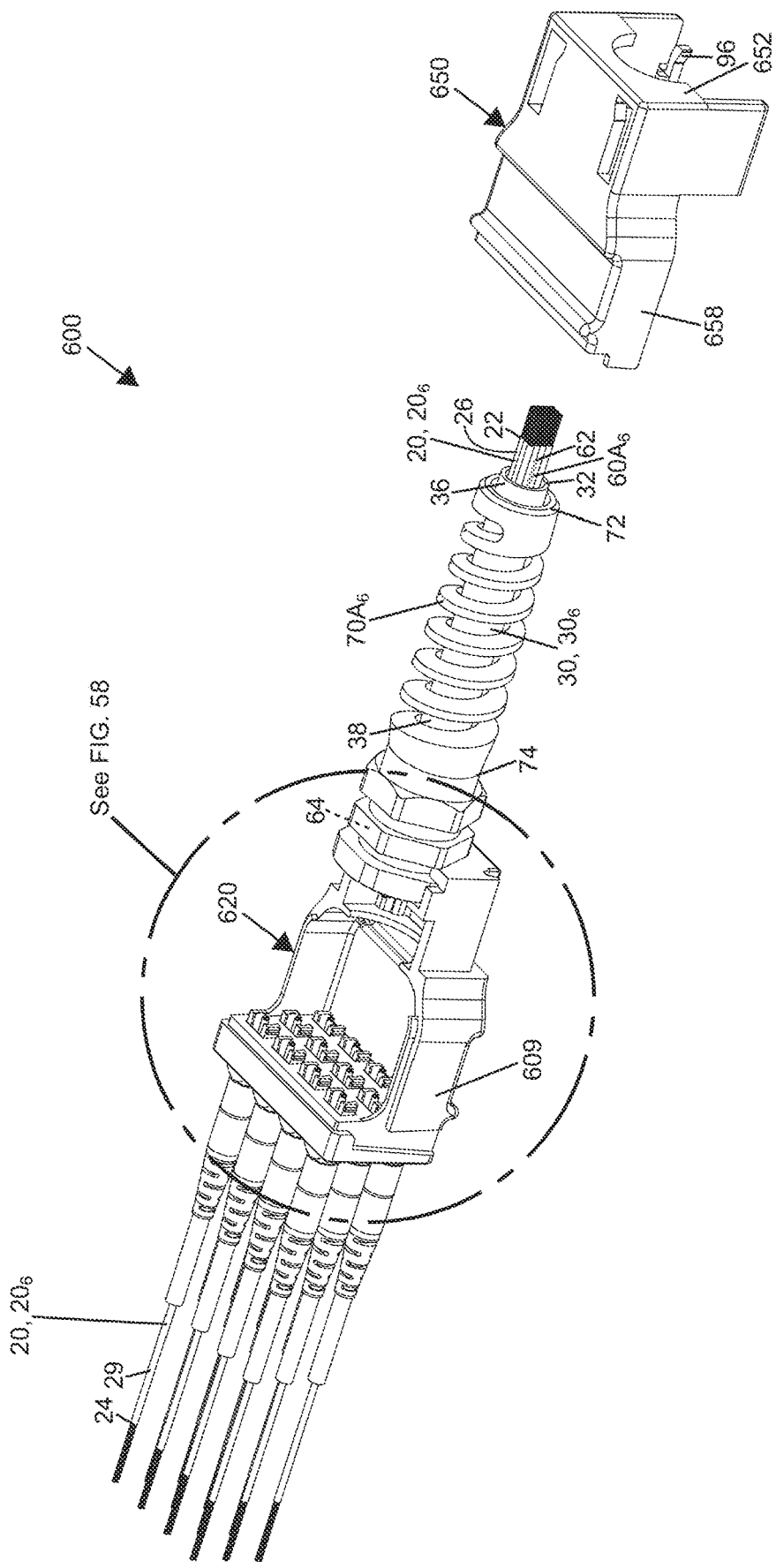
FIG. 57 is an exploded perspective view of the furcation assembly of FIG. 56.

The furcation assemblies 1000 may further include one or more strength members 60. As illustrated at FIG. 2, the furcation assembly 100 may include a strength member $60A_1$ that extends between a first end 62 and a second end 64. As illustrated at FIG. 19, the furcation assembly 200 may include a strength member $60A_2$ that extends between a first end 62 and a second end 64. As illustrated at FIG. 26, the furcation assembly 300 may include a strength member $60A_3$ that extends between a first end 62 and a second end 64, as further illustrated at FIG. 28. As illustrated at FIG. 33, the furcation assembly 400 includes a strength member $60A_4$ that extends between a first end 62 and a second end 64. As illustrated at FIG. 51, the furcation assembly 500 includes a strength member $60A_5$ that extends between a first end 62 and a second end 64. As illustrated at FIG. 57, the furcation assembly 600 includes a strength member $60A_6$ that extends between a first end 62 and a second end 64.

Figure 21:
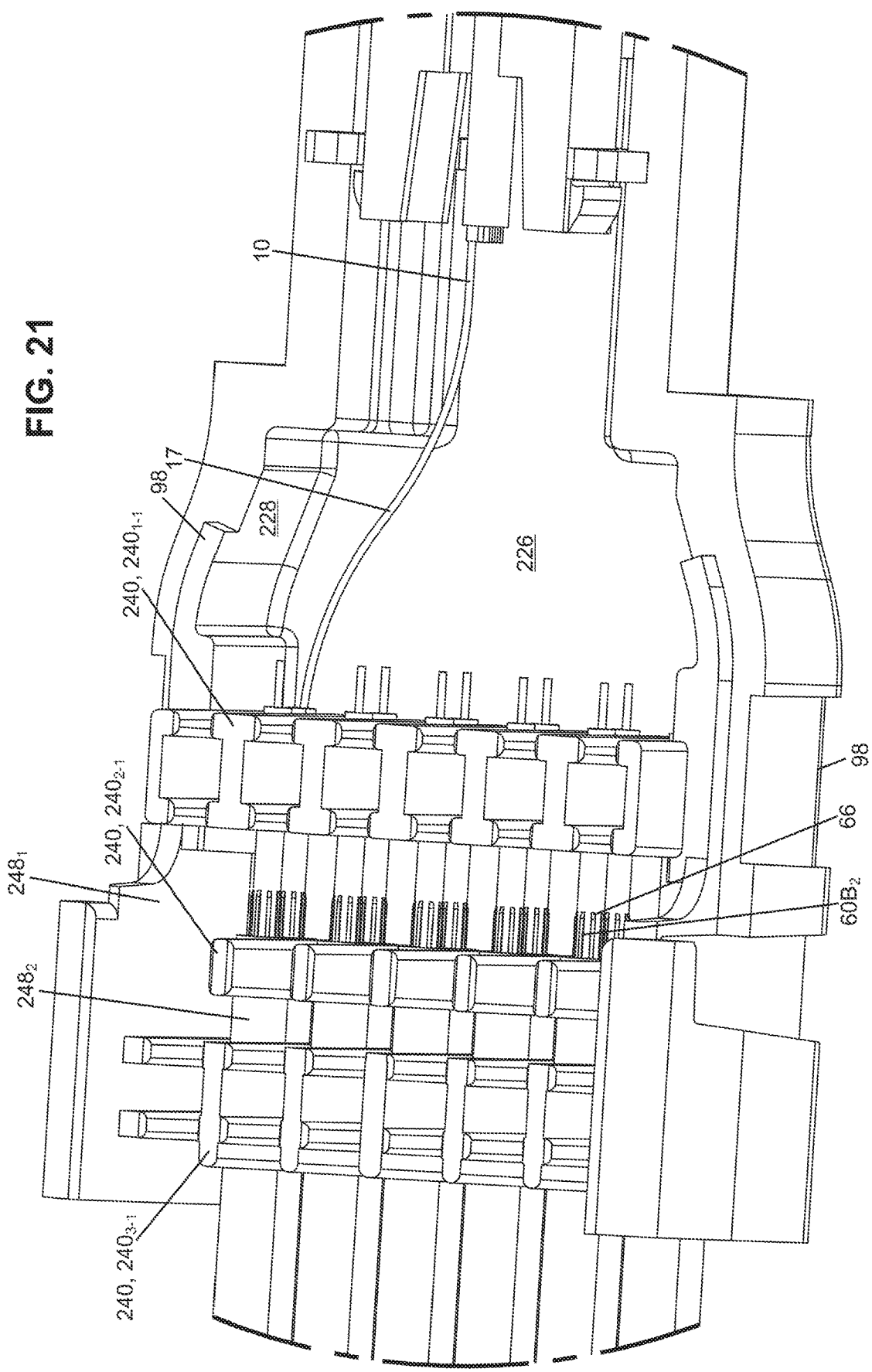
FIG. 21 is a partial perspective view of the furcation assembly of FIG. 16, but with a cover of a housing of the furcation assembly removed.
Figure 27:
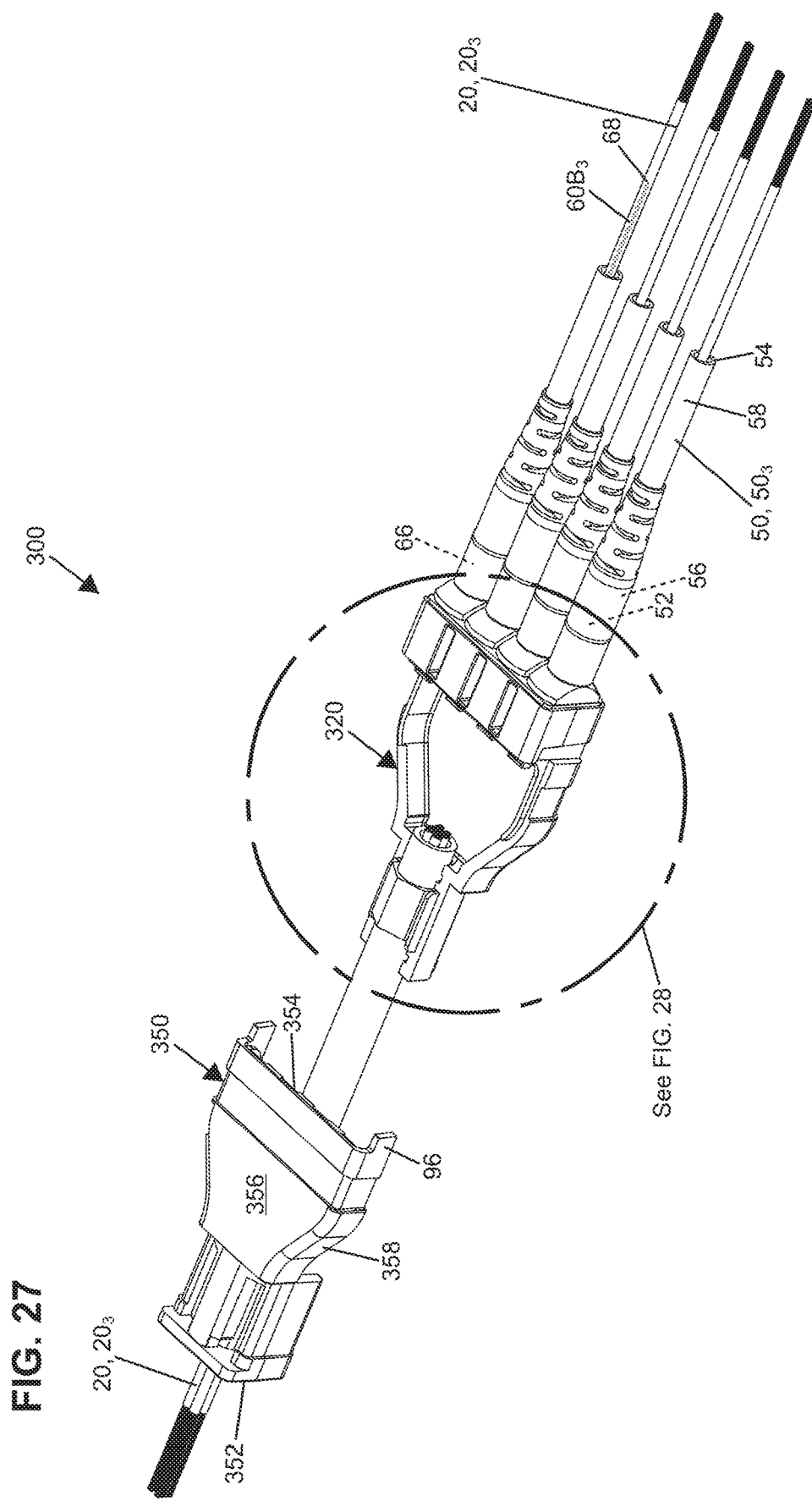
FIG. 27 is an exploded perspective view of the furcation assembly of FIG. 26.
Figure 34:
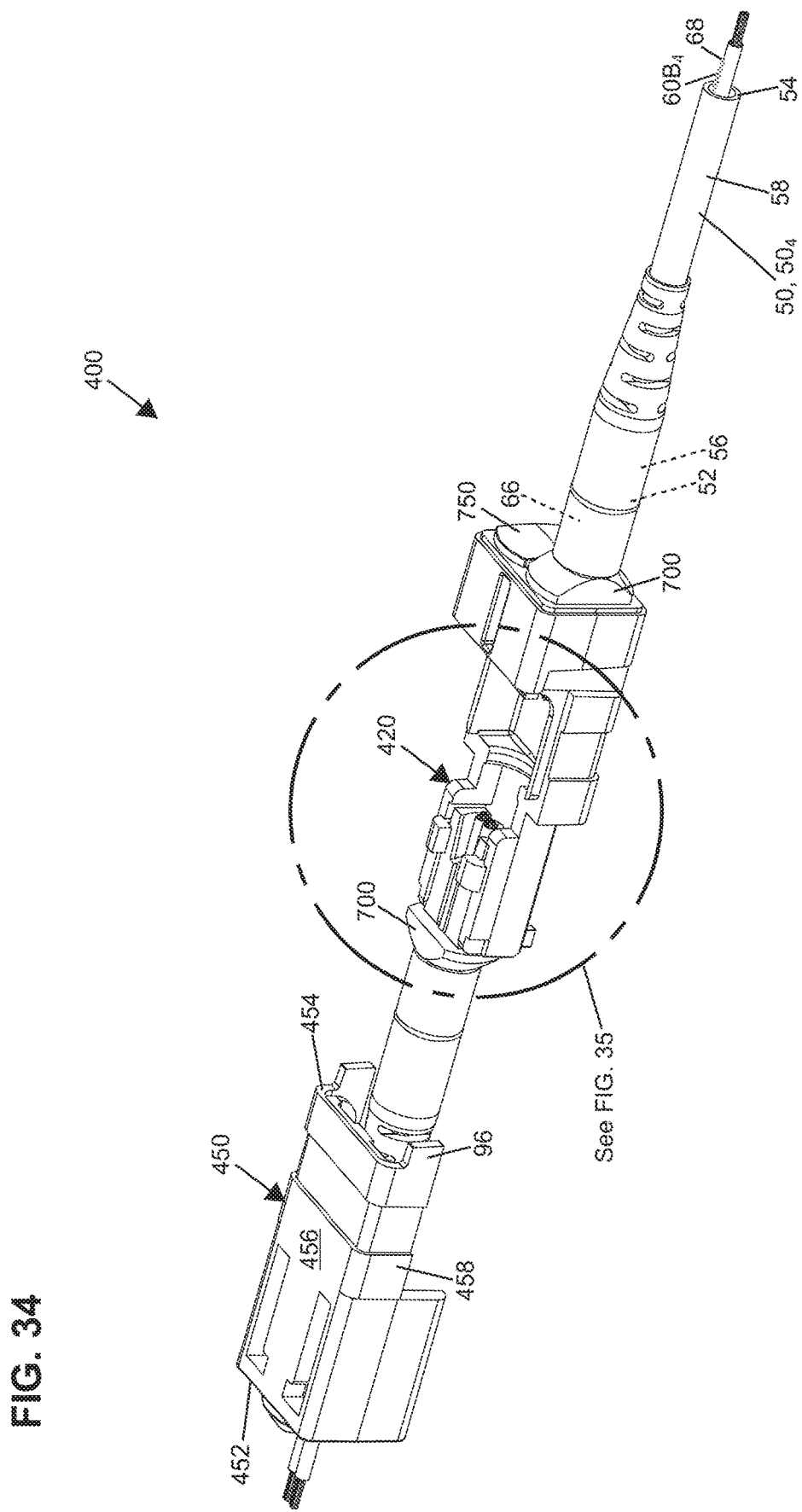
FIG. 34 is an exploded perspective view of the furcation assembly of FIG. 33.
Figure 53:
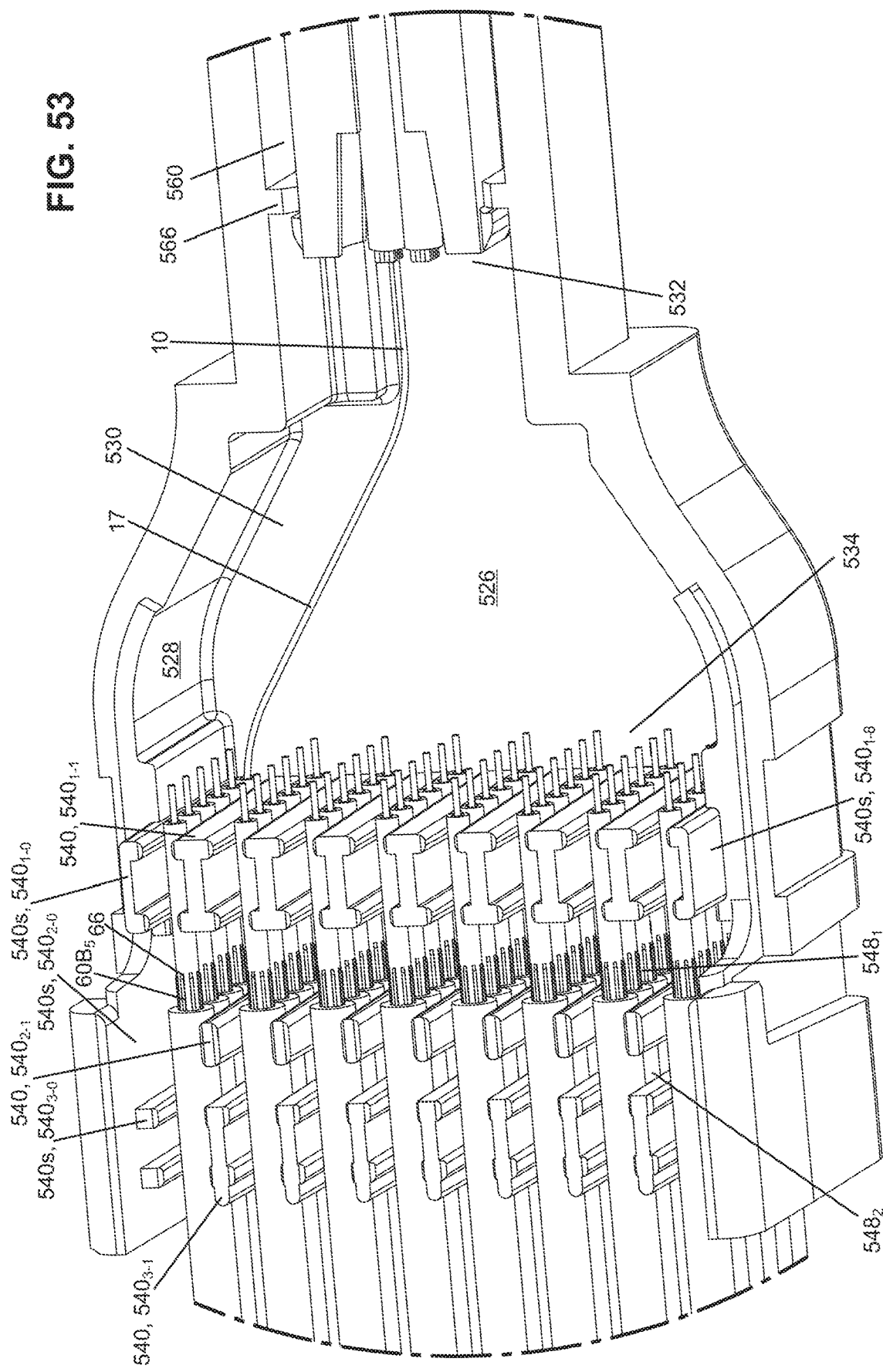
FIG. 53 is a partial perspective view of the furcation assembly of FIG. 48, but with a cover of a housing of the furcation assembly removed.

As illustrated at FIG. 21, the furcation assembly 200 includes a strength member $60B_2$ that extends from a first end 66 to a second end. As illustrated at FIG. 27, the furcation assembly 300 includes a strength member $60B_3$ that extends between a first end 66 and a second end 68. As illustrated at FIG. 34, the furcation assembly 400 includes a strength member $60B_4$ that extends between a first end 66 and a second end 68. As illustrated at FIG. 53, the furcation assembly 500 includes a strength member $56B_5$ that extends from a first end 66 to a second end. As illustrated at FIG. 56, the furcation assembly 600 includes a strength member $60B_6$ that extends from a first end 66 to a second end 68.

Figure 4:
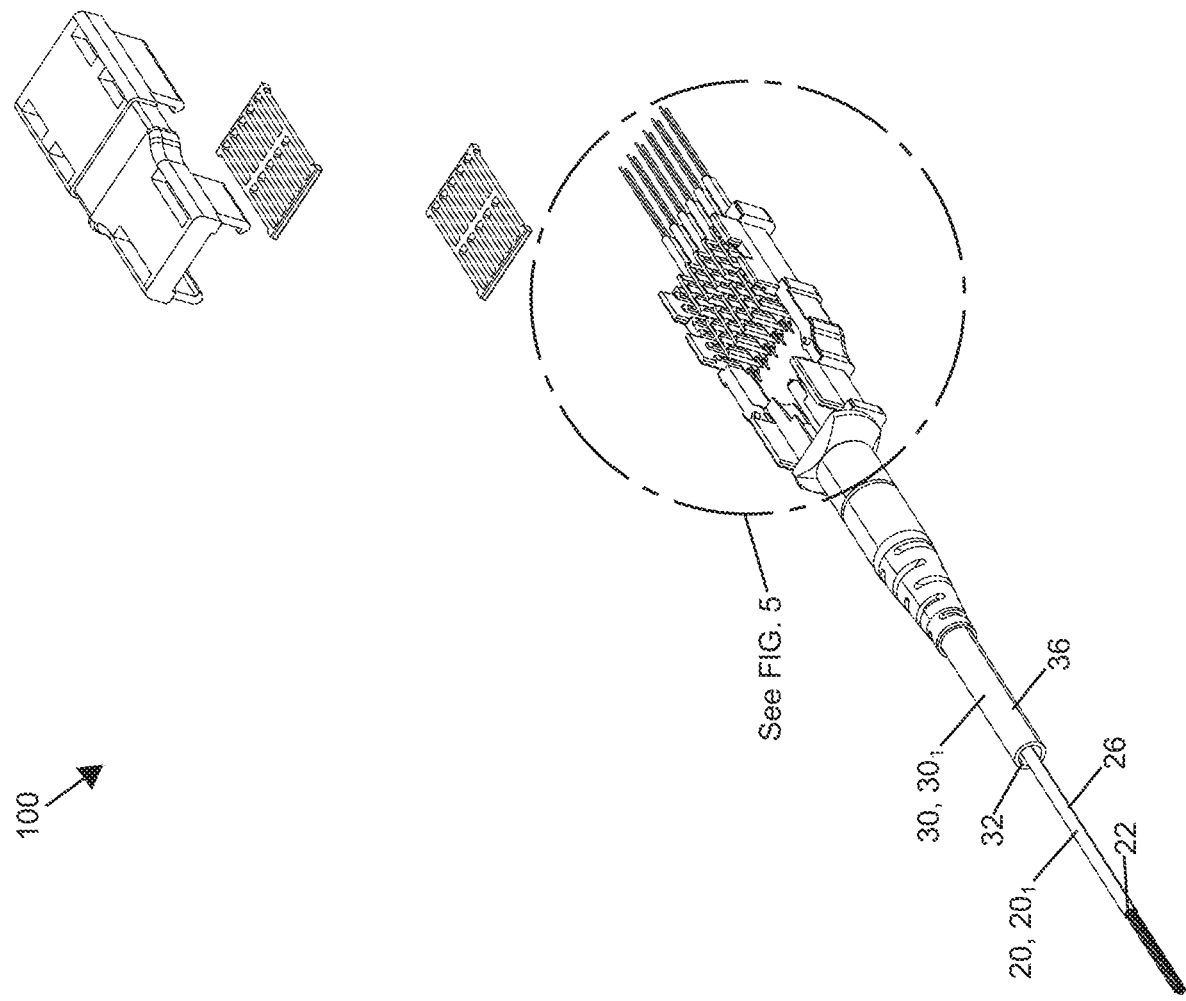
FIG. 4 is another exploded perspective view of the furcation assembly of FIG. 1.

The furcation assemblies 1000 may include strain relief members 70A and/or 70B. In particular, as illustrated at FIG. 2, the furcation assembly 110 includes a strain relief member $70A_1$ that extends from a first end 72 to a second end 74. As illustrated at FIG. 19, the furcation assembly 200 includes a strain relief member $70A_2$ that extends from a first end 72 to a second end 74. As illustrated at FIG. 33, the furcation assembly 400 includes a strain relief member $70A_4$ that extends from a first end 72 to a second end 74. As illustrated at FIG. 51, the furcation assembly 500 includes a strain relief member $70A_5$ that extends from a first end 72 to a second end 74. As illustrated at FIG. 57, the furcation assembly 600 includes a strain relief member $70A_6$ that extends from a first end 72 to a second end 74. The strain relief members 70A provide strain relief to the jacket 30 at its connection to the housing 110, 210, 410, 510, 610. As illustrated at FIG. 23, the strain relief member 70A may bridge a joint between the second end 34 of the jacket 30 and a first end 702 of the anchor 700. The second end 74 of the strain relief member 70A may be positioned over the crimp sleeve 80. As illustrated at FIGS. 2 and 4, the first end 72 of the strain relief member 70A may be positioned over the jacket 30 adjacent the second end 34 of the jacket 30.

Figure 63:
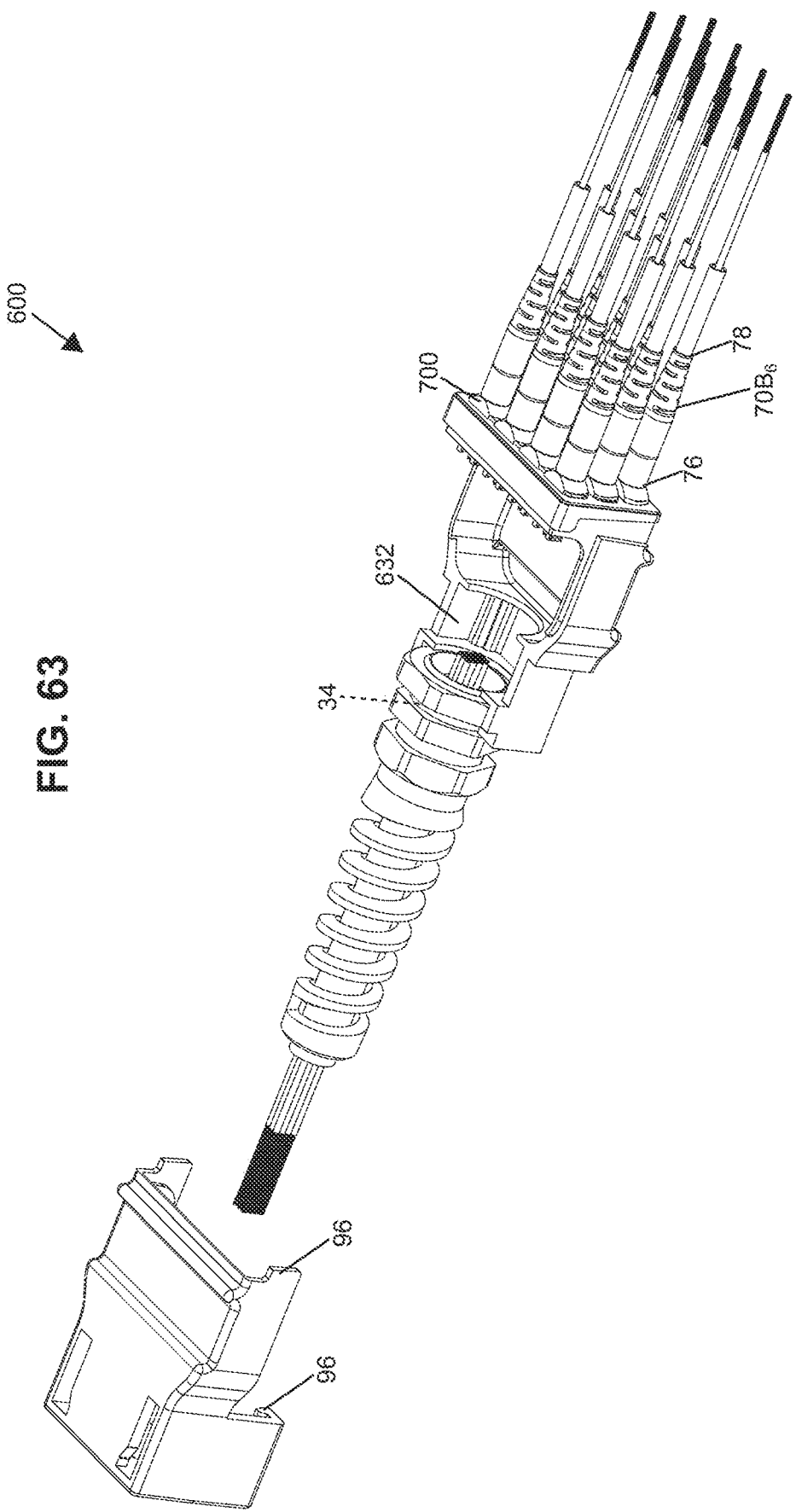
FIG. 63 is an exploded perspective view of the furcation assembly of FIG. 56.
Figure 64:
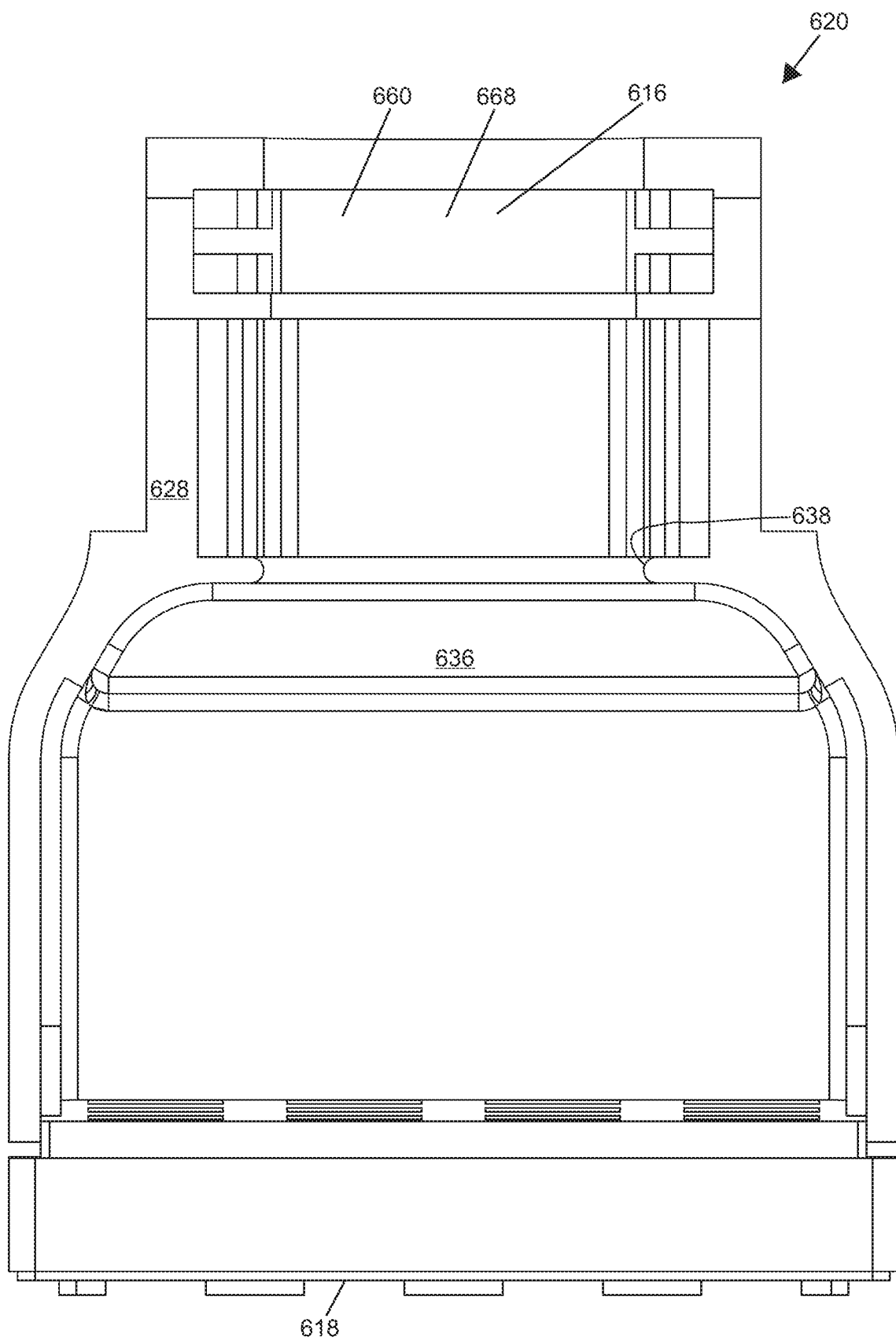
FIG. 64 is a plan view of a base of the housing of the furcation assembly of FIG. 56.

A strain relief member 70B may be included in the furcation assembles 300, 400, 600. In particular, as illustrated at FIG. 26, a strain relief member $70B_3$ extends between a first end 76 and a second end 78. As illustrated at FIG. 33, a strain relief member $70B_4$ extends between a first end 76 and a second end 78. As illustrated at FIG. 63, a strain relief member $70B_6$ extends between a first end 76 and a second end 78. The strain relief member 70B may provide strain relief to the jacket 50 adjacent the first end 52 of the jacket 50. In the depicted embodiment, the strain relief member 70B may be the same as or substantially the same as the strain relief member 70A, except for the strain relief member $70A_6$.

The furcation assemblies 300, 400, 600 may include a plurality of the strain relief members 70B. In particular, the furcation assembly 300 is illustrated with four of the strain relief members $70B_3$. The furcation assembly 400 is adapted to include two of the strain relief members $70B_4$. The furcation assembly 600 is illustrated at FIG. 63 with twelve of the strain relief members $70B_6$.

Figure 8:
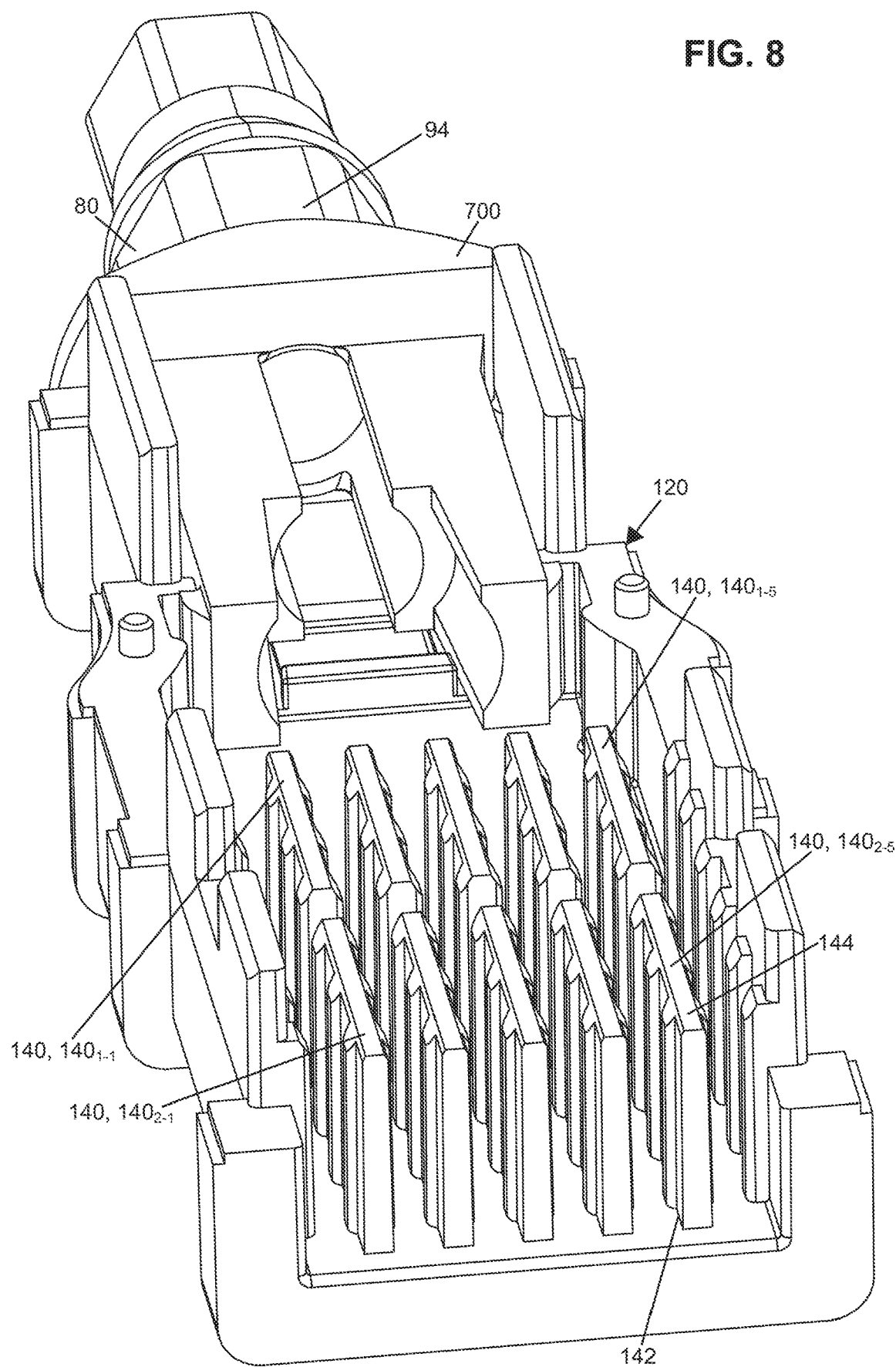
FIG. 8 is a partial perspective view of the furcation assembly of FIG. 1 with the cover, optical fibers, and other cable components removed.
Figure 28:
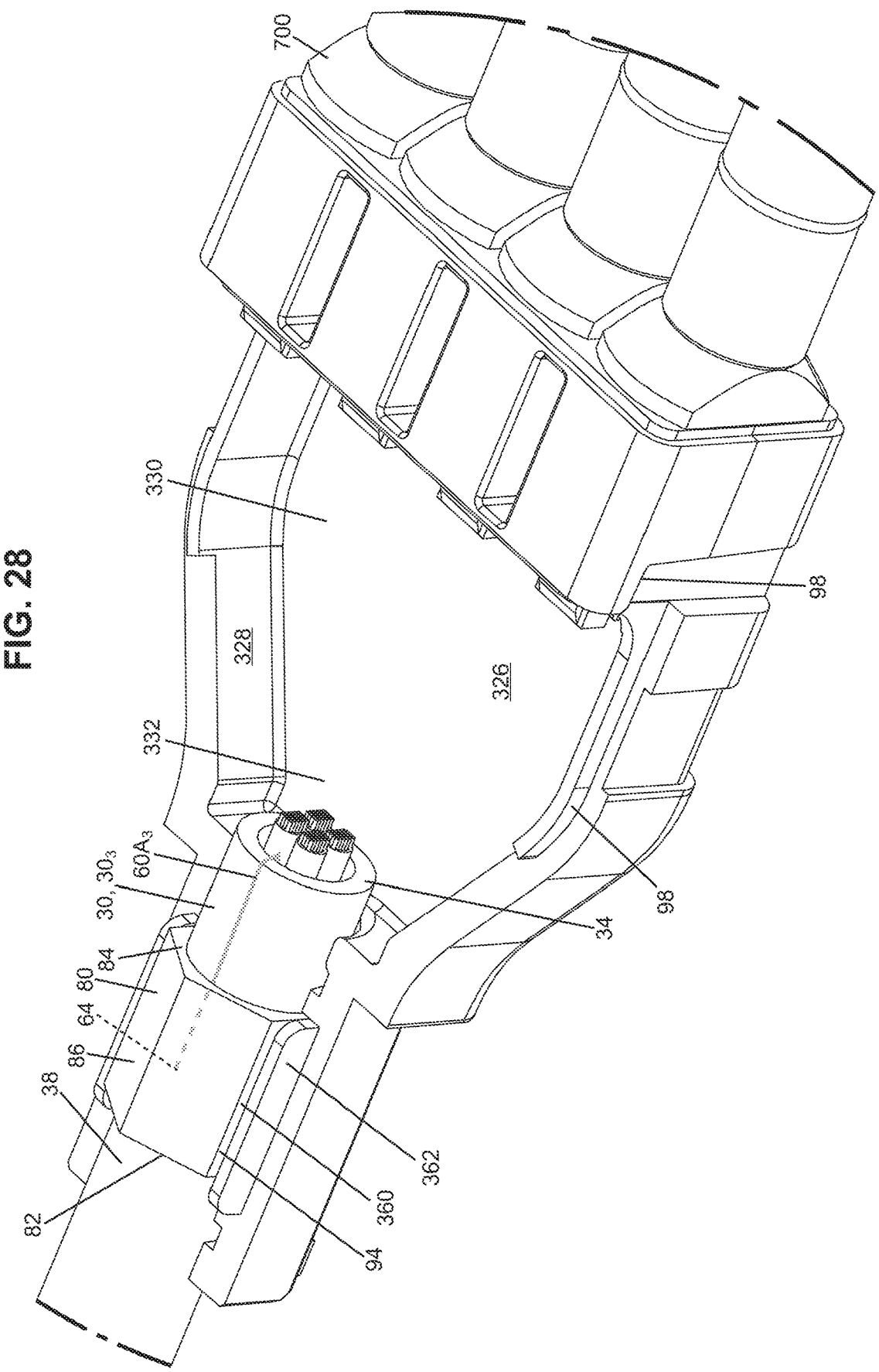
FIG. 28 is an enlarged portion of FIG. 27.
Figure 29:
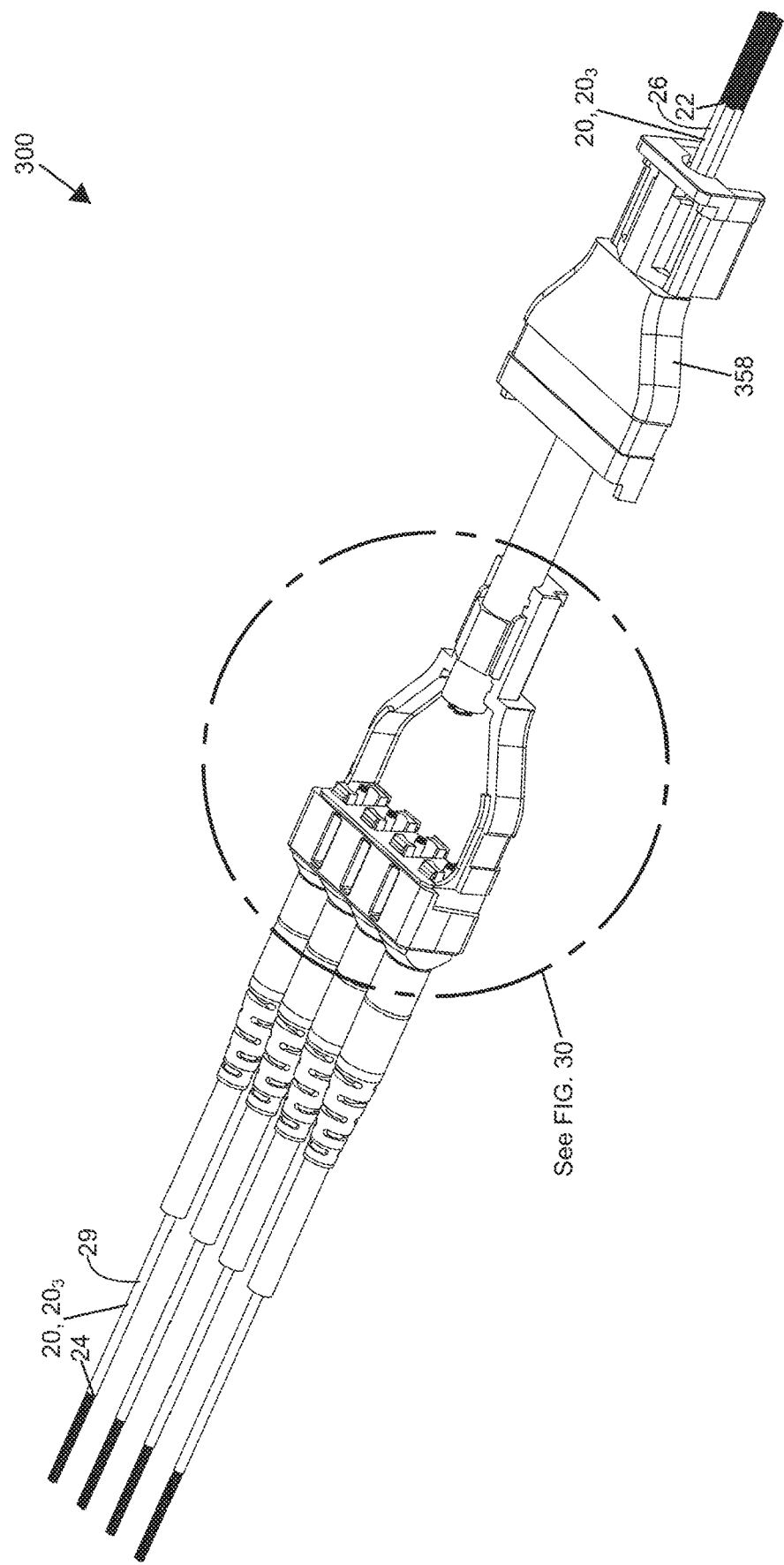
FIG. 29 is an exploded perspective view of the furcation assembly of FIG. 26.

As illustrated at FIG. 23, the furcation assemblies 1000 may include one or more crimp sleeves 80 to secure the jacket 30 and/or the jacket 50 to the furcation housing 110, 210, 310, 410, 510, 610. In connections between the jacket 30, 50 and the housing 110, 210, 310, 410, 510, 610 that include the anchor 700, the crimp sleeve 80 is positioned over a cable engaging portion 710 of the anchor 700. The strength members 60A, 60B may be positioned between an interior 88 of the crimp sleeve 80 and the cable engaging portion 710 of the anchor 700. The strain relief member 70A, 70B may be positioned about an outer circumference 86 of the crimp sleeve 80. As illustrated at FIGS. 8 and 28, the crimp sleeve 80 may be formed into a polygonal shape upon crimping about the jacket 30 or 50. In particular, the crimp sleeve 80 is illustrated as being crimped into a hexagonal shape. The crimp sleeve 80 may thereby include an anti-rotation feature 94 that engages the furcation housing either directly or indirectly.

Figure 32:
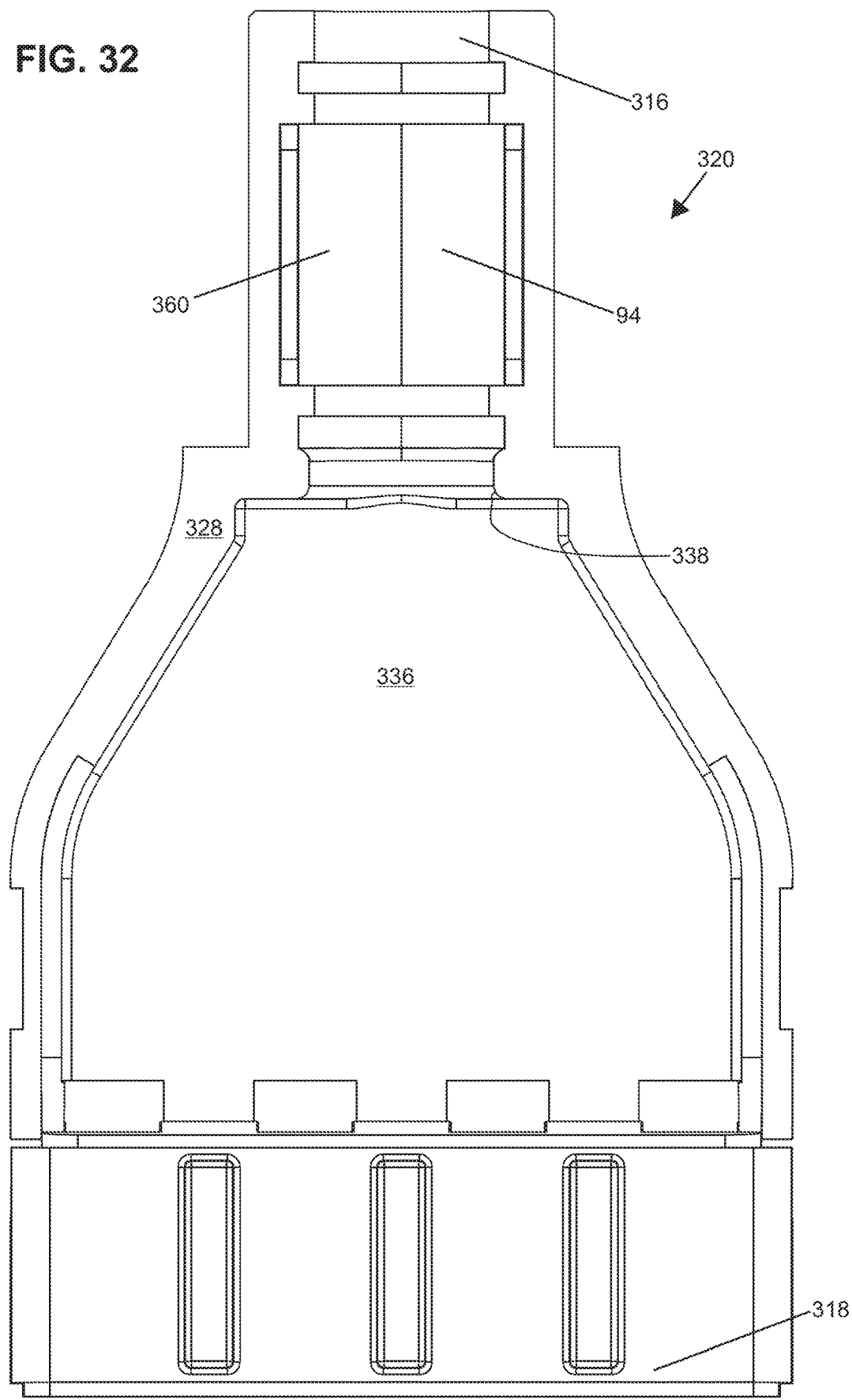
FIG. 32 is a plan view of a base of the housing of the furcation assembly of FIG. 26.

The anti-rotation feature 94 of the outer circumference 86 of the crimp sleeve 80 may provide an anti-rotation connection between the housing 310 and the cable 30. In particular, as illustrated at FIG. 28, the drop-in channel 360 of the main body 320 of the housing 310 includes a pair of opposing protrusions 362 that engage opposite sides of the anti-rotation feature 94 of the crimp sleeve 80 directly. As illustrated at FIG. 32, the crimp sleeve 80 extends between a first end 82 and a second end 84. The jacket 30 is inserted into the first end 82 of the crimp sleeve 80. The second end 34 of the jacket 30 may be further slid within the crimp sleeve 80 until the second end 34 abuts the first end 702 of the anchor 700. The crimp sleeve 80 may be similarly used with the jacket 50. Upon crimping the crimp sleeve 80 around the jacket 30, 50, the crimp sleeve 80 provides structural support for the jacket 30 adjacent the second end 34 of the jacket 30. Likewise, the jacket 50 of the furcation assembly 300, 400, 600 may be supported by the crimp sleeve 80.

Turning now to FIGS. 1-15, the furcation assembly 100 will be described in additional detail. As mentioned above, the furcation assembly 100 includes a first end 102 and a second end 104. The first end 102 may be terminated at a connector or the first end 102 may continue on and join continuously with another furcation assembly. The second end 104 of the furcation assembly 100 includes a plurality of furcation tubes $40_{1-1}$ to $40_{N-M}$, where N is the number of rows of the furcation tubes $40_{N-M}$ and M is the number of columns of the furcation tubes $40_{N-M}$. As depicted, the furcation assembly 100 may accommodate up to six columns of the furcation tubes $40_{N-M}$ and may accommodate up to four rows of the furcation tubes $40_{N-M}$. In the depicted embodiment, strength members are not included at the second end 104 of the furcation assembly 100.

The furcation assembly 100 further extends between a first side 106 and a second side 107. The furcation assembly 100 further extends between a third side 108 and a fourth side 109. For convenience of description and in no way limiting the orientation of the furcation assembly 100, the first side 106 may be referred to as a top side, and the second side 107 may be referred to as a bottom side. The third side 108 may be referred to as a right side, and the fourth side 109 may be referred to as a left side. As mentioned above, the furcation assembly 100 includes a housing 110. The housing 110 extends between a first end 112 and a second 114 along the axial direction A1. The first side 106 may be spaced from the second side 106 along the transverse direction T1. The third side 108 may be spaced from the fourth side 109 along the lateral direction L1. The housing 110 extends between the first end 112 and the second end 114 along the axial direction A1. The first end 112 includes a first opening 116, and the second end 114 includes a second opening 118. The first and second openings 116, 118 allow the plurality of optical fibers 10 to pass through the housing 110.

The housing 110 includes a main body 120 and a cover 150. As illustrated at FIG. 13, the cover 150 may be separated from the main body 120 by removing along the transverse direction T1. Similarly, the cover 150 may be installed over the main body 120 along the transverse direction T1. As depicted at FIGS. 2 and 13, the cover 150 includes a plurality of cover to main body engagement features 96. As depicted at FIG. 13, the main body 120 includes a plurality of main body to cover engagement features 98. In the depicted embodiment, certain of the cover to main body engagement features 96 are latches that engage catches positioned on the main body 120. In the depicted embodiment, certain of the main body to cover engagement features 98 are catches that engage latches positioned on the cover 150.

As illustrated at FIG. 3, the main body 120 includes a first end portion 122 and a second end portion 124. The first end portion 122 is depicted adjacent the first end 112 of the housing 110. The second end portion 124 is depicted adjacent the second end 114 of the housing 110. As depicted at FIG. 6, the main body 120 includes a wall 126 positioned at the second side 107 of the furcation assembly 110. As depicted, a pair of opposing sides 128 extends perpendicularly away from the wall 126. The sides 128 are thereby positioned adjacent the third and fourth sides 108, 109 of the furcation assembly 110. The transition cavity 130 is defined between the first end portion 122 and the second end portion 124. The transition cavity 130 is defined by the wall 126 and the sides 128 of the main body 120. The transition cavity 130 extends between a first end 132 and a second end 134. The transition cavity 130 may have a funnel shape 136 that becomes wider when moving from the first end portion 122 to the second end portion 124. The transition cavity 130 may have a constriction/shoulder 138, as illustrated at FIG. 7.

As illustrated at FIGS. 3 and 7, the second end portion 124 may include a plurality of protrusions 140 that extend from the wall 126. In particular, the protrusions 140 may extend between a base end 142 and a free end 144. As illustrated at FIGS. 3 and 5, portions of the sides 128 of the main body 120 may form protrusions $140s$. As illustrated at FIG. 7, the protrusions 140 may be identified by location with subscripts N and M. In particular, an array of protrusions $140_{1-1}$ to $140_{2-5}$ is illustrated protruding from the wall 126 at the second end portion 124 of the main body 120. As illustrated at FIGS. 3 and 5, the protrusions $140s$ are labeled $140_0$ and $140_6$.

As illustrated at FIG. 7, the protrusions 140 and $140s$ form a plurality of longitudinal channels 146. The longitudinal channels 146 may be identified by subscripts. In particular, a location of the longitudinal channel may be specified by the subscript. In the depicted embodiment, the six longitudinal channels $146_1$ to $146_6$ are formed between the protrusions 140 and $140s$. The longitudinal channels 146 are oriented along the axial direction A1. The longitudinal channels 146 open to the second opening 118 of the housing 110 and also open to the transition cavity 130. The protrusions $140s$ and 140 may include a plurality of ribs 92. The ribs 92 are depicted as occurring in opposing pairs across the longitudinal channels 146. The ribs 92 are depicted extending in the transverse direction T1. The opposing ribs 92 may engage the furcation tubes 40, positioned within the longitudinal channels 146. The ribs 92 may further interface with the glue 90 and thereby aid in securing the furcation tubes 40 to the housing 110.

Figure 54:
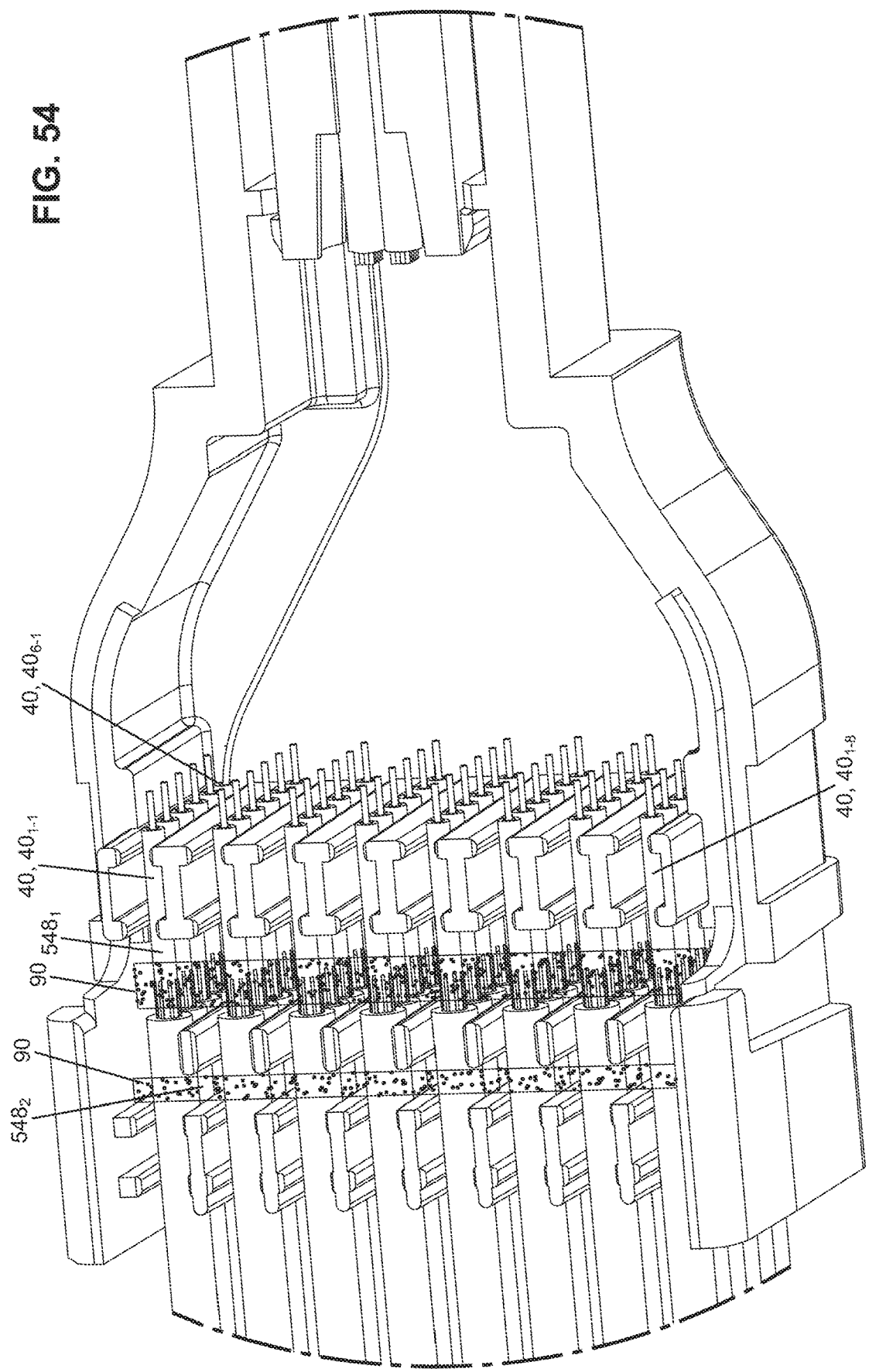
FIG. 54 is the partial perspective view of FIG. 53, but with a glue applied, according to the principles of the present disclosure.
Figure 55:
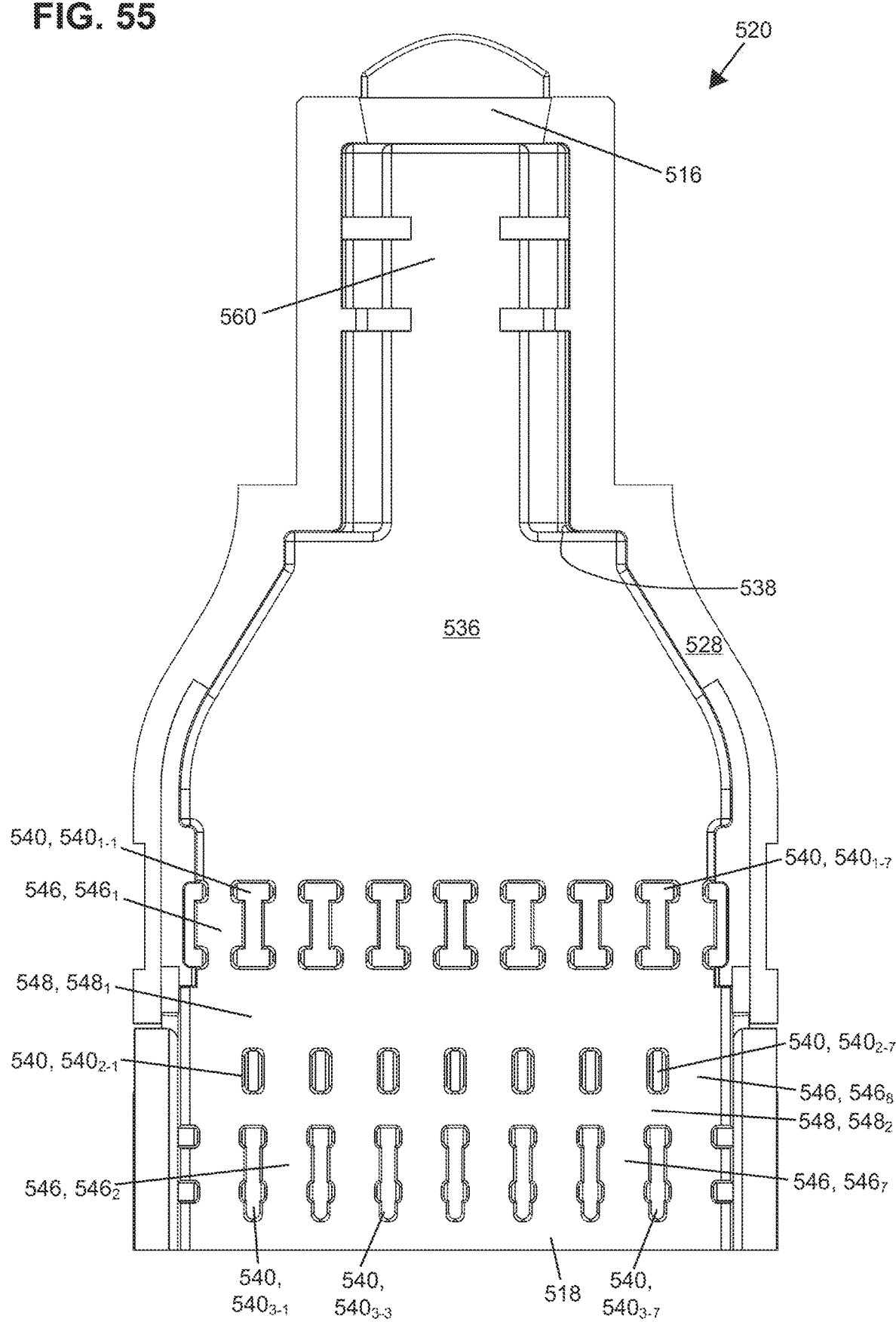
FIG. 55 is a plan view of a base of the housing of the furcation assembly of FIG. 48.

As illustrated at FIG. 7, a lateral channel 148 is positioned between the first row of protrusions $140_{1-1}$ to $140_{1-5}$ and the second row of protrusions $140_{2-1}$ to $140_{2-5}$. As illustrated at FIG. 54, glue 90 may be applied to the lateral channel 148. The lateral channel 148 extends along the lateral direction L1.

The cover 150 will now be described in additional detail. The cover 150 includes a first end portion 152 and a second end portion 154. The cover 150 defines a wall 156 and a pair of opposing sides 158 that extend perpendicularly from the wall 156. As depicted, the cover 150 secures the anchor 700 within the housing 110. In particular, the anchor 700 may be assembled into the drop-in channel 160 of the main body 120. As illustrated at FIG. 3, a pair of opposing protrusions 162 may further define the drop-in channel 160. Upon positioning the anchor 700 within the drop-in channel 160, the cover 150 may be positioned over the main body 120 and latched to the main body 120 thereby trapping the anchor 700 within the drop-in channel 160.

Figure 9:
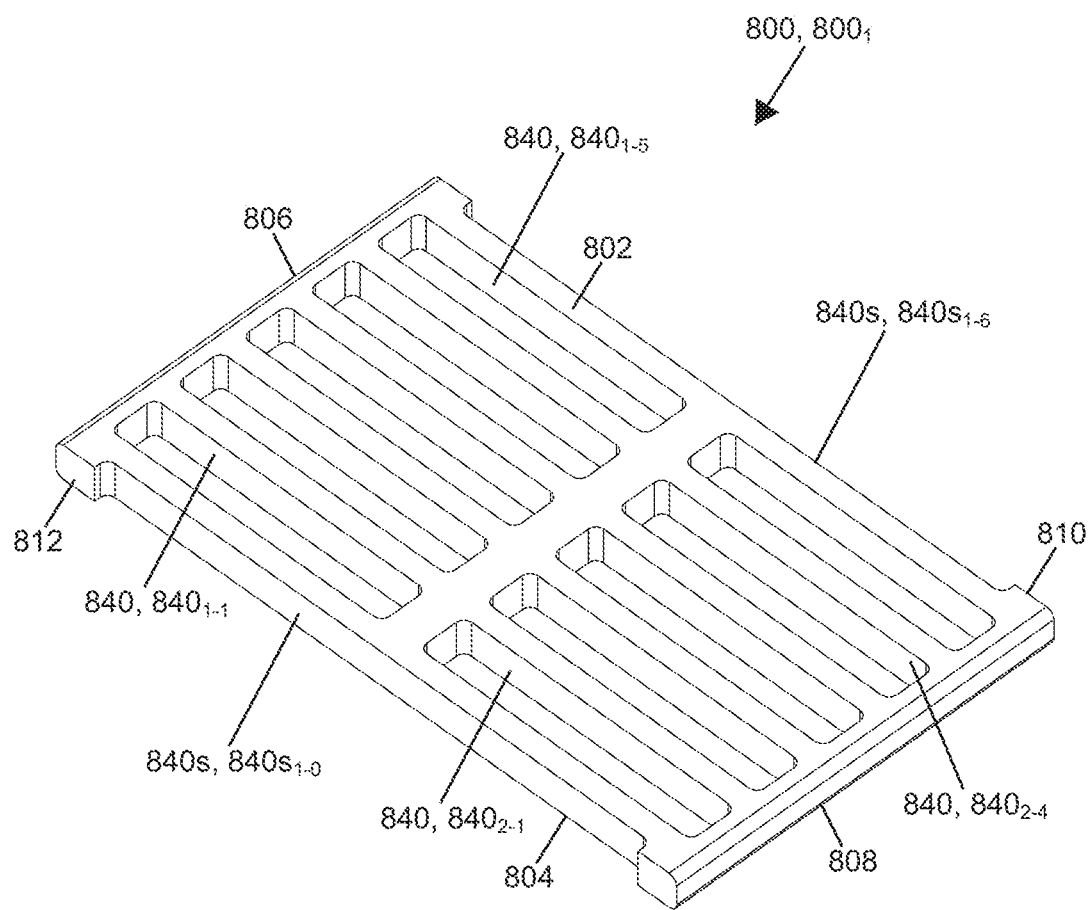
FIG. 9 is a perspective view of a spacer adapted for use with the furcation assembly of FIG. 1, according to the principles of the present disclosure.
Figure 10:
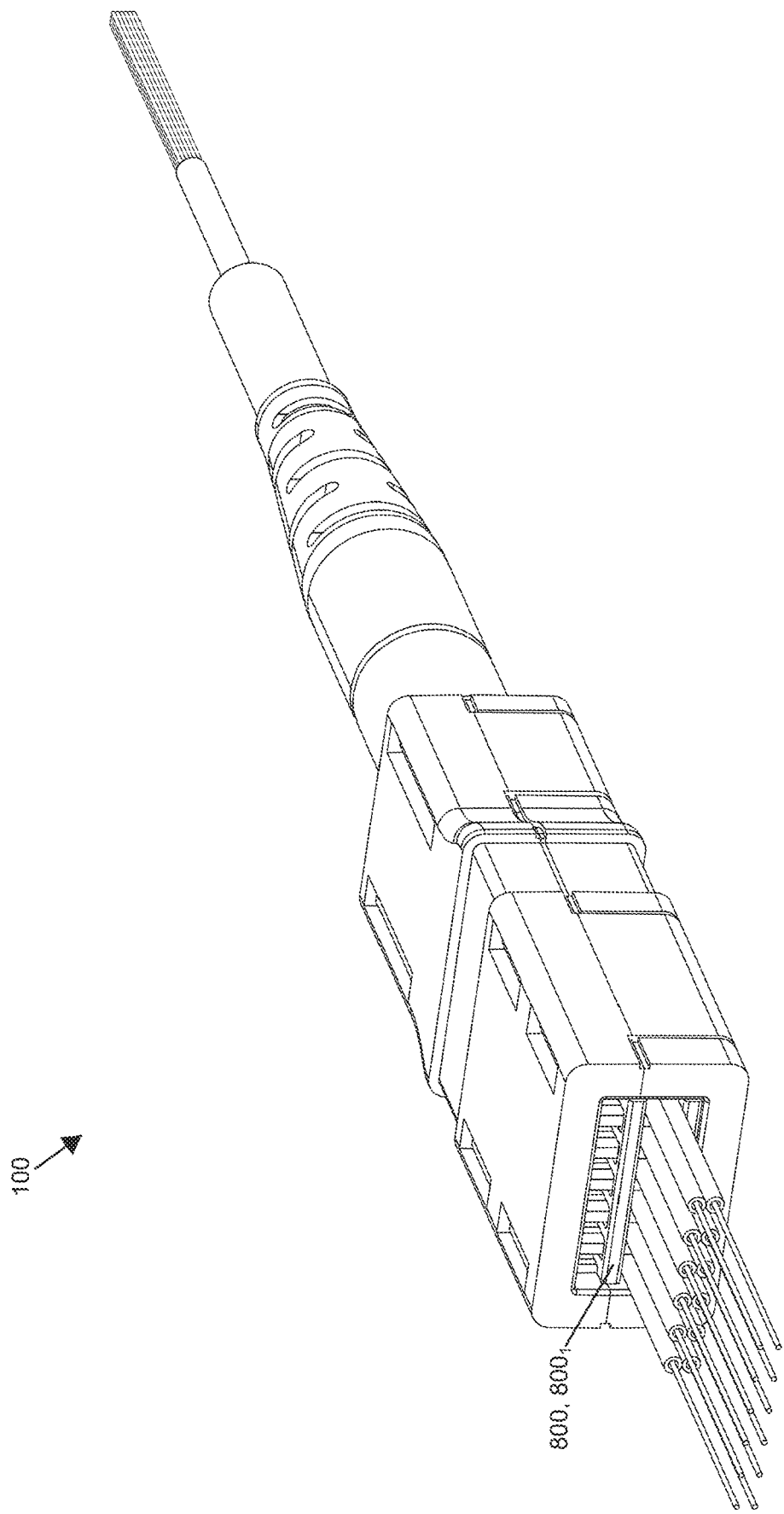
FIG. 10 is a perspective view of the furcation assembly of FIG. 1 further illustrating the spacer of FIG. 9.
Figure 11:
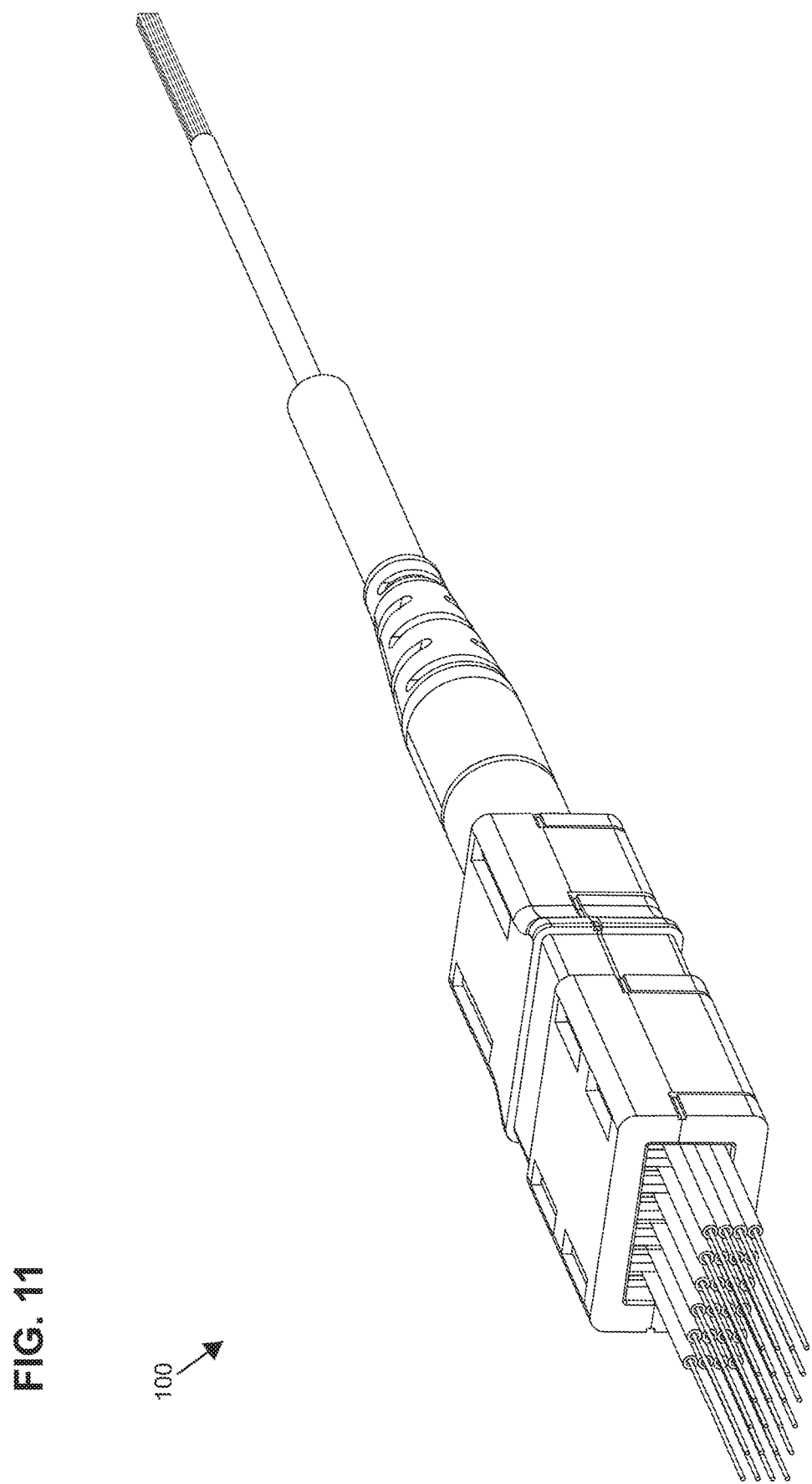
FIG. 11 is a perspective view of the furcation assembly of FIG. 1.
Figure 12:
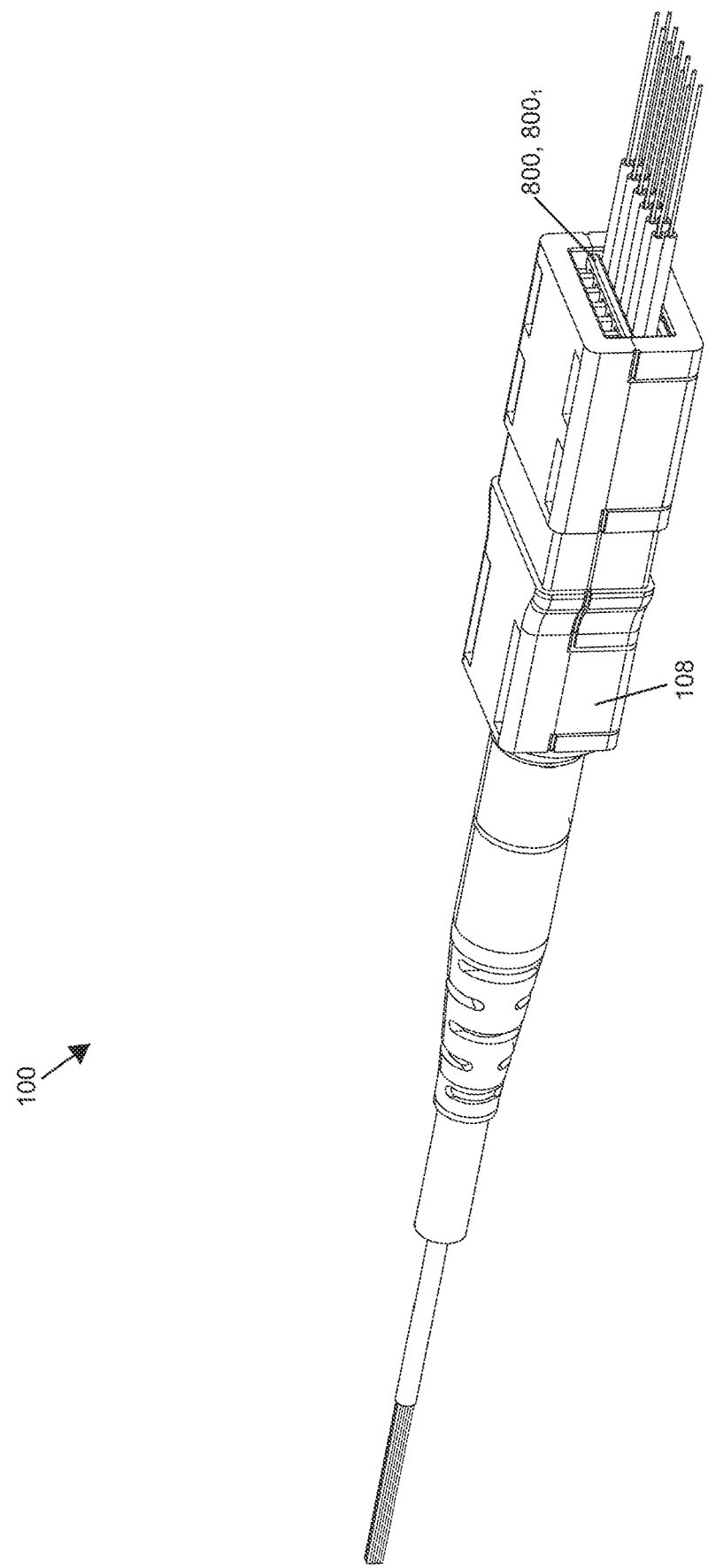
FIG. 12 is another perspective view of the furcation assembly of FIG. 1.

A spacer 800 may be used to take up excess room in the transverse direction T1 within the longitudinal channels 146 and the lateral channel 148. The spacer 800 allows one or more rows of the furcation tubes 40 to be removed without creating excess clearance within the longitudinal channels 146 and/or the lateral channel 148. The spacer 800 extends from a first side 802 to a second side 804 and thereby defines a thickness of the spacer 800. The spacer 800 further extends between a first edge 806 and a second edge 808. The spacer 800 further extends between a third edge 810 and a fourth edge 812. A plurality of slots 840 are defined in the spacer 800. The plurality of slots 840 is adapted to receive the plurality of protrusions 140 of the main body 120. The spacers 800 may further have reliefs 840s along the third edge 810 and the fourth edge 812. These reliefs 840s are adapted to accommodate the protrusions 140s. As illustrated at FIG. 9, the slots 840 and the reliefs 840s may be identified in location by subscripts. In particular, the spacer $800_1$ includes two rows and five columns of the slots 840 and includes one row and two columns of the reliefs 840s. The slots $840_{1-1}$ to $840_{2-5}$ correspond to similarly subscripted protrusions 140. Likewise, the reliefs $840s_{1-0}$ to $840s_{1-6}$ correspond to the protrusions 140s.

Turning now to FIGS. 16-25, the furcation assembly 200 will be described in additional detail. As the furcation assembly 200 shares certain features with the furcation assembly 100, the redundant features may not necessarily be redundantly described. Where possible, the subscripting conventions, used in identifying components and features of the furcation assembly 100, will be retained for components and features of the furcation assembly 200. Where possible and when convenient, the last two digits of component and features of the furcation assembly 200 correspond with the last two digits of features and components of the furcation assembly 100.

As with the furcation assembly 100, the furcation assembly 200 extends from the first end 202 to the second end 204. Likewise, the furcation assembly 200 extends between a first side 206 and a second side 207. Likewise, the furcation assembly 200 extends between a third side 208 and a fourth side 209. The housing 210 of the furcation assembly 200 extends between the first end 212 and a second end 214. A first opening 216 is included at the first end 212 of the housing. A second opening 218 is included at the second end 214 of the housing 210.

The main body 220 of the housing 210 includes a first end portion 222 and a second end portion 224. A transition cavity 230 is positioned between the first end portion 222 and the second end portion 224. As with the wall 126 and the pair of sides 128 of the main body 120, the main body 220 also includes a wall 226 and a pair of opposing sides 228. As with the transition cavity 130, the transition cavity 230 extends between a first end 232 and a second end 234. A funnel 236 may be defined between the first end 232 and the second end 234. A constriction/shoulder 238 may also be defined within the main body 220.

Figure 22:
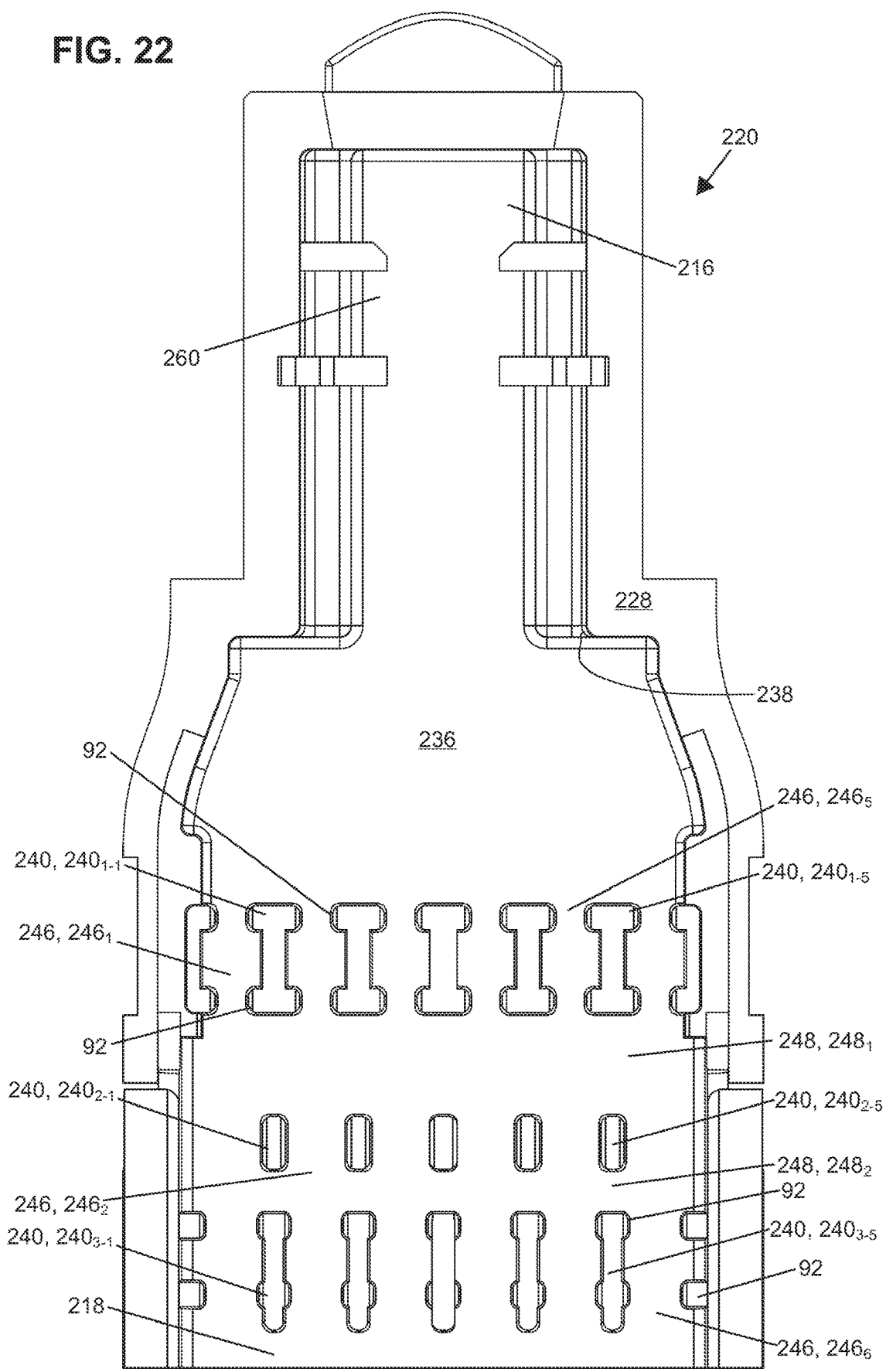
FIG. 22 is a partial plan view of a base of the housing of the furcation assembly of FIG. 16.

As illustrated at FIG. 22, the main body 220 includes a plurality of protrusions 240. An additional row of protrusions 240 is provided in the main body 220 in comparison with the main body 120. As three rows of the protrusions 240 are provided, two lateral channels 248 are defined. As illustrated at FIG. 21, strength members $60B_2$ extend into the lateral channel $248_1$. As illustrated at FIG. 54, glue 90 may be applied within the lateral channel $248_1$ and thereby join the strength members $60B_2$ to the main body 220. The glue 90 in the lateral channel $248_1$ may further bond furcation tubes 40, which extend through the lateral channel $248_1$. The glue 90 can further be applied within the lateral channel $248_2$. As illustrated at FIG. 21, the jackets 50 extend through the lateral channel $248_2$. The glue 90 may thereby hold the plurality of jackets $50_2$ to the main body 220. As with the protrusions 140, the protrusions 240 extend from a base end 242 to a free end 244.

Longitudinal channels 246 are similarly formed between the protrusions 240, 240s. However, the longitudinal channels 246 of the main body 220 locate and hold and may further bond to the plurality of furcation tubes 40 and the plurality of the jackets 50. In addition, the furcation assembly 200 includes the strength members $60B_2$ that may further connect the furcation portion to the housing 210 of the furcation assembly 200.

Figure 18:
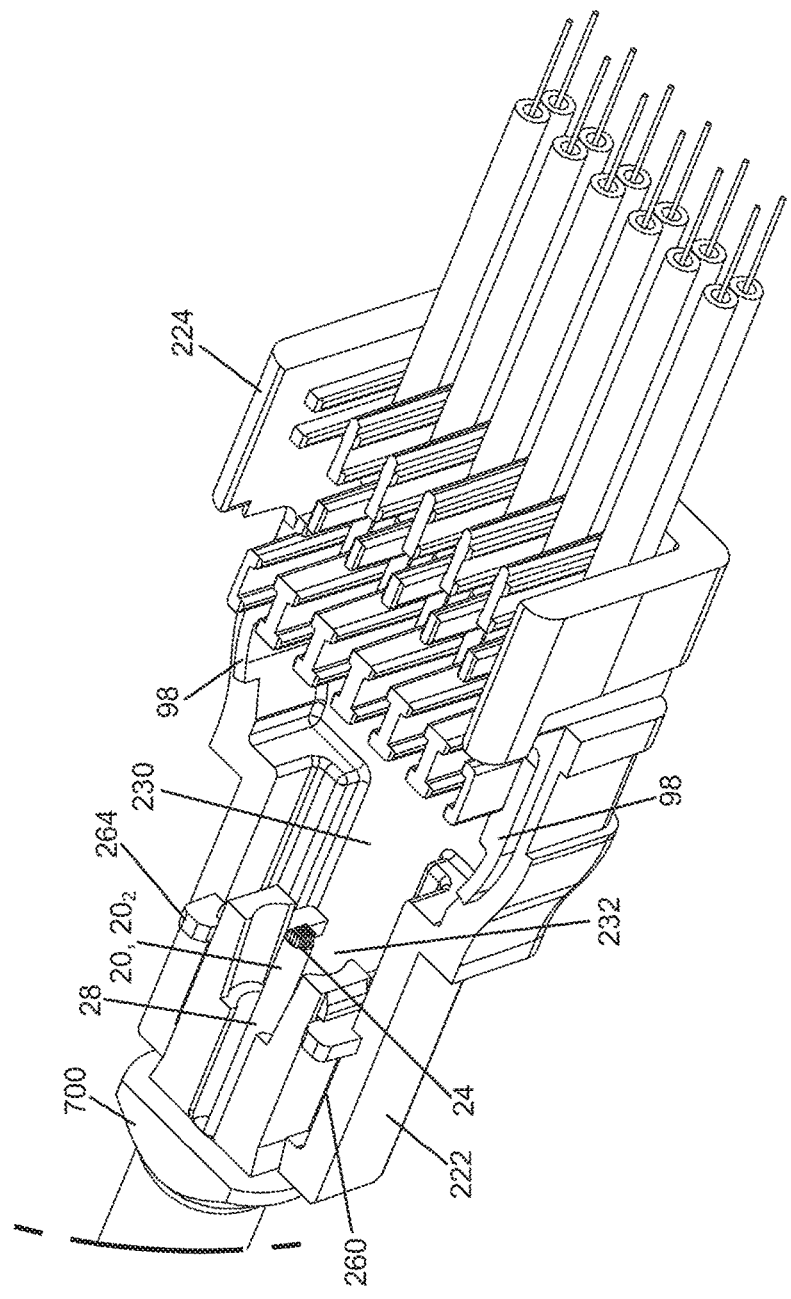
FIG. 18 is an enlarged portion of FIG. 17.

A drop-in channel 260 of the main body 220 is similar to the drop-in channel 160 of the main body 120. However, as illustrated at FIG. 18, the main body 220 includes a pair of opposing latches 264 that further aids in retaining the anchor 700 within the drop-in channel 260.

The housing 210 of the furcation assembly 200 includes a cover 250. Unlike the cover 150 of the furcation assembly 100, the cover 250 of the furcation assembly 200 installs on the main body 220 along the axial direction A2. The cover 250 includes a first end portion 252 and a second end portion 254. The cover 250 includes a wall 256 with a pair of opposing sides 258 that extend perpendicularly from the wall 256. The cover 250 includes a pair of cover to main body engagement features 96 that attach to the main body 220 when the cover 250 is slid into the main body 220 along the axial direction A2.

Turning now to FIGS. 48-55, the furcation assembly 500 will now be described in detail. As the furcation assembly 500 shares certain features with the furcation assemblies 100 and 200, the redundant features may not necessarily be redundantly described. Where possible, the subscripting conventions, used in identifying components and features of the furcation assemblies 100 and 200, will be retained for components and features of the furcation assembly 500. Where possible and when convenient, the last two digits of component and features of the furcation assembly 500 correspond with the last two digits of features and components of the furcation assemblies 100 and 200.

Similar to the furcation assemblies 100, 200, the furcation assembly 500 extends between the first end 502 and the second end 504. The furcation assembly 500 further extends between a first side 506 and a second side 507. The furcation assembly 500 further extends between a third side 508 and a fourth side 509. The furcation assembly 500 includes a housing 510 that extends between a first end 512 and a second end 514. The housing 510 includes a first opening 516 at the first end 512 and a second opening 518 at the second end 514. The housing 510 includes a main body 520 and a cover 550. The main body 520 includes a first end portion 522 and a second end portion 524. The main body 520 defines a wall 526 and a pair of opposite sides 528 that extend perpendicularly from the wall 528. Similar to the main bodies 120, 220, the main body 520 defines a transition cavity 530 between the first end portion 522 and the second end portion 524. The transition cavity 530 extends between a first end 532 and a second end 534. The transition cavity 530 defines a funnel 536. The main body 520 may define a constriction/shoulder 538. As with the main body 220 defining a plurality of protrusions 240, the main body 520 defines a plurality of protrusion 540. The main body 520 similarly defines a plurality of protrusions 540s, similar to the protrusions 240s. The main body 520 includes two additional columns of protrusions 540. As with the protrusions 240, the protrusions 540 extend between a base end 542 and a free end 544 and define a plurality of longitudinal channels 546. In particular, eight longitudinal channels 546 are defined by the plurality of protrusions 540, 540s. Similar to the main body 220 defining a plurality of lateral channels 248, the main body 520 defines a plurality of lateral channels 548.

The cover 550 is similar to the cover 250. The cover 550 includes a first end portion 552 and a second end portion 554. The cover 550 defines a wall 556 and a pair of opposing sides 558 that extend perpendicularly away from the wall 556.

The main body 520 defines a drop-in channel 560 similar to the drop-in channel 160 of the main body 120. The drop-in channel 560 includes a plurality of catches 566 adapted to engage the anchor 700.

Turning now to FIGS. 26-32, the furcation assembly 300 will be described in additional detail. The furcation assembly 300 extends between the first end 302 and the second end 304. The furcation assembly 300 further extends between a first side 306 and a second side 307. The furcation assembly 300 further extends between a third side 308 and a fourth side 309. The furcation assembly 300 includes a housing 310. The housing 310 extends between a first end 312 and a second end 314. The housing 310 includes a first opening 316 at the first end 312 and a second opening 318 at the second end 314. The housing 310 includes a main body 320 and a cover 350. As illustrated at FIG. 27, the cover 350 is installed on the main body 320 by sliding the cover 350 in the axial direction A3.

The main body 320 extends between a first end portion 322 and a second end portion 324. The main body 320 defines a wall 326 with a pair of opposing sides 328 projecting perpendicularly away from the wall 326. The main body 320 defines a transition cavity 330 positioned between the first end portion 322 and a second end portion 324. The transition cavity 330 extends between a first end 322 and a second end 334. The transition cavity 330 defines a funnel shape 336. The funnel shape 336 may widen as the cavity extends from the first end 332 toward the second end 334. The main body 320 may define a constriction/shoulder 338.

As depicted at FIG. 30, the second end portion 324 of the main body 320 defines a plurality of ports 340. As depicted, four of the ports $340_1$ through $340_4$ are defined in the main body 320. The ports are adapted to receive the anchor 700 and retain the anchor 700 when the anchor 700 is inserted through the ports 340.

The cover 350 includes a first end portion 352 and a second end portion 354. The cover defines a wall 356 and a plurality of opposing sides 358 that extend perpendicular away from the wall 356.

Turning now to FIGS. 33-39 and 47, the furcation assembly 400 will be described in additional detail. The furcation assembly 400 is similar to the furcation assembly 300, except the furcation assembly 400 includes only two of the ports 440. As depicted at FIG. 33, one of the ports 440 has an anchor 700 installed while the other port 440 has a plug 750 installed. In other configurations, the anchor 700 is installed in both of the ports 440. A difference between the furcation assembly 400 and the furcation assembly 300 is that the furcation assembly 400 includes a drop-in channel 460 similar to the drop-in channel 260 of the main body 200. The drop-in channel 460 includes a pair of protrusions 462 and a pair of latches 464 to retain the anchor 700 within the drop-in channel 460.

The furcation assembly 400 extends between a first end 402 and a second end 404. The furcation assembly 400 further extends between a first side 406 and a second side 407. The furcation assembly 400 further extends between a third side 408 and a fourth side 409. A housing 410 of the furcation assembly 400 includes a first end 412 and a second end 414. A first opening 416 extends through the first end 412. A second opening 418 extends through the second end 414.

A main body 420 includes a first end portion 422 and a second end portion 424. The main body 420 includes a wall 426 and a pair of opposing sides 428 that extend perpendicularly away from the wall 426. The main body 420 includes a transition cavity 430 that extends between a first end 432 and a second end 434. The transition cavity 430 may not necessarily include a funnel as the main body 420 is narrow because the second end portion 424 only includes a pair of the ports 440. The main body 420 may include a constriction/shoulder 438.

The housing 410 includes a cover 450. The cover 450 is similar to the cover 350. The cover 450 includes a first end portion 452 and a second end portion 454. The cover 450 defines a wall 456 and a pair of opposing sides 458 that extend perpendicularly from the wall 456.

Turning now to FIGS. 56-64, the furcation assembly 600 will be described in detail. The furcation assembly 600 extends between a first end 602 and a second end 604. The furcation assembly 600 extends between a first side 606 and a second side 607. The furcation assembly 600 further extends between a third side 608 and a fourth side 609. The furcation assembly 600 includes a housing 610. The housing 610 includes a main body 620 and a cover 650. The housing 610 includes a first end 612 and a second end 614. The first opening 616 extends through the first end 612 and a second opening 618 extends through the second end 614. The main body 620 includes a first end portion 622 and a second end portion 624. The main body 620 defines a wall 626 and a pair of opposed sides 628 that extend perpendicularly away from the wall 626. The main body 620 defines the transition cavity 630. The transition cavity 630 extends between a first end 622 and a second end 634. The transition cavity 630 defines a funnel shape 630 that becomes wider as the transition cavity 630 approaches the second end 634. The main body 620 may define a construction/shoulder 638.

The second end portion 624 of the main body 620 defines a plurality of ports 640. Individual ports 640$_{N\text{-}M}$ are arranged in N rows and M columns. In the example embodiment of the furcation assembly 600, there are three rows and four columns of the ports 640. The ports 640 are adapted to receive the anchor 700 and retain the anchor 700 to the main body 620. The main body 620 defines a drop-in channel 660 at the first end portion 622 of the main body 620. The drop-in channel 660 may include a nut receiver 668 and thereby rotationally orient the housing 610 with respect to the jacket 30$_6$.

The cover 610 includes a first end portion 652 and a second end portion 654. The cover 650 may define a wall 656 and a plurality of opposing sides 658 extends perpendicularly away from the wall 656. A pair of opposed cover to main body engagement members 96 may secure the cover 650 to the main body 620.

Turning now to FIGS. 23 and 40-43, the anchor 700 will be described in detail. The anchor 700 extends between the first end 702 and a second end 704. The anchor 700 includes a pair of opposing sides 706. The anchor 700 includes the cable engaging portion 710. The cable engaging portion 710 includes a first end 712 and a second end 714. The cable engaging portion 710 further includes an exterior 716 and an interior passage 718. The anchor 700 includes a flange 720. The flange 720 includes a cylindrical portion 726 and extends between a first end 722 and a second end 724. The anchor 700 includes a latch 730. The latch extends between a first end 732 and a second end 734. The latch 730 includes a pair of cantilevered arms 736. The cantilevered arms 736 include free ends 738 with latching elements 740. The latching elements 740 include ramps 742 that allow the anchor 700 to be pushed into the ports 340, 440, 640 and thereby bend the opposing cantilevered arms 736 toward each other as the latching elements 740 pass through the port 340, 440, 640. As the latching elements 740 pass within the ports 340, 440, 640, the latching elements 740 move outwardly and engage the catches. The anchor 700 may include a circular relief 744 to provide easy access to the interior passage 718.

Example materials and specifications that may be used in the implementation of the furcation assemblies 1000 will now be mentioned. The optical fiber 10 may include 250 μm optical fiber and/or bend insensitive optical fiber. The optical fiber 10 may be coated. The optical fiber 10 may be made of glass.

Cable structures (i.e., portions of optical fibers 10 surrounded by a jacket 30, 50) may be micro-tube cable structures. Micro-tube cable structures may include a jacket 30, 50 with tubular sub-units (i.e., micro-tubes 20). The micro-tubes 20 allow the optical fibers 10 to move free within the micro-tubes 20.

The strength members 60, 60A, 60B of the furcation assemblies 1000 may include aramid yarn (e.g., DuPont™ Kevlar®). The strength members 60, 60A, 60B of the furcation assemblies 1000 may include a single strand (as shown), a plurality of strands, and/or a woven, wound, or other grouping of strands. The strength members 60, 60A, 60B of the furcation assemblies 1000 may surround the optical fiber(s) 10.

The strain relief members 70A, 70B of the furcation assemblies 1000 may include certain boots suitable for MPO connectors and spring pushes of such MPO connectors. For example, the strain relief members 70A, 70B may be defined by drawing number C8041, BOOT, ROUND, BLACK, MTP®, drawing number C12165, BOOT, ROUND, MTP®, 3.6 mm, and/or related drawings published by USCONEC of Hickory, NC, USA. The strain relief member 70A$_6$ may include Item Code 467368 and/or Item Code 467380, Cable Glands, Spiral—PG13.5, sold by Essentra Components of Kidlington, Oxon, United Kingdom, and/or related items.

The crimp sleeve 80 of the furcation assemblies 1000 may be an MTP® crimp band. For example, the crimp sleeve 80 may be defined by drawing number C8043, CRIMP BAND, ROUND, MTP, drawing number C12166, CRIMP BAND, ROUND, MTP®, 3.4-3.8 mm CABLES, and/or related drawings published by USCONEC of Hickory, NC, USA.

The glue 90 (i.e., adhesive) of the furcation assemblies 1000 may include cyanoacrylate (e.g., super glue). The glue 90 of the furcation assemblies 1000 may include anaerobic adhesive. The glue 90 of the furcation assemblies 1000 may include Loctite.

The anchor 700 of the furcation assemblies 1000 may be an MTP® spring push. For example, the anchor 700 may be defined by drawing number C13527, SPRING PUSH, ROUND, MTP®, HFC, 3.0 mm CABLE, drawing number C13245, SPRING PUSH, ROUND, MTP®, HFC, 3.6 mm CABLE, and/or related drawings published by USCONEC of Hickory, NC.

The furcation assembly 100 may include twelve optical fibers 10, twenty-four optical fibers 10, or other quantities of optical fibers 10. The furcation assembly 100 may therefore include twelve furcation tubes 40$_{1\text{-}1}$ to 40$_{2\text{-}6}$, twenty-four furcation tubes 40$_{1\text{-}1}$ to 40$_{4\text{-}6}$, or other quantities of furcation tubes 40$_1$. The furcation tubes 40 may have an outside diameter of 900 μm. For the furcation assembly 100 with twelve furcation tubes 40$_{1\text{-}1}$ to 40$_{2\text{-}6}$, the cable jacket 30$_1$ may have an outside diameter of 3.2 millimeters. For the furcation assembly 100 with twenty-four furcation tubes 40$_{1\text{-}1}$ to 40$_{4\text{-}6}$, the cable jacket 30$_1$ may have an outside diameter of 3.8 millimeters. The cable jacket 30$_1$ may be available in different colors. The furcation tubes 40 may be available in different colors (e.g., twelve different colors). The cover 150 may assemble to the main body 120 of the housing 110 in a direction parallel or substantially parallel to the transverse direction T1. For the furcation assembly 100 with twelve furcation tubes 40$_{1\text{-}1}$ to 40$_{2\text{-}6}$, two of the spacers 800$_1$ may be used to replace two of the rows of the furcation tubes 40 in the housing 110.

The furcation assembly 200 may include twelve optical fibers 10, twenty-four optical fibers 10, or other quantities of optical fibers 10. The furcation assembly 200 may therefore include twelve furcation tubes 40$_{1\text{-}1}$ to 40$_{2\text{-}6}$, twenty-four furcation tubes 40$_{1\text{-}1}$ to 40$_{4\text{-}6}$, or other quantities of furcation tubes 40$_2$. The furcation assembly 200 may therefore also include twelve jackets 50$_2$, twenty-four jackets 50$_2$, or other quantities of jackets 50. The jackets (i.e., furcation tubes) 50$_2$ may have an outside diameter of 1.8 millimeters. For the furcation assembly 200 with twelve furcation tubes 40$_{1\text{-}1}$ to 40$_{2\text{-}6}$, the cable jacket 30$_2$ may have an outside diameter of 3.2 millimeters. For the furcation assembly 200 with twenty-four furcation tubes 40$_{1\text{-}1}$ to 40$_{4\text{-}6}$, the cable jacket 30$_2$ may have an outside diameter of 3.8 millimeters. The cable jacket 30$_2$ may be available in different colors. The furcation tubes 40 may be available in different colors (e.g., twelve different colors). The jackets 50$_2$ may be available in different colors. The cover 250 may assemble to the main body 220 of the housing 210 in a direction parallel or substantially parallel to the axial direction A2. For the furcation assembly 200 with twelve furcation tubes 40$_{1\text{-}1}$ to 40$_{2\text{-}6}$ and twelve of the jackets 50$_2$, two of the spacers 800$_2$ may be used to replace two of the rows of the furcation tubes 40 in the housing 210.

The furcation assembly 300 may include forty-eight optical fibers 10, ninety-six optical fibers 10, or other quantities of optical fibers 10. The furcation assembly 300 may include four furcation tubes 20$_3$ or other quantities of furcation tubes 20$_3$. The furcation tubes 20$_3$ may each extend through the housing 310 continuously and uninterrupted. The furcation tubes 20$_3$ may each extend between the first end 302 and the second end 304 of the furcation assembly 300 continuously and uninterrupted. The furcation tubes 20$_3$ may each carry twelve optical fibers 10, for furcation assemblies 300 that include forty-eight optical fibers 10. The furcation tubes 20$_3$ may each carry twenty-four optical fibers 10, for furcation assemblies 300 that include ninety-six optical fibers 10. The furcation assembly 300 may therefore also include four jackets 50$_3$ or other quantities of jackets 50. The jackets (i.e., furcation tubes) 50$_3$ may have an outside diameter of 3.2 millimeters for furcation assemblies 300 that include forty-eight optical fibers 10. The jackets 50$_3$ may have an outside diameter of 3.8 millimeters for furcation assemblies 300 that include ninety-six optical fibers 10. The jackets 50$_3$ may each carry one of the furcation tubes 20$_3$ and strength member(s) 60B$_3$. The jacket 30$_3$ may have an outside diameter of 5.0 millimeters for furcation assemblies 300 that include forty-eight optical fibers 10. The jacket 30$_3$ may have an outside diameter of 6.8 millimeters for furcation assemblies 300 that include ninety-six optical fibers 10. The jacket 30$_3$ may carry four of the furcation tubes 20$_3$ and strength member(s) 60A$_3$. The cable jacket 30$_3$ may be available in different colors. The jackets 50$_3$ may be available in different colors. The cover 350 may assemble to the main body 320 of the housing 310 in a direction parallel or substantially parallel to the axial direction A3.

The furcation assembly 400 may include twelve optical fibers 10 (1×12), twenty-four optical fibers 10 (2×12 or 1×24), forty-eight optical fibers 10 (2×24), or other quantities of optical fibers 10. The furcation assembly 400 may include one furcation tube 20$_4$ (1×12 or 1×24), two furcation tubes 20$_4$ (2×12 or 2×24), or other quantities of furcation tubes 20$_4$. The furcation tubes 20$_4$ may each extend through the housing 410 continuously and uninterrupted. The furcation tubes 20$_4$ may each extend between the first end 402 and the second end 404 of the furcation assembly 400 continuously and uninterrupted. The single furcation tube 20$_4$ may carry twelve optical fibers 10 (1×12), for furcation assemblies 400 that include twelve optical fibers 10. The single furcation tube 20$_4$ may carry twenty-four optical fibers 10 (1×24), for furcation assemblies 400 that include twenty-four optical fibers 10. The furcation tubes 20$_4$ may each carry twelve optical fibers 10 (2×12), for furcation assemblies 400 that include twenty-four optical fibers 10. The furcation tubes 20$_4$ may each carry twenty-four optical fibers 10 (2×24), for furcation assemblies 400 that include forty-eight optical fibers 10. The furcation assembly 400 may therefore also include one jacket 50$_4$ (1×12 or 1×24) or two jackets 50$_4$ (2×12 or 2×24). The jackets (i.e., furcation tubes) 50$_4$ may have an outside diameter of 3.2 millimeters for furcation assemblies 400 that include twelve optical fibers 10 (1×12). The jackets (i.e., furcation tubes) 50$_4$ may have an outside diameter of 3.2 millimeters for furcation assemblies 400 that include twenty-four optical fibers 10 (2×12). The jackets 50$_4$ may have an outside diameter of 3.8 millimeters for furcation assemblies 400 that include twenty-four optical fibers 10 (1×24). The jackets 50$_4$ may have an outside diameter of 3.8 millimeters for furcation assemblies 400 that include forty-eight optical fibers 10 (2×24). The jackets 50$_4$ may each carry one of the furcation tubes 20$_4$ and strength member(s) 60B$_4$. The jacket 30$_4$ may have an outside diameter of 3.2 millimeters for furcation assemblies 400 that include twelve optical fibers 10 (1×12). The jacket 30$_4$ may have an outside diameter of 3.8 millimeters for furcation assemblies 400 that include twenty-four optical fibers 10 (2×12 or 1×24). The jacket 30$_4$ may have an outside diameter of 5.0 millimeters for furcation assemblies 400 that include forty-eight optical fibers 10 (2×24). The jacket 30$_4$ may carry one or two of the furcation tubes 20$_4$ and strength member(s) 60A$_4$. The cable jacket 30$_4$ may be available in different colors. The jackets 50$_4$ may be available in different colors. The cover 450 may assemble to the main body 420 of the housing 410 in a direction parallel or substantially parallel to the axial direction A4.

The furcation assembly 500 may include forty-eight optical fibers 10 or other quantities of optical fibers 10. The furcation assembly 500 may therefore include forty-eight furcation tubes 40$_{1-1}$ to 40$_{6-8}$ or other quantities of furcation tubes 40$_5$. The furcation assembly 500 may therefore also include forty-eight jackets 50$_5$ or other quantities of jackets 50. The jackets (i.e., furcation tubes) 50$_5$ may have an outside diameter of 1.8 millimeter. The cable jacket 30$_5$ may carry two furcation tubes 20$_5$. The furcation tubes 20$_5$ may each carry twenty-four optical fibers 10. The cable jacket 30$_5$ may have an outside diameter of 5.0 millimeters. The cable jacket 30$_5$ may be available in different colors. The furcation tubes 40 may be available in different colors. The jackets 50$_5$ may be available in different colors. The cover 550 may assemble to the main body 520 of the housing 510 in a direction parallel or substantially parallel to the axial direction A5.

The furcation assembly 600 may include 144 optical fibers 10 (12×12), 192 optical fibers 10 (8×24), 288 optical fibers 10 (12×24), or other quantities of optical fibers 10. The furcation assembly 600 may include eight furcation tubes 20$_6$, twelve furcation tubes 20$_6$, or other quantities of furcation tubes 20$_6$. The furcation tubes 20$_6$ may each extend through the housing 610 continuously and uninterrupted. The furcation tubes 20$_6$ may each extend between the first end 602 and the second end 604 of the furcation assembly 600 continuously and uninterrupted. The furcation tubes 20$_6$ may each carry twelve optical fibers 10 (12×12), for furcation assemblies 600 that include 144 optical fibers 10. The furcation tubes 20$_6$ may each carry twenty-four optical fibers 10 (8×24), for furcation assemblies 600 that include 192 optical fibers 10. The furcation tubes 20$_6$ may each carry twenty-four optical fibers 10 (12×24), for furcation assemblies 600 that include 288 optical fibers 10. The furcation assembly 600 may therefore also include eight or twelve jackets 50$_6$ or other quantities of jackets 50. The jackets (i.e., furcation tubes) 50$_6$ may have an outside diameter of 3.2 millimeters for furcation assemblies 600 that include one hundred forty-four optical fibers 10. The jackets 50$_6$ may have an outside diameter of 3.8 millimeters for furcation assemblies 600 that include one hundred ninety-two or two hundred eighty-eight optical fibers 10. The jackets 50$_6$ may each carry one of the furcation tubes 20$_6$ and strength member(s) 60B$_6$. The jacket 30$_6$ may have an outside diameter of 6.8 millimeters for furcation assemblies 600 that include one hundred forty-four optical fibers 10. The jacket 30$_6$ may have an outside diameter of 9.1 millimeters for furcation assemblies 600 that include one hundred ninety-two optical fibers 10. The jacket 30$_6$ may have an outside diameter of 10.9 millimeters for furcation assemblies 600 that include two hundred eighty-eight optical fibers 10. The jacket 30$_6$ may carry eight or twelve of the furcation tubes 20$_6$ and strength member(s) 60A$_6$. The cable jacket 30$_6$ may be available in different colors. The jackets 50$_6$ may be available in different colors. The cover 650 may assemble to the main body 620 of the housing 610 in a direction parallel or substantially parallel to the axial direction A6.

The above examples are described with specific characteristics and features. Other furcation assemblies may include characteristics and/or features that vary from the above listed characteristics and features. The above examples are described with specific combinations of characteristics and features. Other furcation assemblies may include combinations of characteristics and/or features that vary from the above listed combinations. Each of the features and characteristics are separately useable in a cable furcation assembly (i.e., a cable breakout assembly).

From the forgoing detailed description, it will be evident that modifications and variations can be made without departing from the spirit and scope of the disclosure.

What is claimed is:

1. A fiber optic assembly comprising:
a cable anchor extending between a first end and a second end, the cable anchor including a housing attachment portion, a cable attachment portion that is unitarily formed with the housing attachment portion, and a passage, the housing attachment portion configured for mounting the cable anchor to a telecommunications housing,
wherein the cable anchor defines a pair of opposing sides, the cable attachment portion of the cable anchor including a first end and a second end, the cable anchor further including a flange configured for abutting the telecommunications housing when the cable anchor is mounted to the telecommunications housing, the flange defining the pair of opposing sides of the cable anchor, the housing attachment portion of the cable anchor including a latch extending between a first end defined by the flange and a second end, the latch formed from a pair of cantilevered arms that include free ends at the second end with latching elements, the latching elements including ramps that allow the cable anchor to be pushed into the telecommunications housing and thereby flexibly bend the opposing cantilevered arms toward each other as the latching elements pass into the telecommunications housing, wherein the latching elements are configured to flexibly move outwardly such that the latching elements catch on the telecommunications housing to limit axial movement of the cable anchor relative to the telecommunications housing.

2. The fiber optic assembly of claim 1, wherein the flange defined by the cable anchor is configured to abut the telecommunications housing and also limit axial movement of the cable anchor relative to the telecommunications housing in a direction opposite to that caused by the latching elements.

3. The fiber optic assembly of claim 1, wherein the cable attachment portion defines an exterior with surface texturing between the first and second ends of the cable attachment portion.

4. The fiber optic assembly of claim 1, further comprising a main fiber optic cable structure including a plurality of optical fibers and a main jacket surrounding a collectively jacketed portion of the plurality of optical fibers, wherein the main fiber optic cable structure is secured to the cable attachment portion of the cable anchor, and wherein the plurality of optical fibers each extend through an end portion of the main jacket of the main fiber optic cable structure and the passage of the cable anchor.

5. The fiber optic assembly of claim 4, wherein the main fiber optic cable structure includes at least one micro-tube within the main jacket and the at least one micro-tube surrounds a group of the plurality of optical fibers.

6. A fiber optic assembly comprising:
a cable anchor including a housing attachment portion, a jacket attachment portion, and a passage, the housing attachment portion configured for mounting within a telecommunications housing, wherein the cable anchor extends between a first end and a second end, the jacket attachment portion of the cable anchor extending from the first end to a flange configured to abut the telecommunications housing, and wherein the housing attachment portion of the cable anchor includes a latch extending from the flange to the second end, the latch formed from a pair of cantilevered arms that include free ends at the second end with latching elements, wherein the latching elements are configured to engage portions of the telecommunications housing as the cable anchor is inserted into the telecommunications housing to limit axial movement of the cable anchor relative to the telecommunications housing; and
a main fiber optic cable structure including a main jacket surrounding a collectively jacketed portion of a plurality of optical fibers, the main jacket of the main fiber optic cable structure secured to the jacket attachment portion of the cable anchor;
wherein the plurality of optical fibers each respectively continuously extend through the main jacket and the passage of the cable anchor.

7. The fiber optic assembly of claim 6, wherein the flange defined by the cable anchor is configured to abut the telecommunications housing and also limit axial movement of the cable anchor relative to the telecommunications housing in a direction opposite to that caused by the latching elements.

8. The fiber optic assembly of claim 6, wherein the jacket attachment portion defines an exterior with surface texturing.

9. The fiber optic assembly of claim 6, wherein the jacket attachment portion is unitarily formed with the housing attachment portion of the cable anchor.

10. The fiber optic assembly of claim 6, wherein the main fiber optic cable structure includes at least one micro-tube within the main jacket and the at least one micro-tube surrounds a group of the plurality of optical fibers.

* * * * *